(12) United States Patent
Karlin et al.

(10) Patent No.: US 9,009,064 B2
(45) Date of Patent: Apr. 14, 2015

(54) CONTINGENT FEE ADVERTISEMENT PUBLISHING SERVICE PROVIDER FOR INTERACTIVE TV MEDIA SYSTEM AND METHOD

(75) Inventors: Jon Karlin, Redmond, WA (US); Lee Wang, Kirkland, WA (US)

(73) Assignee: eBay Inc., San Jose, CA (US)

( * ) Notice: Subject to any disclaimer, the term of this patent is extended or adjusted under 35 U.S.C. 154(b) by 412 days.

(21) Appl. No.: 12/504,573

(22) Filed: Jul. 16, 2009

(65) Prior Publication Data

US 2010/0010887 A1  Jan. 14, 2010

Related U.S. Application Data

(63) Continuation-in-part of application No. 12/390,399, filed on Feb. 20, 2009, and a continuation-in-part of application No. 11/731,119, filed on Mar. 30, 2007.

(60) Provisional application No. 61/081,356, filed on Jul. 16, 2008, provisional application No. 61/029,979, filed on Feb. 20, 2008, provisional application No. 60/788,407, filed on Mar. 31, 2006.

(51) Int. Cl.
*G06Q 30/00* (2012.01)
*G06Q 30/02* (2012.01)

(52) U.S. Cl.
CPC ............ *G06Q 30/02* (2013.01); *G06Q 30/0207* (2013.01); *G06Q 30/0277* (2013.01); *G06Q 30/0239* (2013.01); *G06Q 30/0211* (2013.01); *G06Q 30/0241* (2013.01); *G06Q 30/0213* (2013.01); *G06Q 30/0273* (2013.01); *G06Q 30/0275* (2013.01)

(58) Field of Classification Search
CPC ..................... G06Q 30/0241–30/0277; G06Q 30/0601–30/0643; G06Q 30/08; G06Q 30/0214
USPC ........................ 705/14.16, 14.65, 14.69, 14.7
See application file for complete search history.

(56) References Cited

U.S. PATENT DOCUMENTS

| | | | | |
|---|---|---|---|---|
| 5,483,049 A | * | 1/1996 | Schulze, Jr. ................ | 705/14.13 |
| 5,724,521 A | * | 3/1998 | Dedrick ........................ | 705/26.1 |
| 5,752,238 A | * | 5/1998 | Dedrick ..................... | 705/14.69 |
| 6,029,141 A | * | 2/2000 | Bezos et al. ................. | 705/27.1 |

(Continued)

FOREIGN PATENT DOCUMENTS

| | | |
|---|---|---|
| AU | 2007235421 B2 | 3/2013 |
| KR | 10-2001-0092588 A | 10/2001 |

(Continued)

OTHER PUBLICATIONS http://investing.businessweek.com/research/stocks/private/snapshot.asp?privcapId=106730.

(Continued)

*Primary Examiner* — Bennett Sigmond
(74) *Attorney, Agent, or Firm* — Schwegman Lundberg & Woessner, P.A.

(57) ABSTRACT

A purchase-transaction-settled online consumer referral and reward system and method using real-time specific merchant sales information is provided for the advertising publishing industry. The system provides a pay per transaction platform that allows advertising publishers to monetize interactive and/or broadcast media advertising by tracking and linking ad acceptance events to consummated consumer purchases.

19 Claims, 27 Drawing Sheets

(56) References Cited

U.S. PATENT DOCUMENTS

| | | | |
|---|---|---|---|
| 6,253,189 B1* | 6/2001 | Feezell et al. | 705/14.61 |
| 6,266,651 B1 | 7/2001 | Woolston | |
| 6,269,361 B1* | 7/2001 | Davis et al. | 1/1 |
| 6,314,404 B1* | 11/2001 | Good et al. | 705/313 |
| 6,323,885 B1* | 11/2001 | Wiese | 715/835 |
| 6,327,570 B1 | 12/2001 | Stevens | |
| 6,334,111 B1* | 12/2001 | Carrott | 705/14.39 |
| 6,401,075 B1* | 6/2002 | Mason et al. | 705/14.72 |
| 6,457,005 B1* | 9/2002 | Torrey | 1/1 |
| 6,594,498 B1* | 7/2003 | McKenna et al. | 455/517 |
| 6,594,641 B1 | 7/2003 | Southam | |
| 6,694,387 B2* | 2/2004 | Wagner | 710/33 |
| 6,741,856 B2* | 5/2004 | McKenna et al. | 455/422.1 |
| 6,766,301 B1* | 7/2004 | Daniel et al. | 705/14.26 |
| 6,879,965 B2* | 4/2005 | Fung et al. | 705/39 |
| 6,980,962 B1* | 12/2005 | Arganbright et al. | 705/14.31 |
| 7,191,147 B2* | 3/2007 | Heene et al. | 705/14.51 |
| 7,308,420 B1 | 12/2007 | Storch et al. | |
| 7,644,862 B2* | 1/2010 | Rolf | 235/383 |
| 7,801,766 B2* | 9/2010 | Bunger et al. | 705/26.8 |
| 7,865,414 B2* | 1/2011 | Fung et al. | 705/35 |
| 7,949,572 B2* | 5/2011 | Perrochon et al. | 705/26.41 |
| 2001/0034643 A1 | 10/2001 | Acres | |
| 2001/0044771 A1* | 11/2001 | Usher et al. | 705/37 |
| 2001/0054021 A1* | 12/2001 | Kawakura et al. | 705/37 |
| 2001/0056355 A1 | 12/2001 | Moriyama et al. | |
| 2001/0056369 A1* | 12/2001 | Takayama et al. | 705/14 |
| 2002/0004735 A1* | 1/2002 | Gross | 705/10 |
| 2002/0007324 A1* | 1/2002 | Centner et al. | 705/26 |
| 2002/0023263 A1 | 2/2002 | Ahn et al. | |
| 2002/0069155 A1 | 6/2002 | Nafeh et al. | |
| 2002/0072968 A1 | 6/2002 | Gorelick et al. | |
| 2002/0072974 A1 | 6/2002 | Pugliese, III et al. | |
| 2002/0072984 A1 | 6/2002 | Rothman et al. | |
| 2002/0082910 A1* | 6/2002 | Kontogouris | 705/14 |
| 2002/0091991 A1 | 7/2002 | Castro | |
| 2002/0092019 A1 | 7/2002 | Marcus | |
| 2002/0107027 A1* | 8/2002 | O'Neil | 455/456 |
| 2002/0116266 A1 | 8/2002 | Marshall | |
| 2002/0128903 A1* | 9/2002 | Kernahan | 705/14 |
| 2002/0128959 A1* | 9/2002 | Kostic et al. | 705/37 |
| 2002/0133398 A1* | 9/2002 | Geller et al. | 705/14 |
| 2002/0138348 A1 | 9/2002 | Narayan et al. | |
| 2002/0161647 A1* | 10/2002 | Gailey et al. | 705/14 |
| 2002/0164977 A1* | 11/2002 | Link, II et al. | 455/414 |
| 2002/0174018 A1 | 11/2002 | Bunger et al. | |
| 2002/0178071 A1* | 11/2002 | Walker et al. | 705/26 |
| 2002/0181017 A1 | 12/2002 | Such et al. | |
| 2002/0188527 A1 | 12/2002 | Dillard et al. | |
| 2002/0188635 A1 | 12/2002 | Larson | |
| 2003/0003990 A1 | 1/2003 | Von Kohorn | |
| 2003/0014331 A1* | 1/2003 | Simons | 705/27 |
| 2003/0028451 A1 | 2/2003 | Ananian | |
| 2003/0055727 A1 | 3/2003 | Walker et al. | |
| 2003/0083932 A1* | 5/2003 | Wolf et al. | 705/14 |
| 2003/0083961 A1 | 5/2003 | Bezos et al. | |
| 2003/0093355 A1* | 5/2003 | Issa | 705/37 |
| 2003/0135460 A1* | 7/2003 | Talegon | 705/40 |
| 2003/0216964 A1 | 11/2003 | MacLean et al. | |
| 2003/0220866 A1* | 11/2003 | Pisaris-Henderson et al. | 705/37 |
| 2003/0233278 A1 | 12/2003 | Marshall | |
| 2004/0006478 A1 | 1/2004 | Alpdemir et al. | |
| 2004/0006542 A1 | 1/2004 | Gilliam et al. | |
| 2004/0024632 A1 | 2/2004 | Perry | |
| 2004/0034582 A1 | 2/2004 | Gilliam et al. | |
| 2004/0038665 A1* | 2/2004 | Hosono | 455/404.2 |
| 2004/0039704 A1 | 2/2004 | Gilliam et al. | |
| 2004/0049439 A1* | 3/2004 | Johnston et al. | 705/34 |
| 2004/0064351 A1 | 4/2004 | Mikurak | |
| 2004/0068436 A1* | 4/2004 | Boubek et al. | 705/14 |
| 2004/0103024 A1 | 5/2004 | Patel et al. | |
| 2004/0106449 A1 | 6/2004 | Walker et al. | |
| 2004/0133472 A1 | 7/2004 | Leason et al. | |
| 2004/0186738 A1 | 9/2004 | Reisman | |
| 2004/0204222 A1 | 10/2004 | Roberts | |
| 2004/0243478 A1 | 12/2004 | Walker et al. | |
| 2004/0254835 A1 | 12/2004 | Thomas et al. | |
| 2004/0254836 A1 | 12/2004 | Emoke Barabas et al. | |
| 2004/0254853 A1* | 12/2004 | Heene et al. | 705/26 |
| 2004/0267561 A1 | 12/2004 | Meshkin et al. | |
| 2005/0004837 A1 | 1/2005 | Sweeney et al. | |
| 2005/0004880 A1 | 1/2005 | Musgrove | |
| 2005/0028131 A1 | 2/2005 | Moukara | |
| 2005/0033643 A1 | 2/2005 | Smith et al. | |
| 2005/0060227 A1* | 3/2005 | Nelson | 705/14 |
| 2005/0065811 A1 | 3/2005 | Chu et al. | |
| 2005/0080727 A1 | 4/2005 | Postrel | |
| 2005/0114230 A1 | 5/2005 | Fang | |
| 2005/0159993 A1 | 7/2005 | Kordas et al. | |
| 2005/0171838 A1* | 8/2005 | Eglinton | 705/14 |
| 2005/0187872 A1* | 8/2005 | Schmidt et al. | 705/40 |
| 2005/0197857 A1 | 9/2005 | Avery | |
| 2005/0216454 A1* | 9/2005 | Diab et al. | 707/3 |
| 2005/0251440 A1 | 11/2005 | Bednarek | |
| 2005/0256766 A1* | 11/2005 | Garcia et al. | 705/14 |
| 2005/0261964 A1 | 11/2005 | Fang | |
| 2005/0266387 A1 | 12/2005 | Rossides | |
| 2005/0273423 A1* | 12/2005 | Kiai et al. | 705/38 |
| 2005/0289131 A1 | 12/2005 | Aenlle et al. | |
| 2006/0004631 A1* | 1/2006 | Roberts et al. | 705/14 |
| 2006/0015405 A1 | 1/2006 | Bala et al. | |
| 2006/0015904 A1 | 1/2006 | Marcus | |
| 2006/0025192 A1 | 2/2006 | Walker et al. | |
| 2006/0026067 A1 | 2/2006 | Nicholas et al. | |
| 2006/0063587 A1 | 3/2006 | Manzo | |
| 2006/0167752 A1* | 7/2006 | Pozesky et al. | 705/14 |
| 2006/0178978 A1* | 8/2006 | McLain et al. | 705/37 |
| 2006/0190336 A1* | 8/2006 | Pisaris-Henderson et al. | 705/14 |
| 2006/0212350 A1* | 9/2006 | Ellis et al. | 705/14 |
| 2006/0217135 A1 | 9/2006 | Moore et al. | |
| 2006/0229936 A1 | 10/2006 | Cahill | |
| 2006/0271389 A1* | 11/2006 | Goodman | 705/1 |
| 2006/0271429 A1* | 11/2006 | Borgs et al. | 705/14 |
| 2007/0003038 A1 | 1/2007 | Siegel et al. | |
| 2007/0067297 A1 | 3/2007 | Kublickis | |
| 2007/0156890 A1* | 7/2007 | Promny | 709/224 |
| 2007/0174124 A1 | 7/2007 | Zagofsky et al. | |
| 2007/0179846 A1 | 8/2007 | Jain et al. | |
| 2007/0239533 A1 | 10/2007 | Wojcicki et al. | |
| 2007/0265912 A1 | 11/2007 | Belanger et al. | |
| 2007/0288312 A1 | 12/2007 | Wang | |
| 2008/0027805 A1* | 1/2008 | Chang | 705/14 |
| 2008/0052150 A1 | 2/2008 | Grouf et al. | |
| 2008/0071775 A1* | 3/2008 | Gross | 707/5 |
| 2008/0103897 A1 | 5/2008 | Flake et al. | |
| 2008/0140491 A1 | 6/2008 | Jain et al. | |
| 2008/0140520 A1 | 6/2008 | Hyder et al. | |
| 2008/0228600 A1 | 9/2008 | Treyz et al. | |
| 2008/0256061 A1* | 10/2008 | Chang et al. | 707/5 |
| 2008/0270224 A1 | 10/2008 | Portman et al. | |
| 2008/0270233 A1 | 10/2008 | Yip et al. | |
| 2009/0006188 A1 | 1/2009 | Guo et al. | |
| 2009/0012865 A1 | 1/2009 | Celik | |
| 2009/0199003 A1 | 8/2009 | Gerritsen | |
| 2009/0299820 A1 | 12/2009 | Wang et al. | |
| 2010/0010887 A1* | 1/2010 | Karlin et al. | 705/14.15 |
| 2010/0049695 A2* | 2/2010 | Morsa | 707/3 |
| 2011/0035278 A1 | 2/2011 | Fordyce, III et al. | |
| 2011/0082730 A1 | 4/2011 | Karlin et al. | |
| 2011/0264508 A1 | 10/2011 | Harik et al. | |
| 2012/0259695 A1 | 10/2012 | Glassman et al. | |
| 2013/0132185 A1 | 5/2013 | Antonucci et al. | |

FOREIGN PATENT DOCUMENTS

| | | | | |
|---|---|---|---|---|
| WO | WO00/62231 | A1 | 10/2000 | |
| WO | WO /0062231 | * | 10/2000 | G06F 17/60 |
| WO | WO/0062231 | * | 10/2000 | G06F 17/60 |
| WO | WO-0062331 | A2 | 10/2000 | |
| WO | WO01/29738 | A2 | 4/2001 | |
| WO | WO01/29739 | A2 | 4/2001 | |
| WO | WO01/29740 | A2 | 4/2001 | |
| WO | WO0129737 | A2 | 4/2001 | |
| WO | WO02/054362 | A1 | 7/2002 | |

(56) References Cited

FOREIGN PATENT DOCUMENTS

| WO | WO02075516 A1 | 9/2002 |
|---|---|---|
| WO | 03/058531 A1 | 7/2003 |
| WO | 2006/127645 A2 | 11/2006 |
| WO | WO-2007117513 A2 | 10/2007 |
| WO | WO-2010009341 A2 | 1/2010 |

OTHER PUBLICATIONS

"U.S. Appl. No. 11/731,119 Amendment filed Nov. 30, 2010", 16 pgs.

"U.S. Appl. No. 11/731,119, Final Office Action mailed Aug. 30, 2010", 13 pgs.

"U.S. Appl. No. 11/731,119, Non Final Office Action mailed Feb. 22, 2010", 13 pgs.

"U.S. Appl. No. 11/731,119, Response filed Jun. 21, 2010 to Non Final Office Action mailed Feb. 22, 2010", 19 pgs.

"U.S. Appl. No. 12/390,399, Final Office Action mailed Apr. 11, 2012", 15 pgs.

"U.S. Appl. No. 12/390,399, Non Final Office Action mailed Sep. 28, 2011", 26 pgs.

"U.S. Appl. No. 12/390,399, Response filed Feb. 28, 2012 to Non Final Office Action mailed Sep. 28, 2011", 12 pgs.

"U.S. Appl. No. 12/390,399, Response filed Oct. 9, 2012 to Final Office Action mailed Apr. 11, 2012", 9 pgs.

"Australian Application Serial No. 2007235421, Response filed Feb. 18, 2013 to Office Action mailed Jun. 8, 2011", 15 pgs.

"U.S. Appl. No. 12/796,619 , Response filed Jan. 25, 2013 to Final Office Action mailed Jul. 25, 2012", 6 pgs.

"U.S. Appl. No. 12/796,619, Final Office Action mailed Jul. 25, 2012", 15 pgs.

"U.S. Appl. No. 12/796,619, Non Final Office Action mailed Oct. 6, 2011", 14 pgs.

"U.S. Appl. No. 12/796,619, Response filed Apr. 6, 2012 to Non Final Office Action mailed Oct. 6, 2011", 5 pgs.

"Australian Application Serial No. 2007235421, First Examiner's Report mailed Jun. 8, 2011", 3 pgs.

"European Application Serial No. 07754862.6, Communication Pursuant to Rules 70(2) and 70a(2) mailed Jun. 7, 2011", 1 pg.

"European Application Serial No. 07754862.6, European Search Report mailed May 20, 2011", 6 pgs.

"European Application Serial No. 09713240.1, Communication Pursuant to Rules 161(2) and 162 EPC mailed Oct. 8, 2010", 2 pgs.

"European Application Serial No. 09713240.1, European Search Report mailed Nov. 14, 2012", 7 pgs.

"European Application Serial No. 09713240.1, Supplementary European Search Report mailed Dec. 3, 2012", 1 pg.

"European Application Serial No. 09798769.7, Communication on the Application of Article 67(3) mailed Apr. 28, 2011", 1 pg.

"European Application Serial No. 09798769.7, Communication Pursuant to Rules 161(2) and 162 EPC mailed Mar. 17, 2011", 2 pgs.

"European Application Serial No. 09798769.7, Noting Loss of Rights Pursuant to Rule 112(1) EPC mailed Mar. 8, 2012", 1 pg.

"International Application Serial No. PCT/US2007/008414, International Preliminary Report on Patentability mailed Sep. 30, 2008", 6 pgs.

"International Application Serial No. PCT/US2007/008414, International Search Report mailed Oct. 29, 2007", 1 pg.

"International Application Serial No. PCT/US2007/008414, Written Opinion mailed Oct. 29, 2007", 5 pgs.

"International Application Serial No. PCT/US2009/034795, International Preliminary Report on Patentability mailed Aug. 24, 2010", 5 pgs.

"International Application Serial No. PCT/US2009/034795, International Search Report mailed Jun. 3, 2009", 1 pg.

"International Application Serial No. PCT/US2009/034795, Written Opinion mailed Jun. 3, 2009", 4 pgs.

"International Application Serial No. PCT/US2009/050896, International Preliminary Report on Patentability mailed Jan. 18, 2011", 5 pgs.

"International Application Serial No. PCT/US2009/050896, International Search Report mailed Mar. 15, 2010", 2 pgs.

"International Application Serial No. PCT/US2009/050896, Written Opinion mailed Mar. 15, 2010", 4 pgs.

"New Zealand Application Serial No. 571931, Examination Report mailed Mar. 3, 2010", 2 pgs.

"Shop Expert.com Predicts Record Sales From Online Browsing, Offline Buying Trend", PRNewswire, [Online]. Retrieved from the Internet: <URL: http://www.thefreelibrary.com/ShopExpert.com%20Predicts%20Record%20Sales%>, (Jan. 24, 1999), 2 pgs.

"U.S. Appl. No. 11/731,119, Non Final Office Action mailed Sep. 26, 2013", 26 pgs.

"U.S. Appl. No. 12/796,619, Non Final Office Action mailed Jun. 21, 2013", 16 pgs.

"U.S. Appl. No. 12/796,619, Response filed Oct. 21, 2013 to Non Final Office Action mailed Jun. 21, 2013", 8 pgs.

"Australian Application Serial No. 2013204597, Amendment filed Apr. 30, 2013", 13 pgs.

"European Application Serial No. 09713240.1, Response filed Jun. 12, 2013 to Extended European Search Report mailed Dec. 3, 2012", 12 pgs.

"U.S. Appl. No. 11/731,119, Final Office Action mailed Feb. 12, 2014", 28 pgs.

"U.S. Appl. No. 12/796,619, Examiner Interview Summary mailed Apr. 29, 2014", 3 pgs.

"U.S. Appl. No. 12/796,619, Final Office Action mailed Dec. 27, 2013", 20 pgs.

"U.S. Appl. No. 12/796,619, Response filed Mar. 4, 2013 to Final Office Action mailed Jul. 25, 2012", 6 pgs.

"U.S. Appl. No. 12/796,619, Response filed Apr. 25, 2014 to Final Office Action mailed Dec. 27, 2013", 9 pgs.

"Austalian Application Serial No. 2009270855, Response filed May 5, 2014 to Examiner's Report mailed Dec. 11, 2013", 13 pgs.

"Australian Application Serial No. 2009270855, First Examination Report mailed Dec. 11, 2013", 4 pgs.

"U.S. Appl. No. 11/731,119, Response filed Jun. 11, 2014 to Final Office Action mailed Feb. 12, 2014", 17 pgs.

"U.S. Appl. No. 12/390,399, Non Final Office Action mailed Sep. 26, 2014", 17 pgs.

"U.S. Appl. No. 12/796,619, Examiner Interview Summary mailed Oct. 22, 2014", 3 pgs.

"U.S. Appl. No. 12/796,619, Non Final Office Action mailed Jun. 19, 2014", 27 pgs.

"U.S. Appl. No. 12/796,619, Response filed Oct. 20, 2014 to Non Final Office Action mailed Jun. 19, 2014", 11 pgs.

\* cited by examiner

| AREA | ITEM | ISSUER | Reporter | NOTE |
|---|---|---|---|---|
| Merchant | Merchant Account Authentication | Service Provider | Merchant | |
| Consumer | Consumer Account Authentication | Service Provider | Consumer | |
| Transaction | Unique Transaction ID (UTID) | Service Provider | Merchant | |
| | Offer ID (OID) | Service Provider | Merchant | 1 |
| | Time | Merchant | Merchant | |
| | Location | Merchant | Merchant | |
| | Price | Merchant | Merchant | 2 |

1. Only needed under a membership-and-offer-qualified model
2. Only needed under a price-charged model

FIG. 3

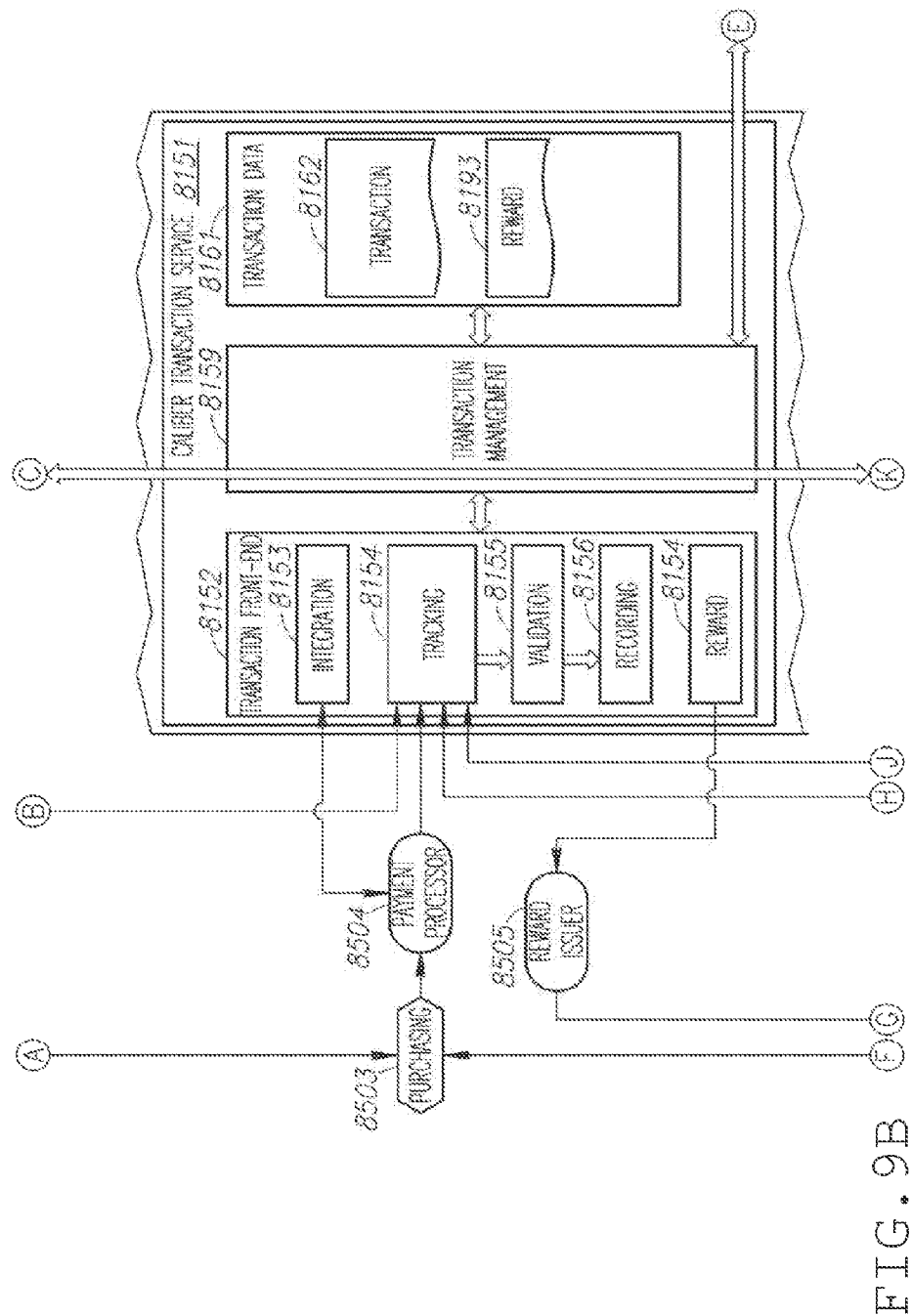

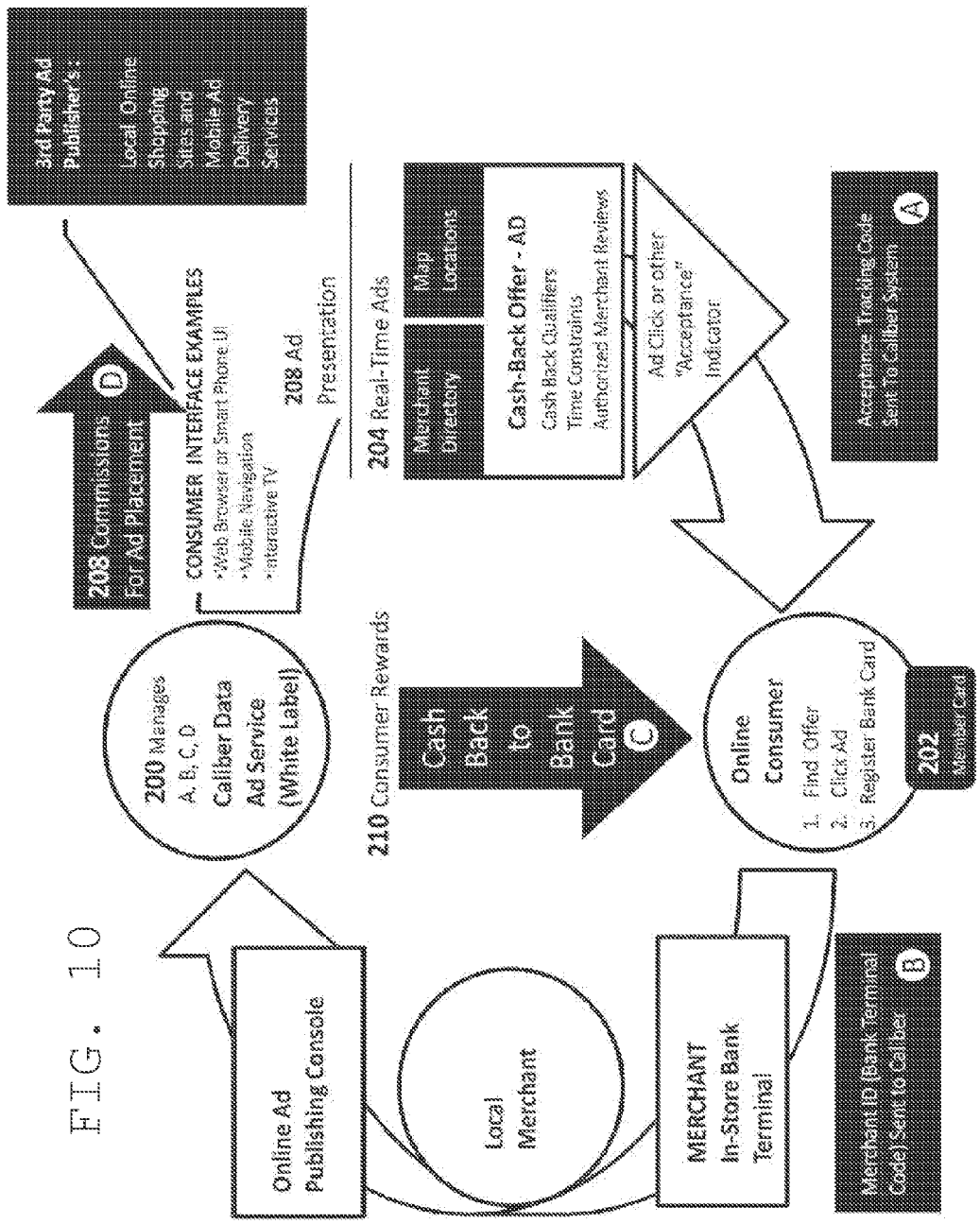

Example Inputs (managed by newspaper publisher)

Percent
Dollars
Time

- Commission Rate Bid
- Total Accrued Commissions Generated
- Total Time of Ad Placement Weighting Factors
- Merchant Category (by revenue size, by industry or service sector)
- "Green Product" sold (approved environmentally friendly products)
- Contributions by merchant to approved charities, etc.
- New Business Launching

FIG. 18 ical Copyright Laws. © 2006-2009 Caliber Data, Inc. All
CONTINGENT FEE ADVERTISEMENT PUBLISHING SERVICE PROVIDER FOR INTERACTIVE TV MEDIA SYSTEM AND METHOD

CROSS-REFERENCE TO RELATED APPLICATIONS

This application claims priority to U.S. Provisional Application Ser. No. 61/081,356 filed Jul. 16, 2008. This application is also a Continuation-in-Part of U.S. patent application Ser. No. 12/390,399 filed Feb. 20, 2009 which claims priority to U.S. Provisional Patent Application Ser. No. 61/029,979 filed Feb. 20, 2008. This application also is Continuation-in-Part of U.S. patent application Ser. No. 11/731,119 filed on Mar. 30, 2007 which claims priority to U.S. Provisional Application Ser. No. 60/788,407, filed on Mar. 31, 2006, all of which are incorporated herein by reference.

COPYRIGHT NOTICE

This disclosure is protected under United States and International Copyright Laws. © 2006-2009 Caliber Data, Inc. All Rights Reserved. A portion of the disclosure of this patent document contains material which is subject to copyright protection. The copyright owner has no objection to the facsimile reproduction by anyone of the patent document or the patent disclosure after formal publication by the USPTO, as it appears in the Patent and Trademark Office patent file or records, but otherwise reserves all copyright rights whatsoever.

FIELD OF THE INVENTION

A system and method for selling, promoting, collecting payment for and syndicating advertisements using an on-line system is provided in which a purchase transaction settled consumer referral and rewards system can be used. The system and method combine an online consumer destination and/or shopping strategy, an advertising submission and placement strategy, a Point of Sale (POS) payment transaction tracking strategy, an advertisement syndication strategy, and a viral marketing strategy facilitated by integration with a purchase-based incentive reward component to capture consumer actions and, accordingly, a contingent fee advertising model.

BACKGROUND OF THE INVENTION

More than $70 billion is spent on TV ads every year. Making TV spots work harder is one of the ad industry's most discussed—and elusive—goals. Two-thirds of big marketers said standard TV ads became less effective in the past two years, according to a January 2008 survey by the Association of National Advertisers and Forrester Research. For years, interactive television has been sort of a holy grail to Madison Avenue. To paraphrase an old joke, it is the future of media . . . and always will be.

In an effort to respond, some large competitors in the broadcast T.V. space are becoming part of on-line advertising networks, for example, Microsoft® entering the market by acquiring Navic Networks, an interactive cable company in 2008. This brings a focus on local shopping through zip code focused advertising. Backchannel (Hearst-Argyle Television)—ABC affiliate, has been focusing on behavioral targeting to be competitive in broadcast T.V. advertising. Canoe Ventures, a consortium of 6 major cable providers including Comcast, Time Warner, Cablevision, has also entered the fray. Cable operators, such as Charter, as well as their satellite TV rivals, all are experimenting with such advertisements. Their goal is to battle Internet media for ad dollars by merging a TV commercial's impact with former Web-only selling points, such as interactive content, ad targeting based on consumers' personal data, and/or precise effectiveness measurement based on how many people click on an advertisement for more information.

Therefore it would be of significant benefit to introduce a new advertising model designed to overcome the problems that TV advertisers face by making payment for advertising contingent on actual sales, while also allowing broadcasters reach out to their local market base of small-medium sized local businesses. Furthermore, it would be of significant benefit if advertisers could monetize their advertising populating both their offline, paper based media as a draw for online placements. Thus, it is desirable to provide an online contingent based Pay-Per-Transaction system to generate offline advertisement sales for T.V. advertisers and help them recover lost revenues and non-monetized opportunities, while also providing a risk free service to merchants.

BRIEF DESCRIPTION OF THE DRAWINGS

Preferred and alternative examples of the present invention are described in detail below with reference to the following drawings:

FIG. 3 illustrates an example of a transaction reporting record for the system shown in FIG. 1;

FIG. 10 illustrates a method for newspaper advertising platform based on the system for a consumer referral and reward system described above;

FIG. 18 illustrates an example of the online to offline print ad rotation engine inputs;

DETAILED DESCRIPTION OF THE PREFERRED EMBODIMENT

Figure 1A:
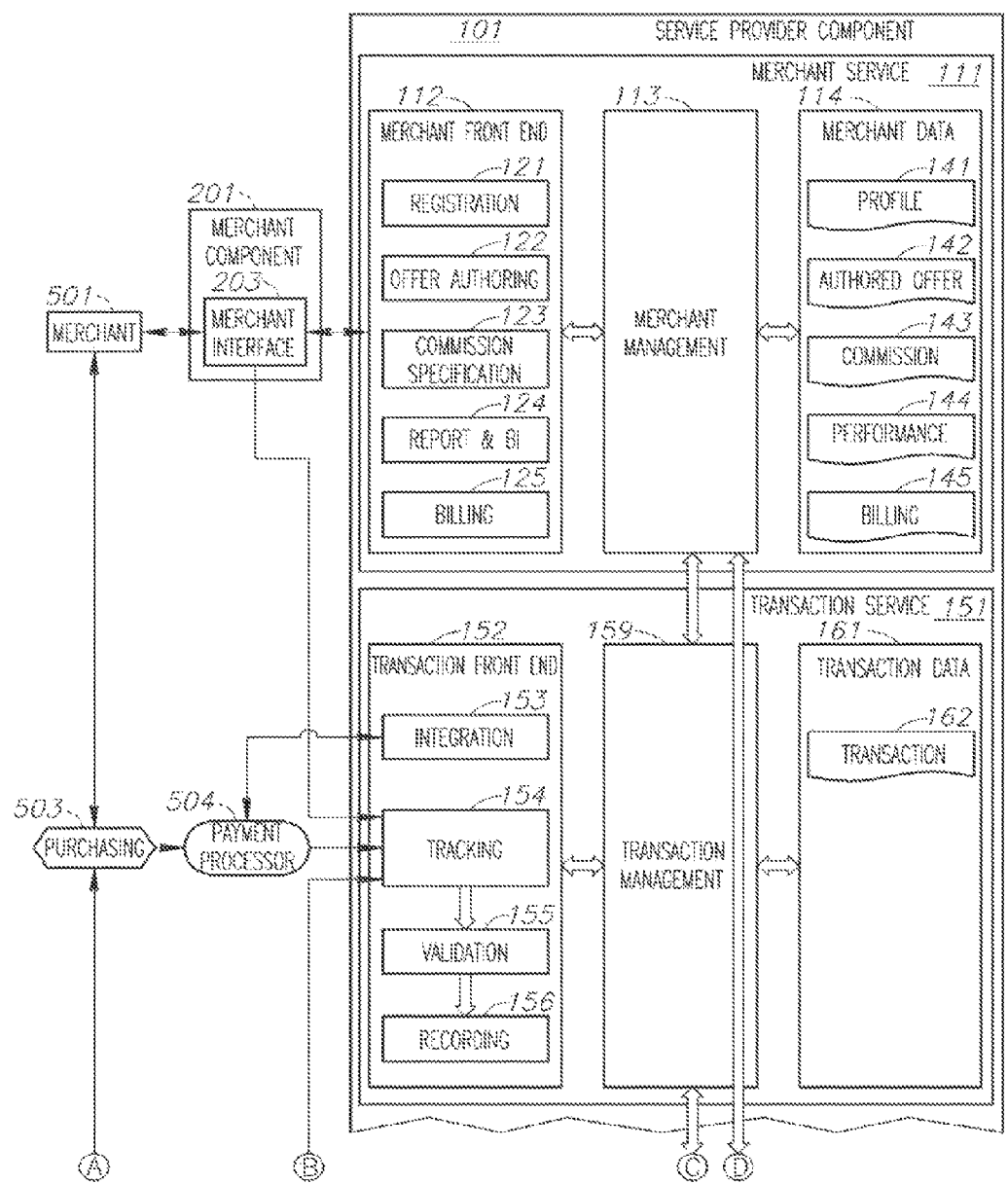
FIG. 1 illustrates an exemplary implementation of the architecture of a system for a consumer referral and reward system.

Before describing the system and method for contingent fee based advertising by (ad) publishers, a web-based, client/server architecture consumer referral and reward system and method are described that form the basis of the system and method for ad publishers. It will be appreciated, however, that the system and method has greater utility since the system and method can be implemented in other manners and with other architectures that are within the scope of the system.

In the following description, certain details are set forth in order to provide a thorough understanding of various embodiments of systems and methods. However, one of skill in the art will understand that other embodiments can be practiced without these details. In other instances, well-known structures and methods associated with computer and communication systems, the communication networks, etc., have not been shown or described in detail to avoid unnecessarily obscuring descriptions of the present invention and embodiments. Unless the context requires otherwise, throughout the specification and claims which follow, the word "comprise" and variations thereof, such as "comprising," and "comprises," are to be construed in an open, inclusive sense that is as "including, but not limited to."

Reference throughout this specification to "one embodiment," or "an embodiment" means that a particular feature described in connection with the embodiment is included in at least one embodiment. Thus, the appearances of the phases "in one embodiment," or "in an embodiment" in various places throughout this specification are not necessarily referring to the same embodiment, or to all embodiments. Furthermore, the particular features can be combined in any suitable manner in one or more embodiments to obtain further embodiments.

The headings are provided for convenience only, and do not interpret the scope of this disclosure or the claimed invention.

Overview

In one embodiment a system and method is described as a contingent fee based advertising system provided by a service provider. The service provider can be, for example an ad publisher, who hosts the functionality of the service provider. The service provider can track a consumer's response to discrete sales offers made by merchant affiliated with the service provider. The service provider can also detect resulting purchases, made by the consumer and trigger a commission fee to the service provider, when the said purchase transaction is matched to a favorable response to an online ad published by the said merchant prior or in-time of the said purchase (i.e. an "ad acceptance event"). The commission fee paid to the service provider, pays for the ad placement after the sales transaction made by the consumer from an affiliated merchant is validated. Validation of the sales transaction consists of two parts, a consumer's discrete ad acceptance event and a resulting discrete sales transaction. Because the ad placement is not paid until a discrete sales transaction occurs and is validated, the risk is shifted from the merchant to the ad publisher. Additionally, a consumer loyalty payment can be made to the consumer based the validated sales transaction.

The system and method is designed as an open platform for use by multiple ad publishers of various types and various interactive media to eliminate resistance to adoption by small businesses. As described, because the payment for ad space is contingent on a validated sales transaction based on ad acceptance, there is less uncertainty and unproven ad to sales performance issues. In essence the risk is shifted to the service provider and ad publisher and not borne by the small business owner. Moreover, because of the integrated tracking functionality, there is greater measurability of advertising success.

One exemplary embodiment of the invention is an advertising platform that enables internet, mobile and/or broadcast advertising publishers (interactive cable, satellite and/or IPTV) to connect online user actions (responses to an advertisement that are defined as "ad acceptances", including, but not limited to, button clicks, screen touches, text, verbal or visual responses, and otherwise engaging, for example shaking, of the multimedia device) with resulting purchases in local brick and mortar stores. The system can enable and promote merchant and/or manufacturer advertising placements on interactive channels through sales commissions paid by offline (local) merchants and tracked at Point of Sale (POS) in merchants' sales establishments. In this example publishers reduce ad costs for its clients by shifting a portion of the ad fees to merchants in return for actual value delivered.

In another embodiment, tracking of resulting sales at point-of-sale (POS) can be achieved by tracking transactions through POS terminals connected to "open-loop" credit card networks (such as, but not limited to, Visa® or MasterCard® networks). Unlike typical loyalty incentive programs, this embodiment tracking system can use an "open transaction loop" service that enables use of already issued payment (credit) cards at any participating merchant. For example, virtually any Visa® POS, MasterCard® POS or other credit card terminals can be used, (no need for merchants to invest in specialized hardware or network connections). This system can deliver a seamless and transparent process in which a merchant commission fees (charged at point of sale) can be tracked and/or used to pay for ad placements when offline sales are detected via e.g., swipe of consumer payment card and/or mobile phone payment, and/or other payment systems. Other known means of tracking resulting sales at Point of Sale can also be implemented to work in conjunction with invention.

The system and its component functions can include:

(1) A Commission Tracking and Billing System. The tracking and billing system component tracks a transaction between a merchant and a consumer. The merchant, once affiliated with the system, in a preferred embodiment can pay a portion of the sales transaction value ("commission") to the service provider, as consideration for delivering the ad driven referral. The commission is contingent on a validated discrete sales transaction based on the ad acceptance.

(2) A Commission Bidding System. The commission bidding system component can track the bidding as between merchant affiliates for advertising real estate. Merchant affiliates engage in competitive bidding with each other, driving up the commission rate (from an established minimum), to pay for a greater portion of referrals in competitive market situations) and to increase the frequency and/or the value of advertising insertions that can, in an exemplary embodiment be rotated from the ad publishers online interactive media to the offline (print) media space. In an alternative embodiment the Merchant Bidding Process can competitively "bid up" the cash-back offer that is made directly to the consumer. This is a direct way to reward and thereby incentivize consumers to join and register their payment card or other payment device with the service provider.

(3) A real-time and on-demand Merchant Offer Publishing System. The Merchant Offer Publishing System component is a computer based, self-serve system that works with a plurality of merchants' business communication channels including the web, the wireless, phone, and fax, that facilitates the creation and submission by merchants to, for example, (a) advertise for a specific product or service, and/or (b) deliver non-item or non-service specific information intended to promote increased consumer traffic to stores (as opposed to driving a specific sale item or service as in (a), such as having a visiting chef or musician at a restaurant, special parking space availability, accelerated service response time).

Also an offer published can contain a "frame" that is a number of constraints applicable to the offer, including time, location, consumer target, etc. The Merchant Affiliate Publishing System results in automated web based publishing in near real-time using a commercially available digital map user interface and/or other online third party consumer shopping and commerce destinations.

(5) An Online Advertising Targeting System Component. The Online Advertising Targeting System component can use time, physical location and consumer provided input (from stored consumer interest profiles, user queries or presubscribed needs to service provider) to determine advertising relevance to target advertising to specified interested consumers.

(6) A computer based Offer Delivery System Component. The Offer Delivery System Component can publish targeted merchant offers to inquiring consumers, using a plurality of personal communication channels, including, but not limited to the internet, wireless, cable channels, phone, fax, and mail.

(7) A Universal Transaction Tracking System Component. The Universal Transaction Tracking System Component can facilitate the capture and recording of cash, credit or stored value transaction card based purchase either at or near the point of sale time and location.

(8) A Consumer Reward and/or Incentive system Component. The Consumer Reward and/or Incentive System Component can reward the consumer/purchaser with a portion of a commission fee charged to the selling merchant and also reward consumers for helping refer new consumer and merchant members.

Figure 1B:
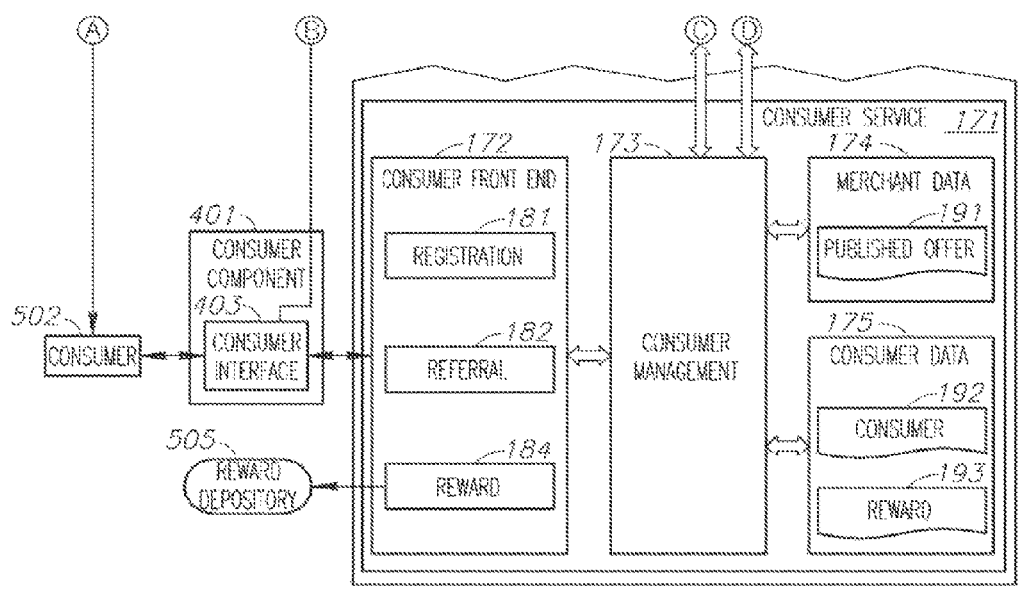
Figure 8:
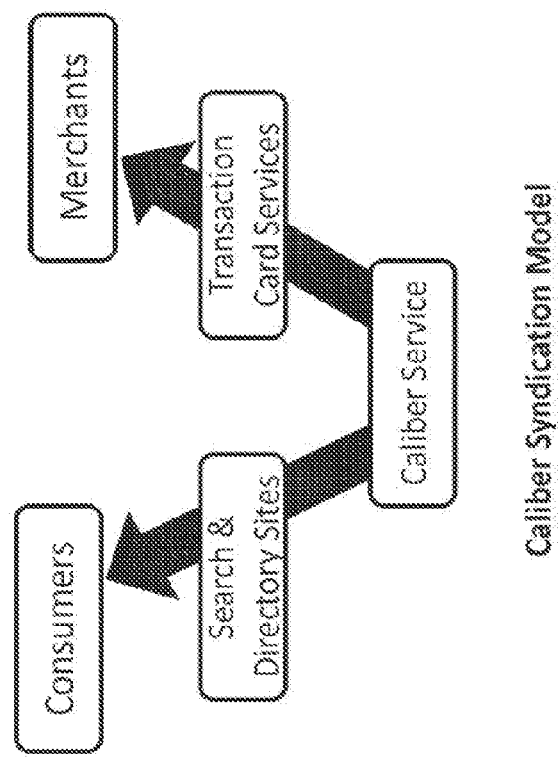
FIG. 8 illustrates a syndication model of the system shown in FIG. 1.
Figure 9A:
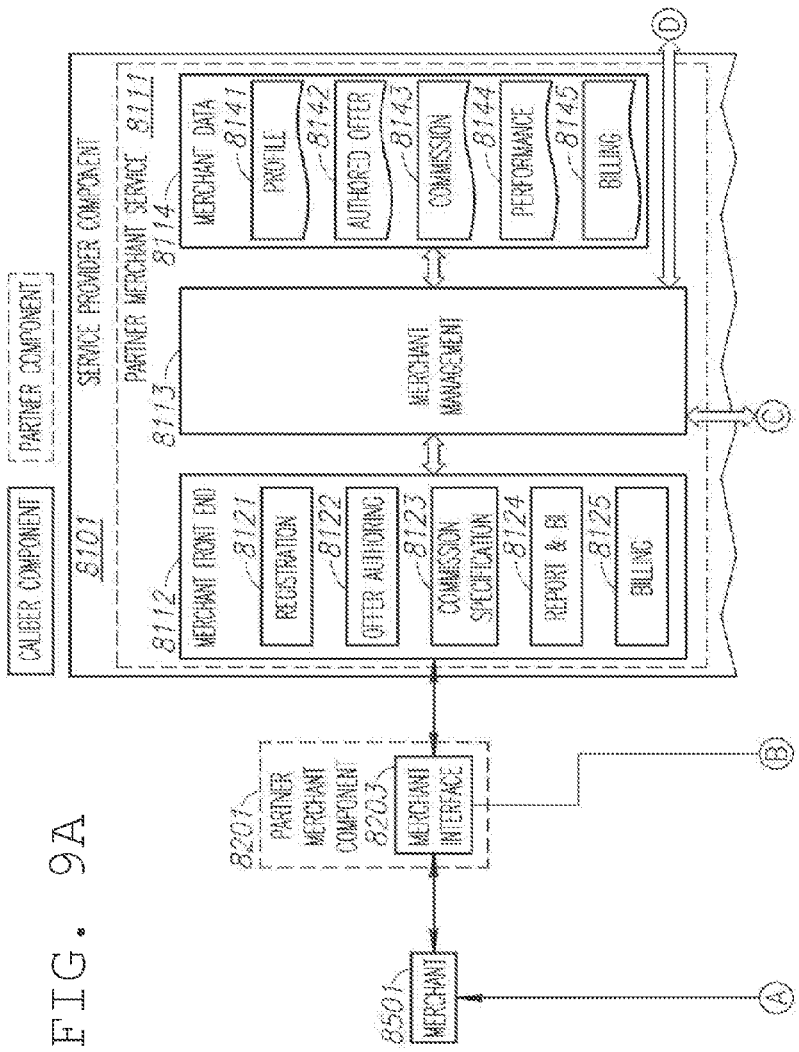
FIG. 9 exemplary implementation of the architecture of a system for a newspaper advertising platform that incorporates components on the consumer referral and reward system shown in FIG. 1.
Figure 9C:
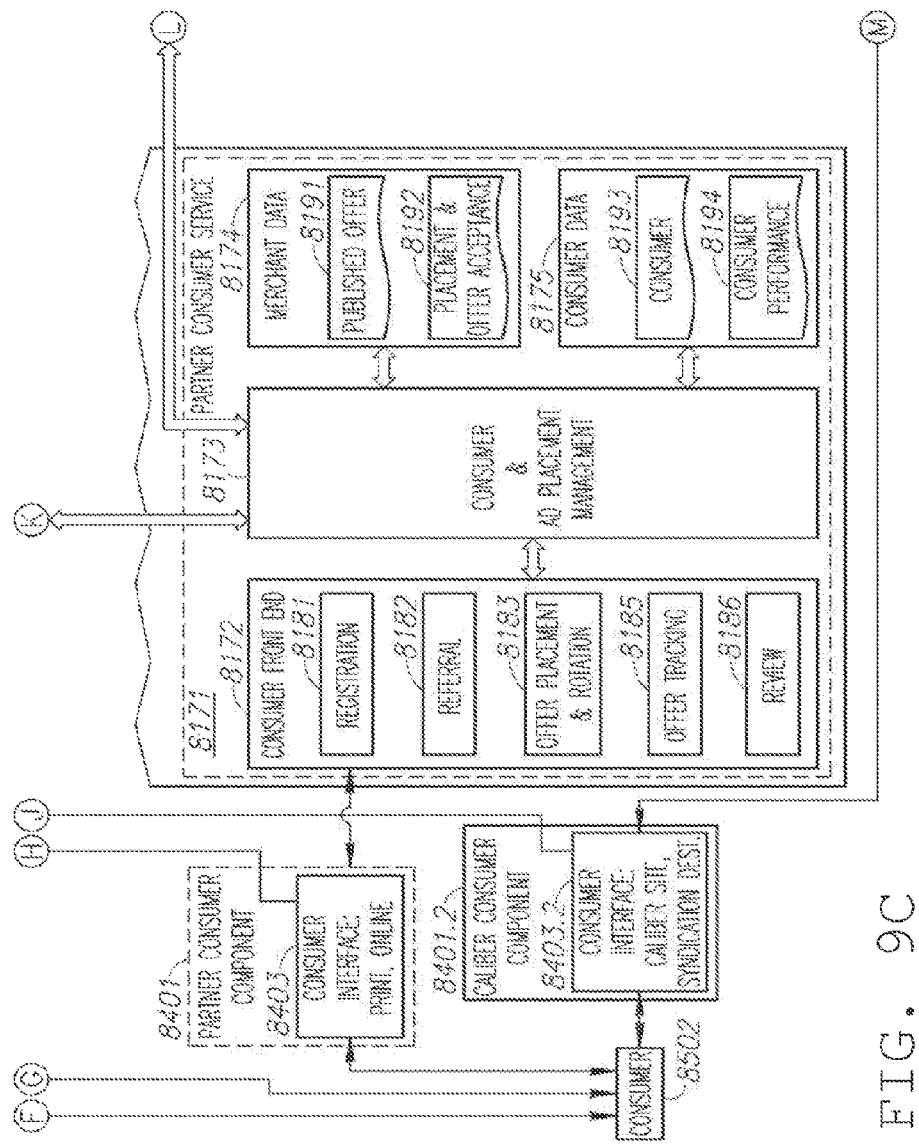
Figure 9D:
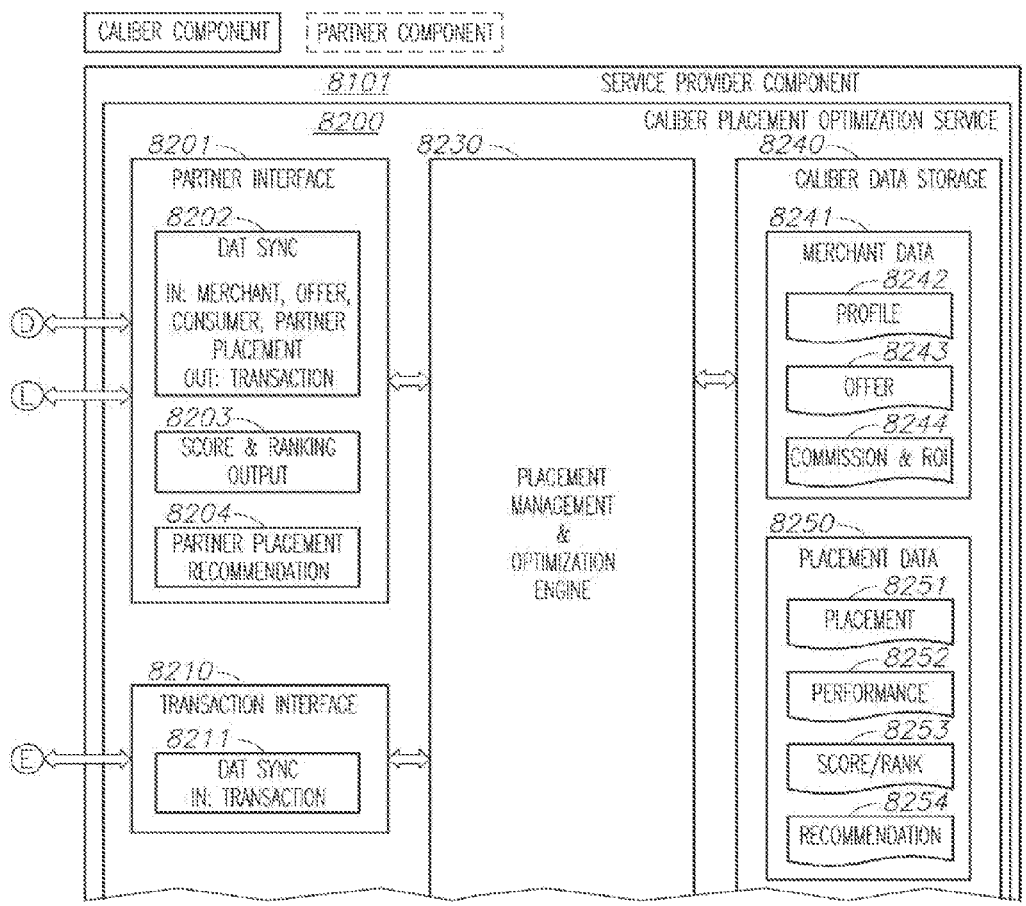
Figure 9E:
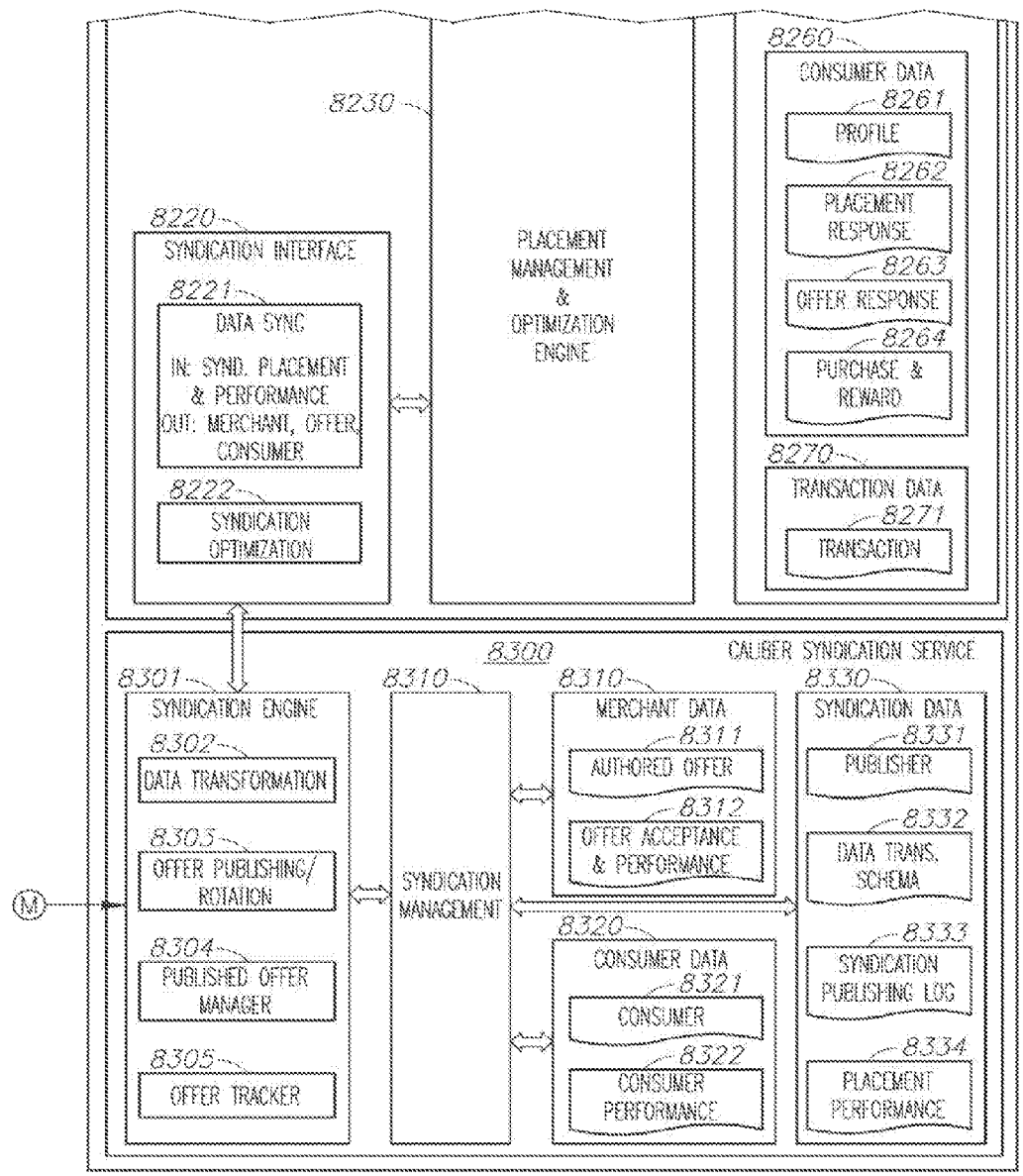

These functions of the system are provided by the components and tasks that are described in more detail below with reference to FIG. 1. A service model of the system shown in FIGS. 1-7 while a syndication model of the system shown in FIG. 1 is shown in FIG. 8.

In one exemplary embodiment, the system and method can involve these parties: an advertising publisher(s) (e.g., a newspaper, TV broadcast affiliate, interactive cable provider, satellite and/or IPTV provider and the like), (which can operate under a licensee and/or as a business partner of Caliber Data, Inc. for example, hosting a "service provider" component of the system), a plurality of merchants who sell products/services (who can include, but are not limited to, retailers, wholesalers, manufactures, and/or distributors of consumer goods/products), a plurality of consumers who buy products/services, and optionally a plurality of payment transaction services providers to facilitate transactions (e.g., VISA®, Mastercard®, and ACH Debit transactions) at time of purchase. The payment transaction services can also, in an exemplary embodiment, manage incentive reward calculations and/or apportion payments crediting the advertising publishers. The advertising publishers can include, but are not limited interactive media online, broadcast interactive media, and/or offline publishers to which ads have been syndicated, and/or technology service providers (e.g., mobile device, cable, mobile navigation systems, interactive TV, HD radio providers, etc.). Merchants affiliated with the system ("Merchant Affiliates") can publish and update their discrete sales offers in real time to the ad publisher, therein the "service provider", which can place ads online and, optionally qualifying the merchant affiliate for offline (print based) ad rotation.

In operation, consumers can find discrete sales offers from merchant affiliates that meet their needs at the time and location when and where they are needed from the ad publisher/service provider. The consumer who accepts the discrete sales offer from the merchant affiliate, as a discrete ad acceptance event, is a "Referred Consumer," i.e. referred to merchant affiliates to buy needed products or services. The ad publisher/service provider can track both the ad acceptance event and the discrete purchase transaction between merchant affiliates and the referred consumers, thus associating the discrete acceptance event and the discrete purchase (sales) transaction. Moreover, the integrated consumer tracking functioning enables merchant affiliates to contact, for example via email and/or other interactive media, consumers that accepted an ad through a discrete ad acceptance event, and issue offer expiration reminders and/or deal sweeteners to incentivize the consumer to consummate the transaction.

The ad publisher/service provider can charge the merchant affiliate, which sells the product/service based on the referral (and thus a discrete ad acceptance event linked to a discrete purchase transaction), a commission service fee for a discrete "settled" purchase transaction originating from the referral service. In addition a portion of the commission service fee can be applied to reward the referred consumer who buys the product/service through the merchant affiliate and the referral service. Once the discrete purchase transaction originating from the referral service is validated, the commission charged to the merchant affiliate, and the reward given to the referred consumer, the transaction is a called "settled," and the service is in toto a "transaction-settled referral and reward service."

FIG. 1 illustrates the component structure of the transaction-settled consumer referral and reward service system and method. In one embodiment, the system consists of three components: a Service Provider Component 101, and two remote components: a Merchant Component 201, and a Consumer Component 401. Each of these components is described briefly below and then described in more detail.

In the exemplary embodiment, the components, units and modules shown in FIG. 1 are implemented in software in which each module, component or module has a plurality of lines of computer code that, when executed by a processing unit, perform the functions and operations described below. In the exemplary embodiment, the service provider component 101 (and its unit and modules) is implemented as one or more server computers with one or more processing units, memory and connectivity wherein the computer code of the elements of the service provider component 101 are executed by the processing units of the one or more server computers. In the exemplary embodiment, a merchant component 201 is implemented as a computer system (located at the merchant site if the merchant supports this interface) that executes computer code of the merchant interface 203 to implement the merchant interface. In an alternative embodiment the system can be implemented remotely, for example but not limited to a phone line or facsimile line that permits the merchant to interact with the service provider. Similarly, the consumer component 401 can be a computer system that displays a user interface such as by using a typical browser application that executes lines of computer code (HTML code in the exemplary embodiment) to implement a consumer interface 403.

A Service Provider Component

In one embodiment the Service Provider Component 101 can be the main functional component of the system. The Service Provider Component 101 can interact with both remote components 201 and 401 and accomplish the objectives of the system. In an exemplary embodiment the service provider component can be hosted by the ad publisher.

A Merchant Component

In one embodiment a Merchant Component 201 can be a remote component that runs at the merchant side, facilitating needed communications between each of a plurality of merchants 501 and the Service Provider Component 101.

A Consumer Component

In one embodiment a Consumer Component 401 can be a remote component that runs at the consumer side, facilitating needed communications between each of a plurality of consumers 502 and the Service Provider Component 101. A consumer can be, for example, an individual human being that is capable of buying and paying for goods and services offered by merchants. To the service provider/ad publisher, the consumer becomes a "member consumer" after registering with the system. Once the system authenticates the member consumer, this consumer can be a "logged-in consumer". The logged-in consumer can be defined as one who can perform supported consumer tasks, such as but not limited to those described below associated with the system.

Component Structure

A. Service Provider Component: In one embodiment of the invention, the Service Provider Component 101 can contain three services: a Merchant Service 111, a Consumer Service 171 and a Transaction Service 151. Each of these services is described below in more detail.

1. Merchant Service: In one embodiment Merchant Service 111 can be a module in the Service Provider Component 101 that can be responsible for serving merchants (denoted by Merchant 501) through the Merchant Component 201 that is directly used by Merchant 501. The Merchant Service 111 communicates with the remote Merchant Component 201 to accomplish the merchant-serving tasks described below.

a. Merchant Tasks/i. Merchant Registration Task: As a first step, for example, before a merchant can publish discrete sales offers using the system, the merchant registers using a registration module 121 that is part of a merchant front end 112. Through the registration process, the merchant gives the service provider time-invariable information about the merchant and the business, including but not limited to business name, location, means of contact, business description, and the like. In an exemplary embodiment, the ad publisher controls the relationship between itself, as the host to the service provider and the merchant. Once registered, the registered merchant becomes a "merchant affiliate," and a merchant account and profile is created specific to the registered merchant affiliate. After registration, the merchant affiliate can use specified credentials (such as a unique merchant ID and password) to identify himself to the service provider. In this way, the ad publisher/service provider owns and drives the relationship between it and the merchant affiliate.

ii. Sales Offer Authoring Task: A merchant affiliate can publish and/or update discrete sales offers (through an offer authoring module 122 in the merchant front end 112) that can be specific to particular locations and times. The merchant affiliate can publish and/or update discrete sales offers any time when necessary. For example, a Seattle restaurant as the merchant affiliate can author an offer in the afternoon time about a dinner special for the evening of the same day. The offer can include name of the dish, a description, an image, today's special price, and hours this special is offered. The service provider/ad publisher can run automated approval processes and approved offers can be published in real-time to consumers. As described previously, automated "deal sweeteners" can be sent on behalf of the merchant affiliate to the consumer as a reminder and prompt to the consumer. For example, when an offer is due to expire, an automated email message can be sent to the consumer to add additional incentives which can be redeemed upon ad acceptance and a validated sales transaction. Moreover, the integrated merchant affiliate and consumer location tracking can deliver relevant sales offers which are in proximity to the consumer.

iii. Service Commission Specification Task: Before discrete sales offers can be published to consumers, a merchant affiliate can specify a service commission on a per-transaction basis through a commission specification module 123 of the merchant front end 112. The service provider can charge the merchant affiliate a specified commission for each discrete purchase transaction originated from the referred consumer to this merchant affiliate. The merchant affiliate can update in real time (re-specify) the service commission at any time in the life cycle of the advertised offer. The service provider can publish a lower bound minimum for each merchant affiliate, or by merchant industry category, merchandising category, sales location, or combined. If such a minimum is specified, merchant-specified commissions can be equal to or higher than the published lower bound.

Commission Bidding: The service commission can be determined, in one embodiment, using a commission bidding process. The bidding process can permit a service provider (SP) to specify a plurality of minimum values for sales commission fees. For example, a default can be set wherein qualified discrete sales transactions from the merchant affiliate can be charged a pre-specified minimum. In alternative embodiments, the sales commission fee can be specified based on one or more of the following criteria: (1) types of charges that can include at least (a) a commission based as a percentage of the discrete sales transaction value; or (b) a commission as a fixed fee per discrete sales transaction, regardless of the actual transaction value; (2) merchant location that can have a location hierarchy, such as a) Country=US; b) State=Washington; and c) City=Redmond and, for each location, the SP can specify a specific minimum commission; 3) merchant business category that can have a category hierarchy, such as level 1=Automotive, level 2=Repair and level 3=Body Repair; 4) a time period so that the SP can change the minimums at any giving time, such as weekday=1% and weekend=2%, and there can be multiple time dimensions working together such as dimension 1: Day of Week and dimension 2: Day Part, etc;

and 5) type of sales transactions or types of consumers (targeted commission) wherein the SP supports merchant affiliates to select different targeted commissions, such as a Regular Buys commission that pay the same commission for each buy and a New Buyers commission that pay SP a higher commission for each new consumer.

The system permits the service provider (SP) to allow and encourage local merchant affiliates to bid up their commissions above the specified and applied minimum values to gain preferential consumer referrals. Commission bid (expressed as a percentage), and the accrued value of commissions generated by a particular merchant affiliate can be used as input to an algorithm that can be used to determine, for example, print advertising insertion in newspaper or other print media. A portion of these commissions can also be shared as an incentive reward where a consumer is credited for example, on a membership card or cash donation to a local charity or on a membership subscription to the publishers media. In operation for example, assume that there are two merchant affiliates who are Chinese restaurants A and B in proximity to each other, offering the same type and quality of food with the same level of the service. Further assume that restaurants A and B specify to SP that they will pay 2% and 1%, respectively, for each discrete sales transaction that results from ad acceptance from a referred consumer. When a consumer in the neighborhood searches for "lunch specials in a Chinese restaurant" (assuming that lunch specials from A and B are similar), due to the higher commission SP expects to receive from A, SP elects to promote merchant affiliate A to the searching consumer more heavily (e.g., higher ranking in display order or higher number of ad display impressions) than are offered to merchant affiliate B.

One of many ways of this preferential referral is to display restaurant A's offers more prominently on a digital map based user interface. If the searching user is using textual search, SP can rank A higher than B on the returned result list. The service provider can allow a merchant affiliate to update its commission to the SP at any time, using any of the supported publishing methods (i.e. web interface or call center). The service provider can also provide commission optimization support wherein the SP can provide business intelligence data to constantly help merchant affiliates optimize (select the best commission structure and values), reflecting current market competition and consumer behaviors, for sales maximization. For instance, SP can suggest a merchant affiliate raise its commission to the market average to increase sales. In an exemplary embodiment, the data provided to merchants can be aggregated to include anonymous information thus protecting consumer privacy.

In an alternative embodiment the Merchant Bidding Process can also competitively "bid up" the cash-back offer that is made directly to the consumer. This is a direct way to reward and thereby incentivize consumers to join and register their payment card or other payment device with the service provider.

iv. Performance and Business Intelligence (BI) Reporting Task: The service provider (using a report and BI module 124 in the merchant front end 112) can provide merchant affiliates with, as one example, two levels of reporting: performance reporting and BI reporting. The performance reporting can be a standard level reporting service to merchant affiliates focused on the performance of the published discrete sales offers (such as number of transactions from referred consumers). The BI reporting can be a premium level of reporting that can include parameters such as market intelligence on competitors, consumers, and sales. For example, the BI report can give the merchant affiliate a measure on each offer, relative to other offers from the same merchant. This report can also, for example, evaluate the effectiveness of the merchant-specified commissions, relative to the merchant's competitors in the same market, which can help the merchant affiliate adjust the service commission if necessary. The reporting task is integrated to allow users of the system including consumers, merchant affiliates, and service providers/ad publishers, to track relevant, vital data including, but not limited to, ad Acceptances, qualified purchases and/or donations, ad performance parameters, and the like.

v. Billing Task: This task (implemented using a billing module 125 in the merchant front end 112) enables the service provider to bill merchant affiliates on consummated, discrete sales transactions from referred consumers. Once the service provider validates the discrete sales transaction accomplished between the merchant affiliate and the referred consumer, this task is executed to charge the selling merchant affiliate with the pre-defined service commission associated with the discrete sales offer.

vi. Merchant Service Functional Modules: As depicted in FIG. 1, the Merchant Service 111 can consist of three functional modules that work together to accomplish the above-mentioned merchant service tasks. These modules are the Merchant Front End module 112, a Merchant Management module 113, and a Merchant Data module 114.

vii. A Merchant Front End module: In one embodiment the Merchant Front End module 112 is one means by which a merchant affiliate can interact with the Merchant Service of the service provider to accomplish the above-mentioned merchant affiliate tasks. It contains at least one functional unit for each of the merchant tasks, namely:

1.1. Registration unit: A Registration Unit 121 allows merchants to self register with the system and become merchant affiliates. The registration unit can be implemented in software and can perform registration steps that include creating a merchant account with owner credentials. The unit also allows the merchant affiliate to create a plurality of business associates and assign them with credentials. During the registration, a merchant signing up can also specify the transaction tracking options, such as credit card terminal tracking, service provider's own virtual terminal tracking, manual tracking, etc. In this process, the billing procedure is set up so that the service provider can properly charge and withdraw funds for commissions earned. The registration process can also include initialization steps in which the registering merchant can create a business profile and set up commission and consumer incentive reward plan(s). During the registration process, the new merchant affiliate can also elect to create and publish special offers as well as creating and publishing a merchandising catalog (for example published as "regulars" or "regular offers" in the system). The registration element can work with supported Merchant Interfaces 203, including via internet on desktop computers and mobile devices. In addition to the exemplary software implementation described above, merchants can also use other means of business communications (such as telephone fax, or mail) for assisted registration, in which the service provider completes the actual registration on behalf of the signing merchant, either in near real time such as over the phone or offline or in near real-time such as upon receiving a paper form filled by the merchant in fax or mail. Thus, the merchant can choose the easiest way to register with the service provider, limited by the Merchant Interface 203 to which the merchant has access so that the system can be used by merchants with different interfaces including online merchants and offline merchants.

1.2. Offer Authoring Unit: An Offer Authoring Unit 122 can be implemented as a component of system software that allows merchant affiliates in a self-serve mode to create, update, and publish their discrete sales offers. Offers can be a static business profile, semi-static regular merchandising information, and dynamic (changing with time or valid in a specified time period) special offers. The offer authoring software can be implemented in a plurality of formats to accommodate supported Merchant Interface 203, including web and mobile publishing. Alternatively, it can be implemented in live assisted—mode, for example, when the service provider, through a live operator and/or through Intelligent Voice Recognition system (IVR) call-center, assists merchant affiliates via telephone call as they complete the publishing of an offer or the constraints associated therewith using Merchant Interface 203. Through the assisted mode of merchant self-publishing, internet access by the originating merchant affiliate is not required, making it possible for offline merchant affiliates (brick and mortar businesses without any web or internet presence), to still benefit by using the system.

1.3. Commission Specification Unit: A Commission Specification unit 123 is an element in the system that allows merchant affiliates at any time, to specify and update their commission offers (within a given set of constraints), for each subsequent qualified purchase transaction made by consumers. As with other system elements described so far, the commission specification software can support a plurality of Merchant Interfaces 203, such as via internet or via mobile. In addition to working in a merchant affiliate self-serve model and being implemented as software based service, this system element can also work in a service provider-assisted mode, in which the service provider creates or updates the commission on behalf of the originating merchant affiliate. For example, as an alternative to using the service provider software, the merchant affiliate can simply use his telephone (or fax) to contact the service provider's call-center and verbally update his commission offer (which is entered as change to his account in the service provider database).

1.4. Report & BI Unit: A Report & BI Unit 124 can generate business reports to merchant affiliates, perform data mining across logged data from a plurality of input sources, and make suggestions to merchant affiliates on how to improve their sales based on automated analysis of the stored data. This element covers both merchant affiliate sales transaction bookkeeping and optimization. Basic reports can cover, for example, sales transactions and related promotional offer activities, and specify and/or suggest their causal relationship (which can be based on a statistical approach and/or time based association). Basic reports can include for example, merchant affiliate sales transactions, commission charges, consumer rewards, offer creation/updating and relationships between the foregoing based on timing. Advanced (premium) report/intelligence can also be produced by mining the logged historical data. Based upon the analysis (intelligence), the service provider can make sales optimization suggestions to merchant affiliates. For example, the service provider can suggest to the merchant affiliate an increase in their commission offer to thereby drive more consumer traffic and more effectively competing with encroaching competitors. Both basic (standard) reports and BI (premium reports) can be provided with or without a fee.

Figure 4A:
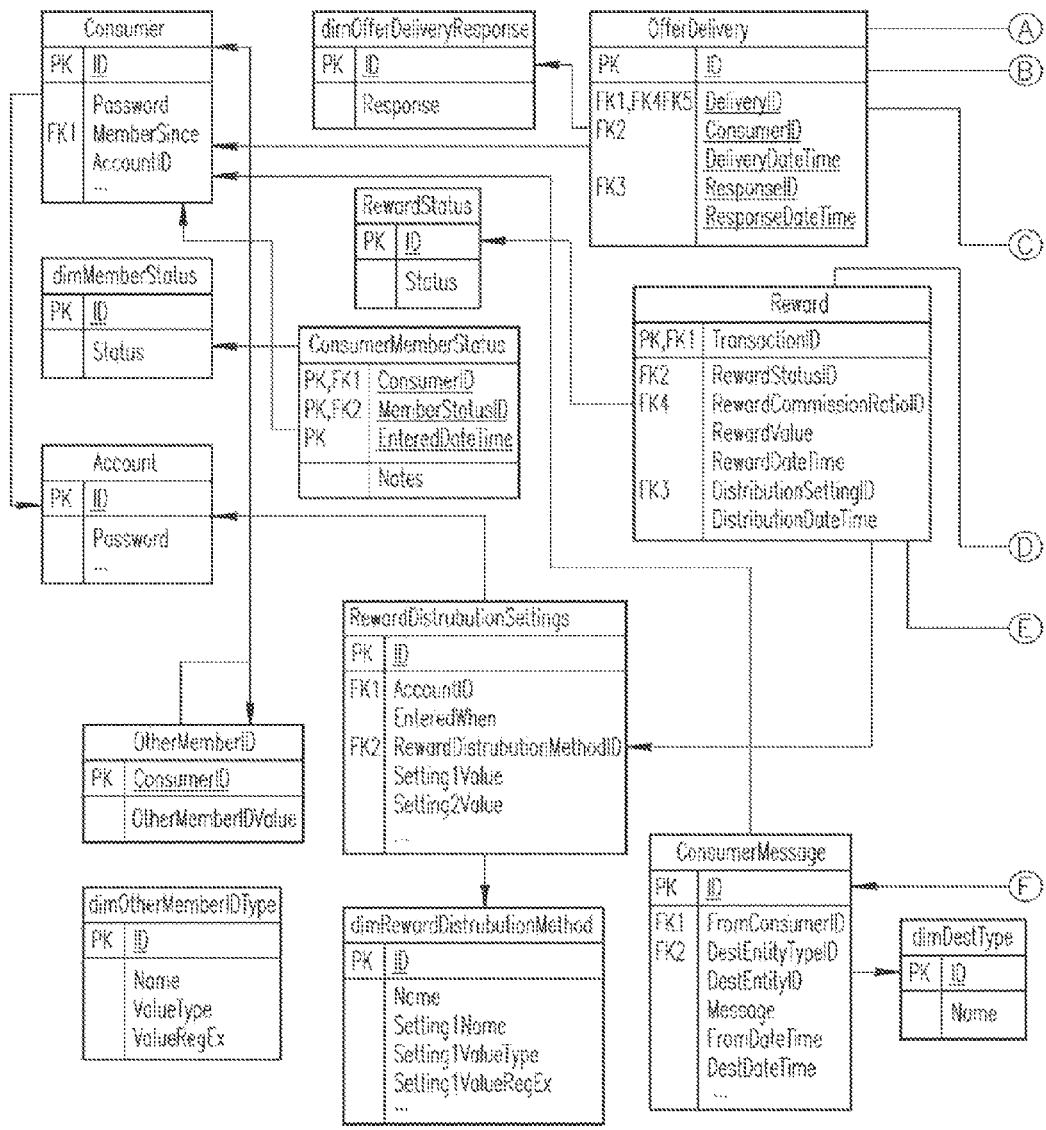
FIG. 4 illustrates an example of a merchant database schema for the system shown in FIG. 1.
Figure 4B:
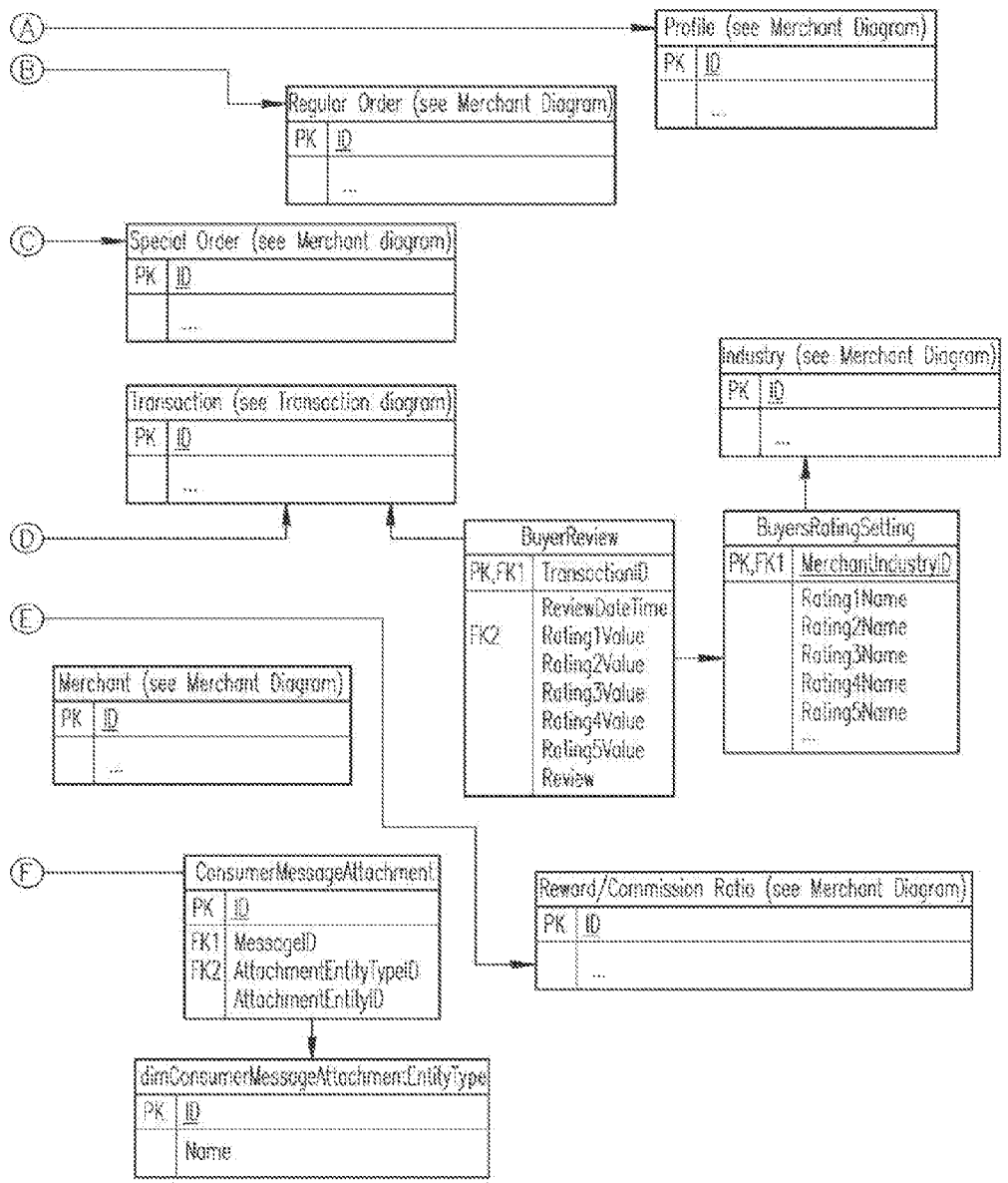

1.5. Billing unit: A Billing Unit 125 is a system element responsible for calculating, charging and collecting commission fees from merchant affiliates. It can include real-time charging (charge at transaction time) and delayed/batch charging (recurring monthly billing, for example). In a real-time charging scenario, the Billing Unit 125 collects the commission fee directly at the point of time when a qualified, discrete sales transaction occurs. In an offline charging scenario, the Billing Unit 125 bills the selling merchant affiliate the commission fees payable, and collects fees from the merchant affiliate on a regular basis. To an individual merchant affiliate, such capabilities of the Billing unit depend on the third party Payment Processor(s) that individual merchant affiliate uses. The Billing Unit 125 works with a plurality of Payment Processor 504 implementations. In the real-time billing embodiment, the Billing Unit 125 can work with (without limitation to) credit card processor, debit card processor, prepaid charge card processor, electronic check processor, third party membership processor, networked Point-of-Sale (POS) systems, etc. In the offline billing embodiment, the Billing Unit 125 can work (without limitation to) cash, paper check, non-networked POS systems, etc.

ii. Merchant Data Module: A Merchant Data Module 114, in a preferred embodiment contains persistent databases that store data for the Merchant Service. In particular, this sub-module can contain a collection of data sets for serving merchant affiliates. The stored data is managed by a Merchant Management sub-module 113 and meets the data needs for system elements in the Merchant Front Ends 112 sub-module. An example of the schema for an exemplary merchant database is shown in FIG. 4. The merchant affiliate databases of the merchant data module can include:

2.1. Profile Database: A Profile Database 141 that can store, for example, time-invariant merchant affiliate data obtained through the registration process. In more detail, this is the data set that stores merchant affiliate account and profile information, including but not limited to owner account and credentials, associate accounts and credentials. Business profile data can contain least frequently changing business descriptions, such as business name, location, logo, business hours, contact information, etc. The Profile Database 141 can store business profile data also including, but not limited to merchant affiliate set-up configurations for sales transaction tracking and billing, merchant affiliate rating and/or a merchant affiliate "recommendation" Data. Exemplary merchant affiliate recommendations can be issued by consumers that have completed valid discrete sales transactions with a particular merchant affiliate (to minimize erroneous or fraudulent rating entries). Merchant ratings (or "recommendations") can be shared in a plurality of ways between consumers, either within the service provider hosted by the ad publisher, and/or in another example, at established third party social networks such as http://www.myspace.com. The merchant affiliate recommendation and review functionality, can, in a preferred embodiment, use the point of the discrete sales transaction to track consumer satisfaction. In an exemplary scenario, tracking of the offline purchase transaction is used to control merchant review process via a consumer interface provided by the service provider—limiting it only to those customers that made a purchase, wherein an online tracking of purchases provides credibility and reliability to merchant review by a consumer. The system delivers this same credible merchant review capability to offline brick and mortar stores and then can also measures repeat transactions as a percentage of business—providing completely objective measure of satisfaction.

2.2. Authored Offer Database: An Authored Offer Database 142 can store discrete sales offers authored by merchant affiliates. Merchant affiliates can also publish to this database when updating their discrete sales offers. The Authored Offer Database stores data such as descriptions and the status of at least two types of discrete sale offers: "regular" offers and "special" offers. A regular offer can be, for example, data items related to less frequently changing discrete sales offers of product or service item(s) with less frequently changing pricing. A collection of regular items can be, for example, a menu in food and drinking service industries, a catalog in retail, etc. The Authored Offer Database 142 also stores data sets containing special offers, which can be, for example short-term discrete sales offers from merchant affiliates that have limited valid time periods. A temporary price reduction in milk for today before the store is closed is one example of a special offer.

It should be noted that discrete sales offers can be tied to pricing or pricing changes (discounting etc.). In embodiments of the invention, the discrete sales offer can be any message for attracting consumers to a place of business or otherwise incentivizing their acceptance of the ad. For example, the discrete sales offer can contain generic, non item or discount related information (such as free hot dogs), which the merchant uses to increase consumer traffic. Another example of a generic promotion is a restaurant owner who can publish an offer of free parking or about a special guest chef.

2.3. Commission Database: A Commission Database 143 can store commissions specified by merchant affiliates. The Commission Database stores data sets containing collections of commission specifications authored by merchant affiliates. The merchant affiliate can specify a monetary amount that will be the commission, which is stored as a commission specification data set, The commission specification data set can, for example, reflect the commission as a percentage of a qualified discrete sales transactions or a fixed value per discrete sales transaction, to be charged by the service provider to the selling merchant affiliate once the transaction is settled. The commission specification data set can also includes a set of transaction qualification criteria, such as time period, target sales, target buyers, etc. In an exemplary embodiment, one instantiation can be a 1% commission for each discrete sales transaction, and another can be $5.00 for each discrete sale transaction—which can also be time constrained to a certain period. Time constrained commissions can be, in one example, as those discrete sales transactions occurring between specified calendar dates. In is envisioned that there can be other embodiments of commission specifications, as long as the service provider receives a commission payment as a result of settled discrete sales transaction as between the selling merchant affiliate and the consumer resulting from an ad acceptance event. It is also envisioned that the service provider can require a minimum value for each type of commission specifications. For example, the service provider can require that the minimum commission charged to the merchant affiliate be no less than the greater of 1% or $0.50. The system allows for the service provider an inducement and incentive to merchant affiliates to bid up their commission specifications for preferential consumer referrals by the service provider. In essence, the service provider provides a motivation to the merchant affiliate to increase their commission relative to their competitors, by promoting merchant affiliate A more heavily to consumers than merchant affiliate B, when merchant affiliate A specifies a higher commission to the service provider, and provided that other comparable conditions are the same.

2.4. Performance Database: The Merchant Service can continuously track multiple aspects of performance of the published discrete sales offers, storing it as performance data in a Performance Database 144. The Performance Database 144 can contain merchant business affiliate performance data, including but not limited to the following: discrete sales transaction records (processed data from Transaction 162), consumer-buyer data, discrete merchant affiliate offer delivery data, and causal relationship data (versus time and other dimensions) as between discrete sale transactions and merchant affiliate offering events. In addition to raw records, it can also contain derived higher-level BI data and conclusions.

2.5. Billing database 145: A Billing Database 145 stores billing related data for each merchant affiliate.

2.5.1. Merchant Management Sub-Module: A Merchant Management Sub-Module 113 can be a central functional module of the Merchant Service 111, where functional logic and processes are implemented to accomplish the merchant tasks. This module takes merchant affiliate inputs from and sends merchant affiliate-bound information to the Merchant Front End module. Also, this module reads from and writes persistent merchant affiliate data to the databases in the Merchant Data module 114.

The Merchant Management Module, one sub-module controls work flow of tasks performed by different elements in the Merchant Front End when necessary. It also can centrally manage the data operations for data safety and security for the Merchant Service 111 module. Another functionality of the Merchant Management sub-module is to communicate with peer management sub-modules in other modules of the Service Provider Component 101, namely, the Transaction Management Module 159 and the Consumer Management Module 173, for data transport and task synchronization when necessary. One easy authentication example that demonstrates the flow control of the Merchant Management sub-module is to prohibit merchant-affiliate specific tasks, such as Offer Authoring 122, Commission Specification 123, Report & BI 124, and Billing 125, from being executed by non-registered, non-affiliated users that can be attempting to use the Merchant Interface. Service Provider administrators can also use the Merchant Management sub-module to centrally manage the Merchant Service 111. In addition, the Service Provider's merchant affiliate support team works through this management sub-module to help merchant affiliates and to complete merchant-related tasks in provider-assisted mode.

2.5.2. Consumer Service: A Consumer Service Unit 171 helps consumers to locate discrete sales offers and refers consumers to purchase the service/product from the merchant affiliates who authored the discrete sales offer. The Consumer Service Unit 171 also implements rewards to consumers based on based on their ad acceptance of the merchant affiliate and a settled, discrete purchase transaction once completed. The Consumer Service can perform three consumer-related tasks, namely, Registration, Referral, and Reward. The service provider serves consumers (denoted as Consumer 502) with this module through Consumer Component 401 that runs at the consumer side.

a. Consumer Tasks: i. Consumer Registration Task: Consumers who would like to earn rewards self register using Consumer Registration Module 181 that is part of a consumer front end 172. By executing this task, the service provider creates a secure account for each registered consumer. A consumer uses his account credentials to identify himself with the service provider once registered. The merchant affiliate is linked in a preferred embodiment through the service provider, thus the loyalty rewards and incentivization is administered through the service provider not the merchant affiliate per se. In the system as described, the registered consumer becomes associated with the service provider to receive rewards from the service provider. During the registration, a consumer can, for example, have an option to request that the service provider directly forward the reward to a third-party deposit account (such as a bank account) he/she designates, an authorized charity, and/or to some other legitimate contribution which can even include purchasing equity participation in the service provider business. Typically, the consumer will elect (by system default) to spend his rewards as discounts on future purchases from merchant affiliates that are part of the "in-network" as merchant affiliates with the service provider.

ii. Consumer Referral Task: A Consumer Referral task (implemented using a referral module 182 in the consumer front end 172) accepts and processes consumer inputs describing a need (or item search request), including the product or service category of the need, time and location constraints, etc. It then searches published merchant affiliate offers and returns to the consumer the best matching merchant affiliate offer(s). The service provider then provides a plurality of methods (via user interface) to direct the consumer to the merchant affiliates physical location, and/or in the case of a service provider, (i.e. a plumbing service); the system can direct the merchant affiliate to the consumer. The Integrated merchant and consumer location tracking function can also be used to deliver relevant merchant affiliate ads in proximity to consumers. Additionally integrated consumer preference controls can enable automatic notifications ("alerts"), for example via email and/or SMS, when consumer searched items are located by the system, thus enhancing the reporting function.

iii. Consumer Reward Task: Once the service provider validates (substantiates) that a valid sales transaction has occurred between a merchant affiliate and a referred consumer, the Consumer Reward Task is executed to reward the buying consumer with, for example, a reward of monetary value.

b. Consumer Functional Modules: The Consumer Service consists of four functional modules: the Consumer Front End 172, a Consumer Management module 173, a Merchant Data module 174 and a Consumer Data module 175.

i. Consumer Front End module: A Consumer Front End Module 172 is the module that the Consumer Service uses to interact with consumers. It contains three functional units, each serving one of the above-mentioned Consumer Service task.

1.1. Registration unit: A Registration Unit 181 is the front-end component that consumers interact with to register their unique identification and account information. This function also keys the unique identification number on their member card to their account and serves to track the source of their card so that the service can track the source that referred them into the network. Because the service provider/ad publisher controls the merchant relationship, the card tracking functionality is integral to one embodiment of the incentive reward system, promoting the merchant affiliate and consumer membership referral process. An example of the data flow in this process is: Account creation, Consumer-Member creation, Consumer-Reward Distribution Set-up, and Membership Exchange. In this implementation, a new user first creates a consumer account. The new user can then add one or more additional individual users to the consumer account. Registered members can share the consumer account but can be assigned with different member IDs. Being in the same account, the registered members can collectively pool their rewards together. At this step, consumers can set up, for example, aliases, such as using their phone numbers or email addresses as aliases. In a next step, registered member specifies how the service provider is to distribute reward for this consumer account. There is a plurality of ways that the service provider can support reward distribution, including but not limited to using reward for next purchase. There can also be multiple sub-options, for example: a. closed-loop transaction restriction, i.e., using reward as future discounts at the issuing merchant affiliate; b. open-loop transaction, i.e., using reward as future discounts at other in-network merchant affiliates, c., distributing reward as cash, d. distributing reward as direct deposits into specified financial institution, and/or e. directing rewards to third parties such as authorized charities, designated savings accounts, lottery pools, investments (including but not limited to equity purchases in the service provider, etc. As another step in this implementation, there can be membership exchange. By indicating willingness as a participant, the registered consumer's membership can be associated with memberships in other consumer networks (e.g., credit cards, grocery cards, etc.). It is envisioned that in such an embodiment that when such a registered consumer, makes a qualified discrete sales transaction with merchant affiliate, the registered credit cards or grocery cards can be recognized and used as proof of being a registered consumer. The service provider uses a plurality of cash back and incentive reward to induce registered consumers to participate and register their cards. Registration of cards by the registered consumers provides for tracking of both ad acceptance events with merchant affiliates and also tracking purchase transactions via bank cards and/or other payment devices (i.e. mobile computer and cellular devices).

1.2. Referral unit: A Referral Unit 182 is the front-end component that consumers interact with for the purpose of tracking and validating the identity of the person (registered consumer or merchant affiliate) that referred them to join the system. This element utilizes merchant affiliate data, consumer requirements requested (through Consumer Interface 403 for example), and consumer profile data sets as stored in the consumer data module 175, to find matching merchant affiliates and offers, and deliver the resulting information to the registered consumer. If the registered consumer is interested in the offer, the registered consumer can, in one example go to the merchant affiliates physical location to transact a purchase.

Merchant affiliate data used by the referral unit 182 can include profile data, reward levels (reward being a portion of specified commission), offers (regulars and specials), as well as other merchant affiliate demographics and shopping behavioral data.

Registered consumer requirement data acquired by the system can include for example: good/service description (as expressed as keywords or concepts), location proximity (either manually input or detected on computing device running the Consumer Interface 403), when (a time constraint indicating when the item is required), price range (of the product or service seeking), review/ratings (of the selling merchant affiliate and/or products/services being offered), etc. Registered consumers can be permitted to customize or to set preferences for the user interface that tailor it to the way they like to enter data, (i.e. can set default field values, reorder the input form, etc.). Moreover, integrated consumer preference controls enable automatic notifications, wherein a registered consumer can determine how and when they wish to be notified. In exemplary embodiments, the registered consumer's need can be given as a request and/or captured. A need submitted to the service provider by a registered consumer can is considered "given"; whereas a need detected by the service provider is considered "captured." A number of data mining (DM) and information retrieval (IR) algorithms can be applied to rank offers and offering merchant affiliates by the given need of the registered consumer. In the system, one factor considered by such an algorithm is the merchant affiliates' commission specifications. The service provider can, for example, more heavily promote registered consumer traffic (e.g., by featuring the ad with greater frequency or more prominence), as compared to another merchant affiliate's offer for a similar item or service that offer a lower commission level. The referral unit 182 can support both "soft referrals" and "hard referrals." A soft referral can be considered successful and validated when a sales transaction is completed between a merchant affiliate and a registered consumer, regardless of whether this transaction is directly the result of a ad acceptance event related to a specifically advertised item or service. A hard referral, in contrast, requires a proof of a discrete ad acceptance event to a specific offering from the merchant affiliate before a discrete sales transaction can be validated. Merchant affiliates can determine which means of referrals to use; and this information can be published to the consumers.

1.3. Reward Unit: A Reward Unit 184 is the front-end component interacting with registered consumers for the reward task. This component is also capable of wiring (electronically transferring or delivering) registered consumer rewards with a registered consumer-specified Reward Depositary 505 (such as bank accounts). In particular, this system element executes the registered consumer rewarding program, based on each registered consumer's qualified purchases with merchant affiliates. In one implementation, the service provider can specify a fixed ratio between reward and commission. That is, in this embodiment, the service provider returns a fixed portion of the received commission fee from the selling merchant affiliate to the buying registered consumer. For illustration's sake, assume this ratio is 113 in this application. In this implementation, the reward step is implemented as follows: (1) A registered consumer makes a qualified purchase from a merchant affiliate; (2) The service provider charges the selling merchant affiliate a commission fee at the pre-specified level or ratio; (3) The selling merchant affiliate pays the commission fee; and (4) The service provider forwards 113 of the received commission fee to the buying registered consumer as the reward for this qualified purchase made in step 1. The Reward 184 element can also distribute rewards earned by registered consumers to specified Reward Depository 505, as specified in the consumer Registration 181 element.

Figure 5A:
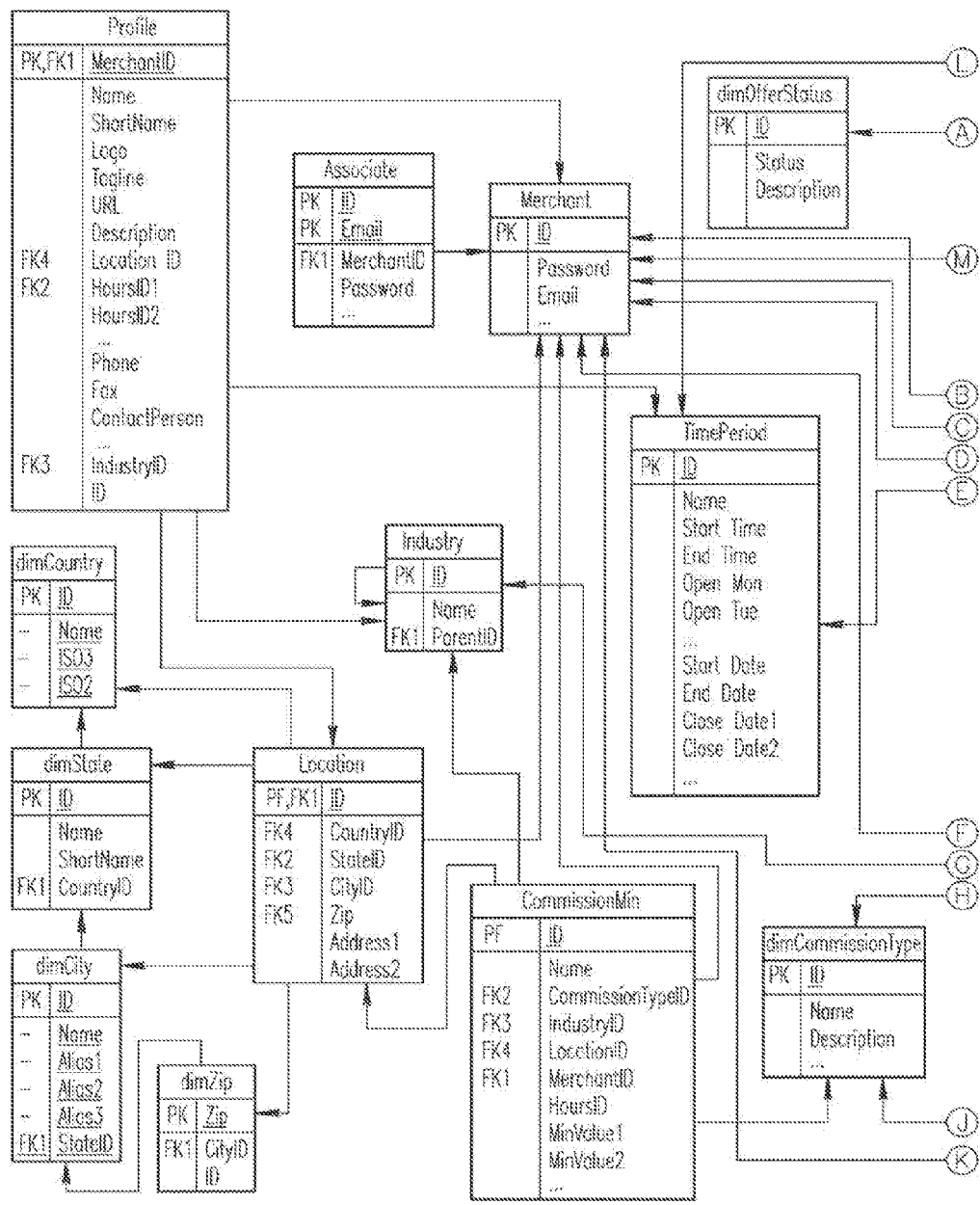
FIG. 5 illustrates an example of a consumer database schema for the system shown in FIG. 1.
Figure 5B:
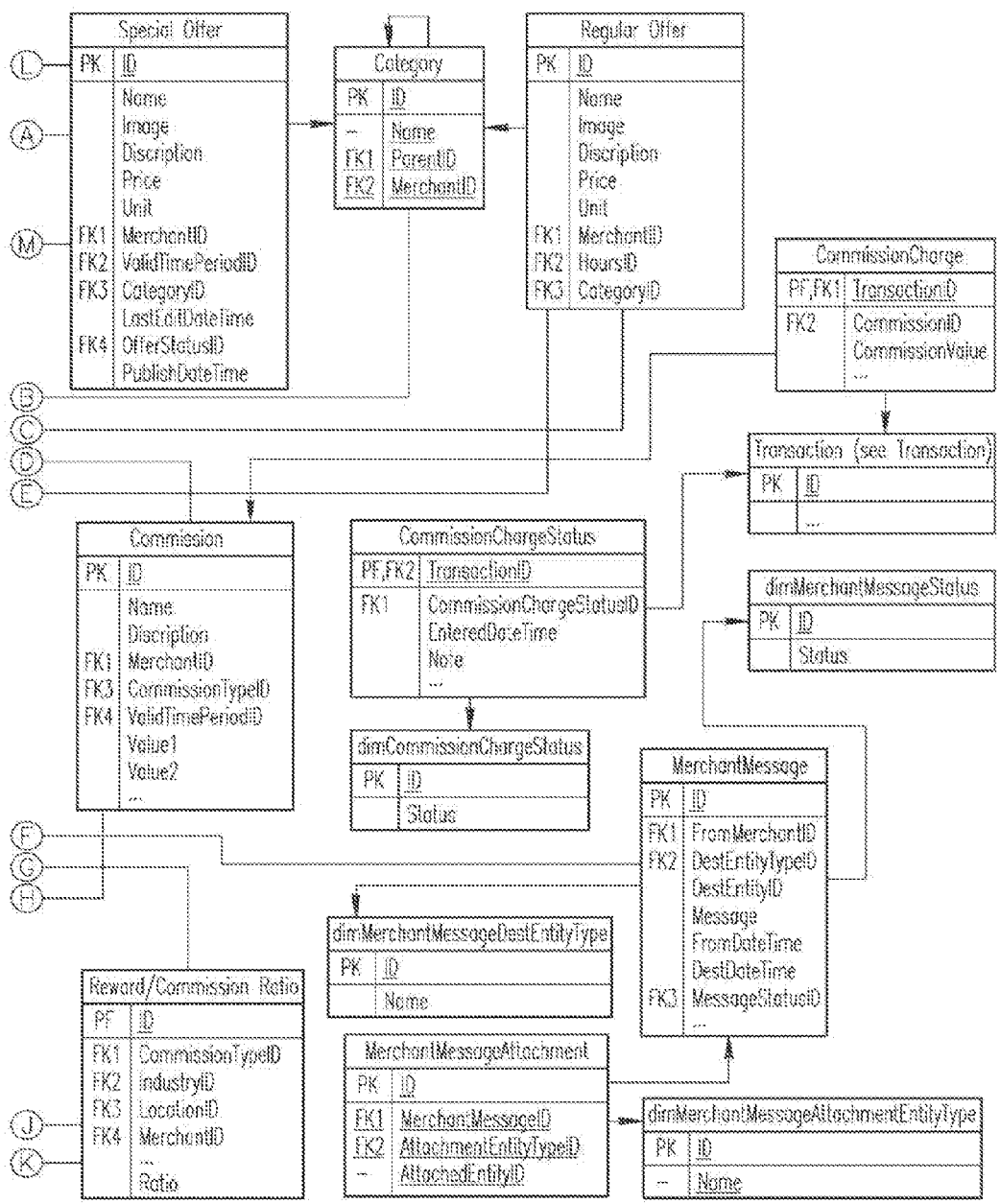

1.4. Merchant Data Module: A Merchant Data Module 174 in Consumer Service can store data from merchant affiliates published offers 191 to respond to consumer requests, thus resulting in referrals to the merchant affiliates. This module can contain a cache of merchant affiliate data that is used by consumer-related tasks. An example of the database schema for a registered consumer database is shown in FIG. 5. This module contains the Published Offer database 191 which can be a copy, either physical or logical, of the Authored Offer Database 142 in Merchant Data module 114 of the Merchant Service 111. It contains offers from merchant affiliates' that are approved by the service provider, which are available to registered consumers.

1.5. Consumer Data Module: The Consumer Data Module 175 is another data sub-module under Consumer Service 171, containing registered consumer profile and behavioral data. It can also store persistent registered consumer data, including two logical data bases: a Consumer database 192 and a Reward database 193.

1.5.1. Consumer database: A Consumer database 192 database can contain information for registered consumers, including a profile, account credentials, reward depository designation, etc. It can also contain behavioral data over time, as well as derived business intelligence data and findings.

1.5.2. Reward database: A Reward Database 193 can contain reward history for registered consumers who received rewards from the service provider. The data set can contain reward records, in lieu of transaction data stored in Transaction 162 data set. This data set provides the basis for consumer rewarding.

1.5.3. Consumer Management Module 173: A Consumer Management Module 173 is the central management module for the Consumer Service 171, where consumer-related logic and algorithms are implemented. The Consumer Management Module 173 communicates with the Consumer Front End module to get from and send data to registered consumers. It can also centrally manage the data operations for data safety and security for its parent the Consumer Service 151 module and thus writes to and reads from the Merchant Data module 174 and the Consumer Data 175 module. The Consumer Management Module can also communicate with other merchant and consumer services of the system in the Service Provider Component 101 namely, the Merchant Management Module 113 and the Transaction Management Module 173, for data transport and task synchronization when necessary. For example, the Consumer Management Module 173 connects with the Merchant Management module 113 in Merchant Service 111 for synchronizing the Published Offer database 191 with the Authored Offer database 142, as well as passing information from the Consumer Data module 175 to Merchant Service 111 for merchant affiliate reporting and billing purposes. The Consumer Management module can also have a direct connection to the Transaction Management module 159 of the Transaction Service 151 for transaction/consumer-related data exchanges.

Service Provider administrators can also use the Consumer Management Module 173 module to centrally manage the Consumer Service 171. In addition, the Service Provider's registered consumer support team works through this management sub-module to help registered consumers and to complete consumer-related tasks in service provider-assisted mode.

3. Transaction Service: In the preferred embodiment of the invention, the service provider does not control or own the actual purchase transactions as between the merchant affiliate and the registered consumer; therefore a Transaction Service module under the Service Provider Component 101 deals with purchase transactions between merchant affiliates and registered consumers. In exemplary embodiments of the invention, the selling merchant affiliate and the buying registered consumer can complete the discrete purchase transaction anywhere (online or offline) by any means of payment (cash, check, credit card, debit card, etc.). The system tracks, validates, and records those discrete transactions that occur between merchant affiliates and registered consumers in order for the service provider to correctly charge the selling merchant affiliate with a commission fee and pass on a portion of the fee to the buying registered consumer as a reward incentive. The Transaction Service 151 consists of the following tasks to track, validate and record qualifying transactions:

a. Transaction Tasks: i. Transaction Integration Task: A transaction integration task (implemented using an integration module 153 that is part of a transaction front end module 152) integrates transaction tracking with electronic means of payment settlement through a plurality of Payment Processors 504. A payment processor can, in some embodiments, be owned by the merchant, alternatively it can be owned or by a third party payment clearing house, and/or in still other embodiments can be an online or mobile payment service provider. With the consent of the merchant affiliate, the service provider can execute the Transaction Integration Task to integrate the Transaction Service with electronic payment processors/settlers the merchant affiliate uses and/or designates to consummate purchase transactions. Once integrated, the service provider can track discrete purchase transactions completed by the integrated processor/settlers. Note the system can also track transactions through payment systems not integrated with the service provider. The integrated tracking functionality can capture the discrete purchase transaction in real time at the point when the discrete purchase transaction occurs, whereas in a non-integrated tracking scenario, the buying registered consumer can report the discrete purchase transaction after it has occurred.

ii. Transaction Tracking Task: A Transaction Tracking task (implemented using a tracking module 154 of the transaction front end module 152) tracks discrete purchase transactions that occur between a merchant affiliate and a referred, registered consumer. When a payment processor is integrated with the Transaction Service, the processor can transmits information of a qualifying transaction to the Transaction Service in an automated fashion. For example, suppose this task is integrated with a credit card payment clearing house. In this exemplary embodiment, the service provider can track transactions instantly when they are settled by this clearing house.

The Transaction Tracking task can also track those purchase transactions, whose means of payment are either not electronic or not integrated with the service provider. The system can facilitate consumer-initiated tracking methods, in which the buying consumer (or the selling merchant on behalf of the consumer) reports the occurred transaction to the service provider after it the payment is settled. By supporting both integrated and manual transaction tracking, the system can provide its services to merchant affiliates and registered consumers, regardless of the specific means of payment settlement.

iii. Transaction Validation Task: Once a purchase transaction is reported by the Transaction Tracking Task, it is forwarded to a Transaction Validation Task (implemented using a validation module 155 in the transaction front end 152) to validate the transaction. This task is necessary to minimize fraudulent transaction reporting. In this task, the service provider of the system tests the truthfulness of a tracked transaction based on the transaction information reported.

iv. Transaction Recording Task:

a. Transaction Recording task: A Transaction Recording task (implemented using a recording module 156 in the transaction front end 152) receives information of validated transactions from the Transaction Validation Task, and records the information about this transaction into the persistent Transaction database. After a transaction is recorded by the service provider, the service provider can bill the selling merchant affiliate for a service fee and rewards the buying registered consumer.

b. Transaction Functional Modules: The Transaction Service Component can consist of multiple modules for executing the above-mentioned transaction tasks, including: the Transaction Front-End module 152, a Transaction Management module 159, and a Transaction Data module 161.

i. Transaction Front-End Module: A Transaction Front-End Module 152 interacts with merchant affiliate, registered consumer, and payment processor for transaction tracking. The Transaction Front-End Module can be system elements that can communicate with the Merchant Component 201, Consumer Component 401, and Payment Processor 504 for tracking, validating and recording sales transactions. It can contain functional units, one for each corresponding transaction task:

1.1. Integration unit: An Integration Unit 153 unit can integrate with the Payment Processor 504 for automated transaction reporting containing a plurality of software modules, working with a different Payment Processor 504, for tracking qualified transactions made thru the Payment Processor 504. For example, the Integration element can work with and track transactions occurring on third party credit card terminals, provider's own tracking terminal, as well as manual cash transactions. Pieces of the software can be embedded in payment processor hardware. This element works to ensure that the Payment Processor in use works correctly with a Tracking Unit 154.

1.2. Tracking Unit 154: A Tracking Unit 154 works with Payment Processor 504 for automated transaction tracking, and/or can works with registered consumers via the Consumer Interface 403 and with merchant affiliates via the Merchant Interface 203 for manual transaction/sales tracking. In an exemplary embodiments, it can has three categories of implementation: direct tracking from merchant via Merchant Interface 203, indirect tracking from third party Payment Processor 504, and direct tracking from Consumer Interface 403.

A merchant affiliate can use the service provider furnished Merchant Interface 203 to track sales transactions. In this scenario, the tracking element 154 can directly receive authenticated transaction data from Merchant Interface 203. The Tracking element 154 can also work with a plurality of third party Payment processors. In this scenario, the Tracking Element can receive transaction data from supported Payment Processor(s) 504, after the Payment Processor is integrated with the Integration 153 element. The Tracking element pushes data through the Validation element 155 and through the Integration 153. The Tracking element 154 works with a plurality of Payment Processors 504. The Tracking element 154 can also work with Consumer Interface 403 for transaction tracking. An example will be covered later in this section. The Tracking software can support at least two types of transaction tracking, for example, real-time or offline tracking. In real-time tracking, the software running on Payment Processor 504 can pass necessary data to the Tracking element 154 at the time a transaction occurs. Subsequent options (Validation 155, Recording 156) can also occur in real time. The end effect is that in a real-time tracking scenario, the transaction is tracked, validated and recorded as it happens. Real-time transaction tracking is supported by software integration. Another type of Tracking 154 is offline tracking, which can optionally require software and/or integration. For example, in the case of a cash transaction between a merchant affiliate and a registered consumer, the service provider can insert a validation code into each hard copy (print version) of an ad that is inserted or rotated into the newspaper which can then be entered for validation by a consumer via telephone (or web based VI). Another form of Tracking can be based on implementation of a set of user interfaces in Consumer Interface 403 to work on internet or mobile devices, so that the buyer registered consumer can indicate ad acceptance and/or the discrete sales transaction resulting from an offer of the merchant affiliate after it has occurred to the service provider via some communication mode, such as but not limited to, a Web page, an email, and/or a short transmitted message on mobile devices.

1.3. Validation unit: A Validation Unit 155 can test the truthfulness of tracked transactions based on the reported transaction data forwarded from the Tracking unit by performing validations against it to minimize possible frauds. The Validation Unit 155 performs cross checks on data received against known and/or trusted saved data. As one exemplary embodiment, the following illustrates a validation algorithm for manual transactions: (1) Service Provider issues to merchant affiliates a set of stickers, each printed with a unique ticket number and comes with a valid time period;

(2) When the merchant affiliate makes a sale to registered consumer, he gives the sticker with the unique ticket number to the buyer registered consumer to indicate ad acceptance and the discrete sales transaction has occurred; (3) The buyer registered consumer later can logs onto the system on Consumer Interface 403 and report the sales transaction by inputting the unique obtained ticket number, for example, by filling out an online form, (together with the name of the selling merchant affiliate and approximate purchase date and time, the information can be linked either manually or automatically); (4) The Consumer Interface 403 passes the reported transaction data (from buyer registered consumer) to the Tracking element 154, (5) the Tracking element 154 passes the data to Validation 155; (6) The Validation element 155 cross checks the received data (ticket number, selected merchant affiliate and approximate purchase time) against the Transaction data set that contains the original record of the unique ticket number, the issuing merchant affiliate, and the valid time period of the unique ticket number; and (7) the Validation element 155 invalidates a reported transaction when any of the cross checks fail. Note in this exemplary embodiment, the merchant affiliate can only specify commissions by a fixed monetary value, since a transaction value is not reported nor validated. In another embodiment, when the transaction data is originated from a third-party Payment Processor 504, the payment processing software can pass along necessary identification/credential data of the merchant affiliate (for example, processor device ID, associate/owner account used when processing the transaction, registered consumer membership, etc.) for Validation 155. The merchant affiliate can specify a commission fee by percentage of sales transaction value in scenarios where sales value can be tracked and authenticated.

Figure 6:
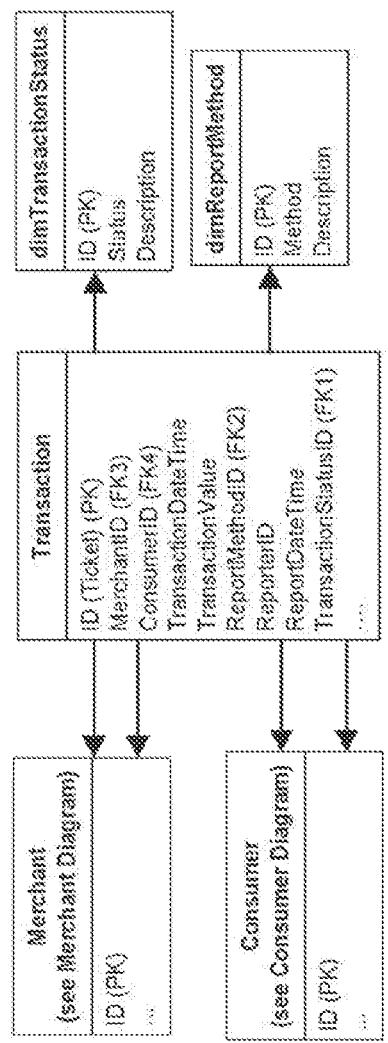
FIG. 6 illustrates an example of a transaction database schema for the system shown in FIG. 1.
Figure 7:
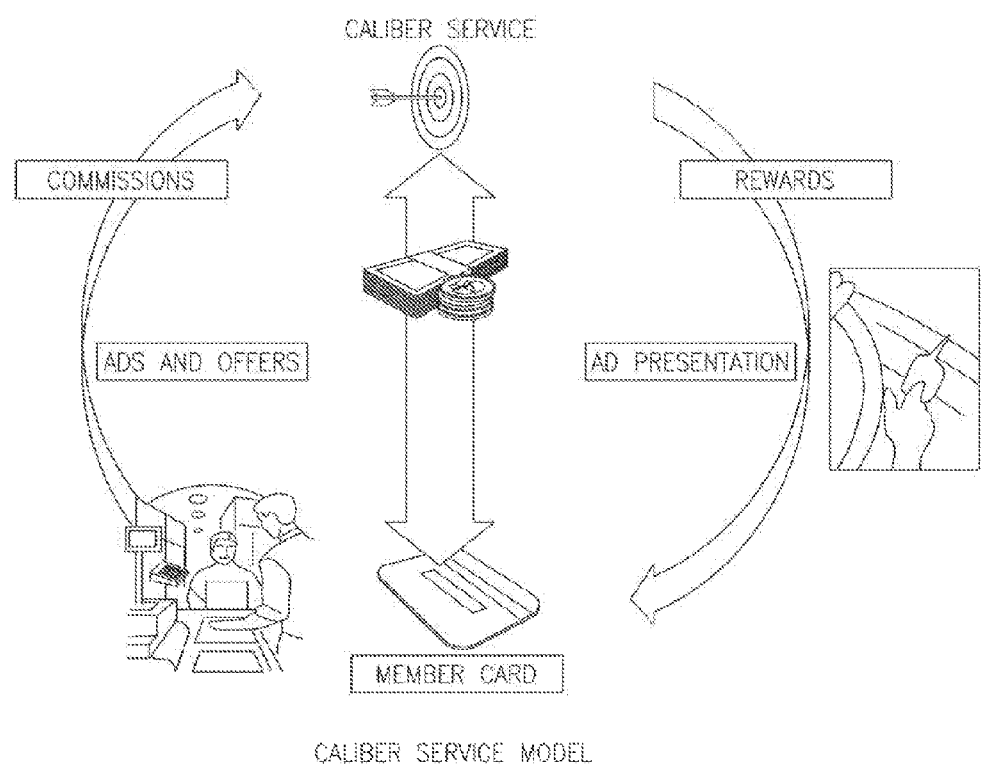
FIG. 7 illustrates a service model of the system shown in FIG. 1.

1.4. Recording unit: A Recording Unit 156 records validated transactions in the Reward database 193 to enabling merchant affiliate billing and registered consumer rewarding. In particular, this element writes the transaction record into the Transaction data set 162, along with other environmental values such as record time, reported by, validation results, etc.

c. Transaction Data Module: A Transaction Data Module 161 is the data sub-module under Transaction Service 151 module, storing transaction-related data in the following database:

i. Transaction database: The stored transaction records are stored in a Transaction Database 162 and are used by both the Merchant Service III and the Consumer Service 171. An example of the Transaction Database 162 schema is shown in FIG. 6. The Merchant Service uses the transaction records for merchant affiliate reporting and billing, whereas the Consumer Service uses these records to reward referred and registered consumers. In particular, this data set contains transaction records received from Tracking 154 and processed by Validation 155 and Recording 156.

ii. Transaction Management Module: A Transaction Management Module 159 is the central management module where transaction-processing logic and processes are implemented. The Management module can manage and communicate with the Front-End modules to receive, validate and record transaction information. The Transaction Management Module 159 can also centrally manage the data operations for data safety and security for the Transaction Service 151 module and thus reads from and writes to the Transaction Data Module to access transaction records. Another functionality of the Transaction Management Module 159 is to communicate with fellow management sub-modules in other modules of the Service Provider Component 101, namely, the Merchant Management Module 113 and the Consumer Management Module 173, for data transport and task synchronization when necessary. Service Provider administrators can also use the Transaction Management Module 159 to centrally manage the Transaction Service 111.

b. Merchant Component: The merchant component 201 can be in a preferred embodiment a remote component running at the merchant side that functions as an interaction bridge between the merchant affiliate 501 and the service provider. It consists of a Merchant Interface module 203. A merchant affiliate can include either the owner of a business or a business associate of the owner. The merchant affiliate, after logging in, can perform the tasks as supported in the Merchant Service Ill. Business associates of the merchant affiliate can perform transaction tracking, after authenticating themselves with the Merchant Service 111. To the service provider, a merchant becomes a merchant affiliate after registered. Once the system authenticates a merchant affiliate, this merchant affiliate is "logged in". A logged-in merchant affiliate is the one who can perform supported merchant tasks.

1. Merchant Interface Module: A Merchant Interface Module 203 interacts with the merchant affiliate and merchant affiliate's business system. It also can communicate with the Merchant Front End 112 to accomplish merchant affiliate tasks. A merchant affiliate can use one or multiple implementations of the module that are suited with him and/or his business management system. A module implementation can be either tangible (such as a Web UI) that is installed at the merchant affiliate end computer or intangible (such as a phone number to the service provider) that the merchant remembers. Another implementation of this merchant affiliate interface can be a merchant-side program that works with merchant affiliate's computerized business management system and communicates with the service provider. The Merchant Interface Module 203 can also provide programmable and manual implementations to work with the Tracking unit 154 enabling merchant affiliates to manually report transactions. The Merchant Interface Module 203 contains a plurality of user interfaces for merchant affiliates to interact with Merchant Service 111. The Merchant Interface Module 203 can work with the Merchant Front End 112 to perform merchant registration, offer authoring, commission specification, report sales, reporting and billing. The Merchant Interface Module 203 is also used by Merchant 501 and communicates with Merchant Service 111 on existing business communication channels used by Merchant 501. The Merchant Interface Module 203 can be implemented as software or provided as hardware. For merchant affiliates using internet for business communications, the Merchant Interface Module 203 can be implemented as a set of Web Pages or a web site. For merchant affiliates who do not have internet access for business (or personal use as well), phone and fax can be used in this element as the merchant affiliate interface.

c. Consumer Component: A Consumer Component 401 is a remote component running at the consumer side, facilitating communications between consumer 502 and the service provider. It consists of a Consumer Interface module.

1. Consumer Interface Module: A Consumer Interface Module 403 directly interacts with the registered consumer and communicates with the Consumer Front End 172 at the service provider site for accomplishing registered consumer tasks of the system. This module has multiple implementations, tailored to different communication technologies registered consumers use, ranging from those tangible, either a piece of software installed at registered consumers' computers/devices (such as Web VI, Mobile VI) and/or a piece of hardware issued to registered consumers with necessary software embedded (such as a dedicated device), or intangible (such as a phone number to call the service provider). A registered consumer can choose one or more implementations of this module that work best for him. Registered consumers also use this interface to interact with the Transaction Tracking unit 154 to report sales transactions by themselves.

In more detail, the Consumer Interface Module 403 contains a plurality of user interfaces for individual registered consumers to interact with the Consumer Service 171. Consumer Interface Module 403 can work with the Consumer Front End 172 to perform tasks such as consumer registration, referral (finding needed products/services offered by merchant affiliates), report purchases made from merchant affiliates, and getting reward for qualified purchases from merchant affiliates. The multiple user interfaces of the Consumer Interface Module 403 can be used with a plurality of personal communication channels, in which consumers can be connected with the service provider. These channels include, but are not limited to, the internet, the wireless network, and the telephony network.

Mobile Advertisements, Cable TV Advertisements and Map Display: The service provider and system can generate mobile advertising, cable television advertising and/or map displays with published advertisements that are displayed to registered consumers of the service provider. The third party advertising modality is engaged with service provider to present the offers from merchant affiliates to the registered consumers. Mobile advertising can occur over the web to a mobile device (a commercial example of this at located at http://air2web.com). A commercial example of cable television advertising is the Comcast® Classifieds advertising ON DEMAND® service in which cable viewers use their remotes to view local auto listings on Comcast's ON DEMAND® Service. The exemplary service described above can use both mobile and cable television advertising that can be provided by third parties as advertisement delivery channels and utilized by the service provider for getting merchant affiliate offers to registered consumers.

The service provider can also use digital map displays with advertisements to present the offers to the consumers. A number of commercial digital map service providers (notably Microsoft® Virtual Earth http://local.live.com and Google® Earth http://local.google.com) allow merchants to post their information on the map. In these typical systems, the merchant information shown on map stay at the contact information level, but some map providers allows linkage from the map to a merchant's web site. The service described above can use these existing map display systems with the advertisements of the merchant affiliates to present them to registered consumers of the service provider. For example, in one embodiment of the system, the service provider can host the map application and using the map API to overlay the merchant affiliate offer data on the map (self-hosted model). In another embodiment, the service provider can deliver merchant affiliate offers to a third party owned digital map (such as Google's® own map site) and have the third party present merchant affiliate offers to registered consumers (syndication model). In the service provider, map advertisements can be shown for local shopping specific search (the service supports more and specific parameters, such as time period and price range) and supports rendering real-time and specific offers on the map.

Newspaper Publisher's and Ad Rotation—Insertion In Print Media: In one exemplary embodiment, newspaper publishers that license or implement the service provider of the system are able to utilize their online consumer destinations as low resistance and no-risk draw for small and medium businesses (SMBs) to advertise, (i.e., eliminate up-front cost and ROI risk). In this scenario, the newspaper publisher can place the merchant affiliate advertisements in their online media (consumer destination). The newspaper publisher can additionally provide insertion to the printed newspaper or other hard copy media to act as an additional inducement for SMB's to advertise online (i.e. receiving offline print-ad exposure). The newspaper publisher may base this inducement on various criteria, for example on the commission bid of the merchant affiliate, the history of merchant affiliate-registered consumer transaction activity, and possibly other criteria.

Purchasing: As shown in FIG. 1, the system permits a Purchasing Transaction 503 to occur between the merchant 501 and the consumer 502. Purchasing is an action occurred between a merchant affiliate and a registered consumer, involving (1) transferring ownership or creating a lease of a product from or performing a service by the selling merchant affiliate to the buying registered consumer and (2) buying registered consumer pays a monetary value in exchange of ownership or lease of the product or rendered service by the merchant affiliate. The entire process is called a transaction. A discrete sales transaction is a sales or purchase transaction between the merchant affiliate and the registered consumer. When the transaction is linked to an ad acceptance event it is a qualified transaction or purchase transaction as between the merchant affiliate and the registered consumer. The validation of a qualified transaction, thereby qualifies it for commission fee and reward treatment. The monetary value changing hands is called the transaction value, sales value (from selling merchant's perspective), or purchase price (from buying consumer's perspective). A purchasing action can be settled and recorded by a Payment Processor 504.

Payment Processor: The Payment Processor 504, for the purpose of this application, is a third party provider of transaction services, a tracking device or method that tracks the occurrence of discrete transactions (that is, transactions occurring between the merchant affiliate and the registered consumer). It can be implemented by the service provider or by a third-party as a piece of software, a piece of hardware, or a combination of both. This application can support a plurality of Payment Processors, including those running in credit card terminals, those running on the internet, etc.

Figure 2:
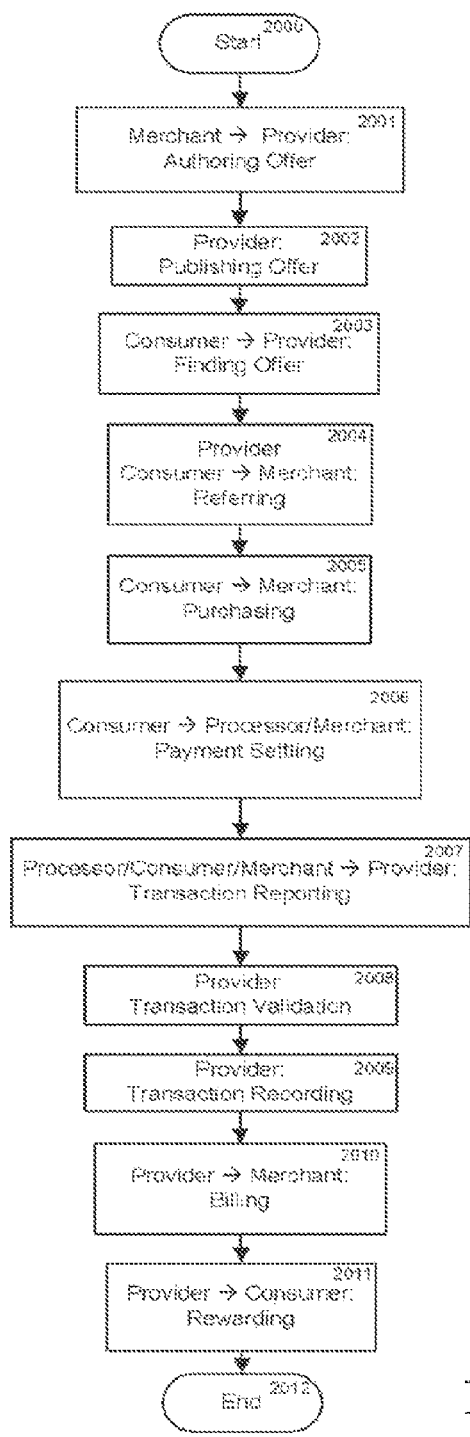
FIG. 2 illustrates an example of a purchase transaction workflow when using the system shown in FIG. 1.

WorkFlow: FIG. 2 illustrates the work flow of the transaction-settled referral and reward service in the preferred embodiment. The work flow specifies interactions among a merchant affiliate, a registered consumer, the service provider, and optionally a payment processor. The work flow begins at step 2000. First, a merchant affiliate specifies an offer to the service provider, by either authoring a new sales offer or updating an existing offer 2001. Then the service provider publishes this offer to registered consumers 2002. The registered consumer can go online and use the referral service to find an offer from the choice of merchant affiliates that match his needs 2003. Once the registered consumer accepts an ad offer in a discrete ad acceptance event, the registered consumer becomes a referred consumer and the service provider refers him to the selling merchant affiliate 2004. When the purchase transaction occurs it is in a merchant affiliate "establishment" and between this registered consumer and the selling merchant affiliate who published offer 2005. The actual purchase transaction can occur in the merchant affiliate establishment that can be, for example, online in a Web store or offline in a brick-and-mortar store. The registered consumer can preferably use a choice of a plurality of means of purchase payment. In the preferred embodiment, the service provider does not own the means of purchase payment settlement. The payment and settlement can be done through the selling merchant affiliate and/or a third party payment processor 2006. After the payment is settled, the registered consumer, the merchant affiliate (asked by and on behalf of the consumer) and/or the payment processor can report the discrete transaction to the service provider 2007. When the service provider 2007 receives the information about the discrete transaction, it can validate it 2008 to ensure that the data received is not a fraudulent transaction. If the discrete transaction reported is a valid one, the service provider records it 2009 as a validated and qualified transaction. Once the discrete transaction is recorded as a validated and qualified transaction, the service provider can charge the merchant affiliate a commission fee for the service rendered leading to the discrete transaction 2010 as between the merchant affiliate and the referred registered consumer. The service provider can also reward the buying registered consumer with a portion of the fee it receives from the selling merchant affiliate 2011.

Merchant Service Preferred Embodiment I. Merchant Interface Means: The system provides a plurality of merchant interfaces to enable merchant affiliates to interact with the service providers for executing merchant-related tasks and to report the occurrence of transactions. The merchant affiliate can select and use the interface most suited to his business communication means (Web, phone, etc.) and his business management means (computerized, manual, combined). In the preferred embodiment of the system, the following merchant affiliate interfaces are offered: a Web-based user Interface (Web VI) and a telephone-based user interface (Phone), which can use operator assisted, Intelligent Voice Recognition (IVR) to streamline placements and reduce administrative costs. A merchant affiliate, with internet access, can use the Web VI to interact with the service provider. A merchant affiliate, without internet access, can use a phone and call the service provider to accomplish the same merchant-related tasks in the system. The service provider can also provide means of programming interface for merchant affiliates computerized management systems to communicate with the service provider's computer system without any human intervention. This is one example of an integrated option.

II. Merchant Affiliation: To use the services provided by the service provider, a merchant needs to register with the service provider. Once registered, this merchant becomes a merchant affiliate to the service provider, and can publish his sales offers to registered consumers. After the registration, a merchant affiliate uses his account credentials to identify himself with the service provider.

III. Merchant Offer Authoring: The service provider of the system provides multiple means (as part of the Merchant Interface) for merchant affiliates to author and update sales offers. In the preferred embodiment, the system supports both manual and automated means of offer authoring and updating.

A. Manual: If a merchant affiliate has Internet access, he can use the merchant Web interface to author and update his offers. The service provider can also provide a telephone service so that merchant affiliates who do not have Internet access or do not use Web can make phone calls to author or make updates of his offers. A phone-in merchant affiliate can input data for example, by using keypad or utilizing voice recognition technology, or he can talk to a support person if needed. Manual authoring work best for merchant affiliates who have a limited number of offers and/or need to update offers no more than several times a day. It also works for merchant affiliates who do not have computerized management systems.

B. Automated For merchant affiliates who use computerized business management systems, have large numbers of products or services to offer, and need to frequently updates, their systems can be programmed to use a set of provided Application Programming Interface (API) to communicate with the Merchant Front End at the service provider side for automated offer authoring and updating without the merchant affiliates' intervention.

IV. Merchant Offer Specification In the preferred embodiment of the system, a merchant affiliate offer that is publishable contains at least descriptions in textual and/or multimedia format of these aspects: body and frame (aka constraints). An offer body describes the nature of the offer, including but not limited to the offer's purpose, functionality, design, features, and benefits. The body of an offer is less likely to vary, compared to the frame of an offer. The frame of an offer describes the sales scope of the body, including but not limited to the specifications of quantity, price, time period and geographical location that the price is to be honored. A frame of an offer normally varies more frequently than the offer body itself. Note that an offer can have one body and multiple frames, each of latter with different specifications. Updating an offer can mean updating the body, the frame or both.

V. Offer Publishing Once an offer is authored or updated, the service provider immediately runs an automated process to approve it or reject it by the required offer specifications and certain business rules. Once approved, the offer is published to registered consumers in real time. A merchant affiliate can also have delayed publishing, in which for an offer of his he can select a point in time at which this offer will be published to registered consumers.

VI. Merchant Service Fee (Commission) The service provider charges the merchant affiliate a service fee ("commission") after completion of the discrete purchase transaction with a referred consumer. The commission fee is pre-specified by the merchant affiliate. Generally, each merchant affiliate indicates what the commission fee will be to the service provider based on the multiple factors, such as, but not limited to: (1) a minimum threshold value established by the service provider and (2) a value which is comparable and/or competitive in the market where the merchant affiliate is located, whether online or offline. The service provider can define a minimum service fee for the merchant affiliate, for example, base on the category of merchant affiliate the geographical market, and/or for defined periods in time. Optimally, an offer would not published if the specified commission fee is not designated and/or is a lower rate than the service provider's set minimum value based on particular parameter for the merchant affiliate. The service provider can communicate to the merchant affiliate indicating when there are is at least one additional merchant affiliate offer in addition to its own, both meeting the registered consumer's needs. In an exemplary embodiment, to incentivize merchant affiliates to increase commission fee payments an offer (1) from a merchant affiliate A with a higher commission fee can referred to this registered consumer more promptly over an offer (2) from another merchant affiliate B with a lower service fee. Therefore, the merchant affiliate who designates a higher commission fee has the advantage of getting more registered consumer referrals from the service provider. Also, the system provides merchant affiliates with a plurality of commission fee models to use, each with its own consequences in terms of implementation and transaction tracking complexity. In the preferred embodiment, the service provider can offer these commission fee models to merchant affiliates: 1. Member-qualified and fixed-valued; 2. Member-qualified and fixed-percentage; 3. Offer-qualified and fixed-valued, and 4. Offer-qualified and fixed-percentage. Different transaction qualification criteria exist for member-qualified and offer-qualified models. Under a member-qualified model, the service provider charges the selling merchant affiliate a commission fee for each transaction, regardless of what is sold, as long as the buyer is a consumer member of the service provider's. In order to charge the merchant under an offer qualified model, in addition to the reward membership proof, the transaction record must also show that the consumer bought a product or service that is advertised by a published offer while the offer is valid. A member-qualified model simplifies the purchase transaction and purchase tracking, since the proof for qualifying such a purchase is reward membership. On the other hand, an offer-qualified model is more targeted since it attracts consumers to buy the advertised offers. But to qualify for such a transaction, the proof of the offer and ad acceptance is also needed at purchase. A fixed-percentage model and a fixed-valued model differ in how the commission fee is calculated. For example, under a fixed-value model, a selling merchant affiliate specifies a commission fee in a given monetary value (such as $0.50). The given monetary value is charged by the service provider per purchase made by the registered consumer, regardless of the actual selling price of the purchase. On the other hand, under a fixed-percentage module, a selling merchant affiliate can specify a percentage number (such as 5%) as the service fee rate. The service provider can charge this percentage of the actual selling price when a qualifying transaction is made. Comparing to a fixed-percentage model, a fixed-value model is easier to implement in transaction tracking since the transaction reporting does not need the actual sales price, nor does the service provider need to validate the purchase price. In the system, the individual merchant affiliate can choose the charge model to use, and this knowledge is published to consumers as part of merchant affiliate offering. The set of available fee models to each individual merchant affiliate can be limited due to the transaction tracking options utilized by the individual merchant affiliate. For example, to minimize transaction reporting fraud, the service provider can allow the merchant affiliate to use a fixed-percentage fee model when the individual merchant affiliate can work with manual tracking in which his consumers manually report occurred transactions to the service provider. Merchant affiliates can also select and/or customize their consumer reward plans, tailored for different business needs. A mature business, for example can select a plan to incentivize repeat buys from its existing consumer base. In this case, the merchant affiliate can choose a universal consumer reward plan, where the same reward is given to purchases, regardless whether these purchases are from new consumers or from existing consumers. In contrast, a new business needing to attract new consumers can adopt an alternative strategy. In the later case, the merchant can choose a New Buyers' plan, where the merchant affiliate can increase the reward level for purchases from new consumers. In the preferred embodiment, the service provider can also incrementally reward merchant affiliates with high sales volumes. For example a merchant affiliate reward can be given as a discount on the commission fee charged to the merchant affiliate. The system provider can defines multiple levels of commission fee discounts. For example in operation, the greater the sales volume of the individual merchant affiliate, the higher the discount applied to that individual merchant affiliate's commission fee. When a merchant affiliate reaches a certain discount level measured by the volume of sales originated from the service provider over a period of time, his service fee is reduced by the discount set forth at this level.

Consumer Service Preferred Embodiment I. Consumer Interface: The system provides a plurality of consumer interface to enable consumers to register themselves, to report transactions, to find offers, to receive rewards after purchases, and also provide feedback to merchant affiliates based on transactions with merchant affiliates. The registered consumer can select the best means of consumer interface working for him/her and can switch at any time. In the preferred embodiment, the set of provided consumer interfaces include but not limited to a Web-based user interface (Web VI), a user interface running on mobile devices (Mobile VI), phone calls (Phone), and postal mail services (Mail). If for example a registered consumer is working from a laptop or desktop computer with internet access, the Web VI can be the most convenient way to interact with the service provider, on which consumer related tasks can be executed. When the registered consumer is on the go, the Mobile VI can be a preferred best option. Alternatively, the registered consumer can also make phone calls to the service provider for executing consumer-related tasks. The Mail interface is mainly used as one means for registered consumers to report transactions to the service provider.

II. Reward Program Membership: A registered consumer is entitled to rewards in monetary value (e.g. cash back, subscriptions from ad publishers, for example) from the service provider for making purchase transactions from merchant affiliates, as a result of using the referral service. A secure account can be created for each registered consumer with proper credentials (such as a registered consumer ID and password). The credentials can be used to establish the identification of a registered consumer. Each registered consumer can be a member of the reward program sponsored by the service provider. A reward profile can be created that the registered consumer can access with his registration credentials. In another embodiment, the service provider can also issue a reward member card that the registered consumer can use to identify him/herself as a reward member when necessary (e.g., when making a transaction in cash at an offline merchant affiliate's establishment).

III. Finding Offers A registered consumer can start to use the referral service by querying the service provider to find published merchant affiliate offers that meet his/her needs. The registered consumer can use a plurality of means of the interactive consumer interface to query the service provider. For example, the registered consumer can use the consumer Web VI to query, use the mobile VI when on the road, or he can make a phone call to query instead. Similar to offer specifications from a merchant affiliate, in a preferred embodiment, a valid registered consumer query from a registered consumer can contain at least two aspects: body and frame (aka constraints). The body of a query describes the nature of a need, while the frame of a query describes the situation of the need, such as when and where the need should be fulfilled. In addition to having registered consumers input queries themselves, query specifications can also be formed by the remote Consumer Component (FIG. 1,403) and be transmitted to the service provider automatically, along with the rest of the query (if any) the registered consumer can input manually. One example of this type of automated query formation is when a registered consumer is using the mobile UI on his/her mobile device. In this case, the device location can be captured and transmitted to the referral service of the service provider, without having to ask the registered consumer to manually input his location.

IV. Referring Registered Consumers to Merchant Affiliates The preferred embodiment of the system uses a plurality of methods to refer the registered consumer to the published offers of the merchant affiliate to make purchase transaction or "referred purchase". The referred purchase entitles the buying registered consumer to get the offered price from the merchant affiliate and/or to receive the reward from the service provider. The referral methods range from those fully technically integrated with merchant affiliates' business systems to those support manual referrals. Depending on the commission fee model the selling merchant affiliate adopts, the method of referring and proof needed from the buying registered consumers vary.

a. A member-qualified fee model: Under a member-qualified fee model, there is no need to bring proofs of particular offers published by the selling merchant affiliate. In fact, as long as the registered consumer can prove to the merchant affiliate that he is a reward program member as a registered consumer (such as by showing to merchant or swiping through the merchant's card reader his reward member card), he is entitled to merchant affiliate published offers automatically. The purchases the registered consumer makes entitle him rewards, regardless what he buys from the merchant affiliate. In this scenario, the referral proof is the registered consumer's reward membership.

b. An offer-qualified fee model: Under this model, in addition to the registered consumer's membership, at the time of the purchase transaction the registered consumer is linked to a discrete ad acceptance event, wherein the registered consumer responds to the merchant affiliate's discrete offer by making a purchase transaction. The purchase transaction if thus linked is qualified as a referred purchase. Otherwise, if the purchase transaction is not qualified the purchase transaction is not a referred purchase and the consumer is not entitled for a reward. The format of ad acceptance, and proof of ad acceptance, can depend on the merchant affiliate, for example, depending on how the individual merchant affiliate is integrated with the service provider on the referral service or the lack of it. For example in one case when the merchant affiliate's computerized management system is integrated with the service provider, the service provider can report the ad acceptance event to the merchant affiliate electronically once the registered consumer accepts an offer online. Together the service provider can also transmit the registered consumer's reward membership data to the merchant affiliate. At the point of purchase, the registered consumer, in some embodiments, can present proof of membership to get the offer price as offered by the merchant affiliate. In alternative embodiment, a registered consumer harvests offers from merchant affiliates from various media sources, for example a registered consumer can clip from the newspaper insertion, or can download and print out the merchant affiliate offer and then present it to the merchant affiliate to consummate the purchase. Additionally the registered consumer can visit the merchant affiliate's physical establishment, verbally mention the published offer he found using the service provider and consummate the purchase. In the later case, a "verbal proof" need be indicated by the merchant affiliate as a sufficient and acceptable ad acceptance event to qualify the offer for commission fee referral reward treatment. The service provider can provide to registered consumers the referral methods and proofs needed to make qualified purchases, for example: (1) fee model for each merchant and (2) proof method for qualified referred purchases accepted by each merchant.

V. Consumer Reward: In one embodiment, the system can provide a cross-merchant (semi-open transaction loop), registered consumer reward program sponsored by the service provider. For example, for each qualified purchase transaction, the registered consumer who makes a purchase from the merchant affiliate receives a reward in monetary value, which is a portion of the commission fee that the service provider receives from the selling merchant affiliate. The service provider can alternatively elect to implement the registered consumer reward program in an open loop model (where reward proceeds are spent out of the network), a semi open loop model (where reward proceeds are used for future in-network purchases, regardless which network merchant affiliate the registered consumer buys from), and/or a closed-loop model (where a reward proceed can be spent toward future purchases from the issuing merchant affiliate). In one open-loop reward program, the service provider creates an account for each registered consumer, and adds monetary value of the reward to the registered consumer account once a reward is issued to the registered consumer. Upon instructions from a registered consumer, the service provider can transfer the amount of monetary value from the registered consumer's reward account to the registered consumer himself or to a third-party account designated by the registered consumer. For example, the accumulated reward can be wired to a deposit account of the registered consumer in a bank at one time or on a regular basis. In another example, the accumulated reward can be applied to a subscription service to receive more offers from the ad publisher. In addition to per-transaction rewarding, the system can also use a mechanism to further incrementally reward those registered consumers who have made large numbers of transactions over a period of time. The service provider can define a system of reward levels, for example, each with a different reward percentage that is the percentage of the service fee the service provider passes to the buying registered consumer at that reward level. In this example, the higher the purchasing level, the higher the reward percentage will be.

Transaction Service Preferred Embodiment: I. Validation Reporting Record: The service provider validates each reported purchase transaction before it can be recorded. Post validation, the selling merchant affiliate is charged the commission fee and the buying registered consumer is rewarded. A transaction reporting record is submitted to the Transaction Tracking unit (FIG. 1, 154) containing validation proofs from both the selling merchant affiliate side and the buying registered consumer side. The validation proofs needed vary depending on the fee model a qualified transaction is based on. The table in FIG. 3 lists data items generally included in a transaction record. In a preferred embodiment, the record contains correct authentication information of the selling merchant affiliate and the correct authentication information of the buying registered consumer. In the transaction area, the record optimally contains a Unique Transaction ID (UTID) as well as the time when and location where the transaction occurred. If the merchant affiliate uses an offer-qualified model, an offer ID (OID) can also be included in the record. When the merchant affiliate uses a price-charged model, the transaction reporting record can also contain a price figure. The following description explains these data items:

a. Merchant Account Authentication The selling merchant affiliate provides the correct authentication information to make the service provider trust the seller in the transaction and associate the transaction to the correct merchant affiliate.

b. Consumer Account Authentication: The buying registered consumer provides the correct authentication information to make the service provider trust the buyer in the transaction and associate the transaction to the correct registered consumer.

c. Unique Transaction ID (UTID) The service provider can generate UTID numbers that are unique and non-repeating. UTID can also be provided by the merchant affiliate or the third party transaction tracking provider, provided that they are not conflict with existing and future UTIDs.

d. Offer ID (OID) The service provider can assign a unique number to each published offer made by the merchant affiliate, which is the OID. The OID can be changed for each offer update. The reporting record optimally contains an OID if the selling merchant affiliate uses an offer-qualified fee model.

e. Time A time field records the transaction time.

f. Location A location field records the transaction location.

g. Price: A price field records the selling price in the transaction. The price figure is can be required when the merchant uses a price-charged fee model.

II. Transaction Reporting: A transaction reporting element elaborates on the transaction reporting step (FIG. 2, 2007) in the work flow. The preferred embodiment supports various methods to enable each of the involved parties in a referred transaction (the merchant affiliate, the registered consumer, and/or the payment processor) to report a transaction to the service provider. Exemplary and supported reporting methods can be categorized into: (1) reporting methods that are integrated with electronic payment settlement and (2) those that are not integrated. In an integrated scenario, the payment settlement system can harvest data (related to the transaction and the registered consumer) from the buying registered consumer at the time the purchase transaction is consummated. After the payment is settled, the payment settlement processor can electronically transmit a record containing the harvested data to the service provider via a provider-trusted communication channel. In a non-integrated scenario, the registered consumer can collect transaction and registered consumer related data, assemble a transaction record, and sends it to the service provider using one means of the consumer user interface (such as Web VI, Mobile VI, or Mail) under a trust-relationship with the service provider (such as requiring registered consumer log-in). Alternatively, if the selling merchant affiliate agrees to submit the transaction record on behalf of the buying registered consumer, the merchant affiliate can collect, assemble, and transmit the transaction record to the service provider. The merchant affiliate can use any means of the provider-trusted merchant VI for reporting transactions. In an another embodiment, transaction reporting can be accomplished by having both the merchant affiliate and the registered consumer co-report via their respective authenticated interface channels with the service provider. In the later case, each respective party can report a partial record. The service provider can then cross check the validity of the partial records and create a complete record if validation is successful. The following specifies supported scenarios for different reporting parties to report a referred transaction:

a. With integrated transaction reporting: In an integrated transaction reporting scenario, the system of the payment settler (for example, the merchant affiliate and/or a third-party payment processor) settles payment and transmits a transaction record to the service provider electronically. The payment settler creates a trusted connection with the service provider using the selling merchant affiliates' account credentials. Once authenticated, data items in the transaction reporting record are trusted by the service provider. The authenticated transaction record included data items from the registered consumer regarding the registered consumer's reward membership. As part of the payment settlement process, the registered consumer (buyer) gives registered consumer reward account credentials to the payment system. This can be accomplished by various mechanisms, including, but not limited to (1) member card swiping and (2) manual input of member ID. The payment system can record the registered consumer member credentials as part of the transaction reporting record to be transmitted to the service provider. If the merchant affiliate adopts an offer-qualified fee model, the payment system can optionally add the Offer 10 to the transaction record. If the merchant affiliate adopts a price-charged fee model, the payment system can optionally add the selling price to the transaction record. Both pieces of information will be trusted by the service provider, when received through a trusted channel. Integrated reporting is often the most convenient method to report a transaction. If the transaction record is valid, the selling merchant affiliate gets charged the commission fee for the service provided by the service provider and the buying registered consumer gets rewarded instantly. Optimally, integration reporting relies upon system integration between the settlement system and the service provider's computer systems.

b. Non-integrated transaction reporting-merchant reports on behalf of consumer: In this scenario, the merchant affiliate is responsible for collecting data about the transaction and transmitting the data to the service provider on behalf of the registered consumer. The merchant affiliate can use a plurality of means of the merchant interface to communicate with the service provider. The merchant affiliate can authenticate and create a trusted connection with the service provider to report the transaction. As a result, the merchant-affiliate-side data about the transaction is trusted by the service provider. Similar to the integrated transaction reporting scenario, the data the merchant affiliate needs from the registered consumer is the merchant affiliate's reward membership. The merchant either collects the data electronically using his computerized management system and/or collects the data to report manually, which depends on the collection technologies and the transmission technologies used by the merchant affiliate. For example, when the selling merchant affiliate has a computer onsite in the merchant affiliate's establishment that is connected to the internet, he can use service provider's "virtual terminal" tracking functionality. Virtual terminal tracking refers to a web page on the service provider's merchant site. After proper authentication, the selling merchant affiliate is trusted by the service provider, and can input necessary transaction data items on it then submits the transaction record.

c. Non-Integrated transaction reporting—consumer reports In a non-integrated transaction reporting scenario, the registered consumer can be responsible for collecting transaction data-reporting transaction data and submitting the transaction record to the service provider. The registered consumer can uses a plurality of means of the consumer interface (including Mail) supported to create a trusted access or relationship with the service provider and thereby submit the transaction record. As a result, the service provider trusts reported registered consumer-side data. To ensure that the registered consumer is not making up a transaction to report, the registered consumer can be required to obtain an UTID number from the selling merchant affiliate. The registered consumer can is some exemplary embodiments submit a valid price proof when reporting a price paid for a good or service purchased from a merchant affiliate. Depending on the means of the consumer interface used for reporting the transaction, the delay of merchant affiliate commission fee payment and registered consumer rewarding can range from very little (when the registered consumer uses Web or Mobile UI to report once transaction occurred) to much longer (days). The registered consumer reward incentive is, in fact, one means to encourage registered consumers to report qualifying purchases from merchant affiliates promptly.

d. Non-integrated reporting, merchant affiliate and registered consumer co-report: In a non-integrated reporting scenario wherein the merchant affiliate and the registered consumer agree to co-report a transaction record, the merchant affiliate can collect and report merchant and transaction data fields parts in FIG. 3, whereas the registered consumer can report consumer data plus a UTID. In this exemplary embodiment, each party to the transaction reports to the service provider its side of the data through respective trusted connection. Therefore, both halves of reports are trusted by the service provider. The service provider combines these half records by the UTID. The delay for merchant affiliate commission fee charging and registered consumer rewarding depends on how quickly both parties submit their parts of the transaction record. In summary, the various embodiments of the transaction reporting feature provided in this invention universally tracks occurred transactions, regardless of the purchasing channel used (such as online purchase or offline retailing), means of payment used (such as cash, check, credit card, debit card, etc), or the payment settlement used (such as merchant self-settlement, third-party settlement). This transaction reporting feature therefore maximizes the ability for serving merchant affiliates by referring registered consumers to their existing retail establishments making use of existing technologies and without needing to institute complex and expensive infrastructure modifications. For example, the system is based on an open architecture that leverages existing credit card terminals and low cost, non-proprietary magnetic card readers.

III. Transaction Validation: Requiring the reporting party to transmit data with proper authentication is the first step for validating a reported transaction. The service provider can uses the data reported regarding a transaction to credit the transaction to correct merchant affiliates and correct registered consumers. Validation suppresses transaction reporting fraud. It is unlikely to have an authenticated merchant affiliate report non-existent transactions since the service provider charges the reporting merchant for each transaction reported and validated. However, an authenticated registered consumer can report fraudulent or non-existing transactions for getting extra rewards. The following is one feature that the preferred embodiment can use to suppress consumer transaction reporting fraud. When a registered consumer reports a transaction, the consumer obtains a unique transaction ID (UTID) number from the merchant affiliate. Without the UTID or an unrecognized UTID, the submitted transaction record is invalidated. The UTID can be checked by the service provider and linked to the merchant affiliate. The UTID can also be linked to a specific point in time or a time range, indicating when the transaction with this UTID occurred, or should have occurred if it did not. In the preferred embodiment of the system, once the Transaction Tracking unit (FIG. 1, 154) of the service provider receives a transaction record over the authenticated connection, it passes the record to the Transaction Validation unit (FIG. 1, 155). The Validation process performs at least the following tests against the transaction record it received. A transaction submission can be validated when, a series of tests are passed, as exemplified below:

a. Merchant Validation: The selling merchant must be an existing merchant affiliate.

b. Consumer Validation: The buying consumer must be an existing registered consumer.

c. Transaction Validation: When a transaction record is reported by the buying registered consumer, the ID must be one that has been assigned to the submitted merchant affiliate.

d. Additional tests for offer-qualified models can include: The Offer ID (OID) must be the IDs of one offer published by the submitted merchant affiliate. The reported transaction time and location must be within the valid offer frame.

e. Additional tests for price-charged models: When the transaction record is submitted from a buying registered consumer, a valid sales receipt proof must be given and the price on the receipt must match the price reported.

f. Operation Set Up: In an exemplary embodiment, as a first step, the service provider sets up the Service Provider Component (FIG. 1, 101) and publishes the Merchant Component 201 and the Consumer Component 401 the merchant downloads and installs the tangible Merchant Component on his management system or take notes of the how to communicate with the Service Provider Component using intangible merchant interface. The merchant can use any of the support means to communicate with the service provider. Once the merchant finishes installing interfaces to communicate with the service merchant, he uses the preferred merchant interface to execute the merchant registration task. After the successful registration, the merchant becomes a merchant affiliate to the service provider. Then he can use the merchant services provided by the service provider.

If the merchant affiliate owns or is serviced by an electronic payment settlement system, he can use integrated transaction tracking after programming the settlement system with the provided transaction API. This can be accomplished by a registered consumer swiping his card at a participating merchant affiliate, associating this card and service with the Caliber Data program, (or third party branded) program duly licensed from Caliber Data, Inc. If the merchant affiliate uses a third party electronic payment settlement system and the payment settlement system does integrated transaction tracking, the merchant can set up using the integrated tracking by notifying the payment settler his merchant affiliate account credentials. The service provider can work independently with third party payment processing services for transaction tracking integration. Prior to publishing any merchant affiliate offers, a merchant affiliate needs to determine and notify the service provider his commission fee model and the fee schedule. A new consumer downloads and installs tangible Consumer Component 401 to proper computers or devices he will use to communicate with the service provider (Web UI, Mobile UI, etc). The new consumer can use any combination of the consumer interface to interact with the service provider. Then the new consumer executes the registration task and becomes a registered consumer. One option the registered consumer has is to specify a financial account where the service provider can wire the rewards to. The service provider can issue a reward membership card to the consumer once registered.

Use of Service: A merchant affiliate can execute any of the merchant-serving tasks at any time. Mainly, the merchant affiliate uses the service to publish and update sales offers, report transactions on behalf of requesting registered consumers if he agrees to do so, monitor performance of his offers, verify the effectiveness of his fee model and fee schedule, and pay service charges to the provider. The service provider provides monthly merchant statements to report and summarize related activities to each merchant.

A registered consumer can use the system for searching and obtaining offers from merchant affiliates that match his needs. The registered consumer can then go to the merchant affiliate to purchase goods and services. The registered consumer is rewarded by using a merchant affiliate by showing referral proof. The registered consumer can specify that the payment processor or the merchant affiliate report this occurred transaction, or alternatively the registered consumer can self-report the purchase transaction. The registered consumer has access to their reward account. The service provider can provide monthly consumer statements to report and summarize related activities to each registered consumer.

Alternative Embodiments

I. Payment Processor: An alternative embodiment is for the system to include its own Payment Processor (FIG. 1, 504), which will be tightly integrated with the Transaction Tracking unit 154. In this way, the service provider can offer merchant affiliates a default payment settlement option that can tracks referred transactions instantly. Another implication is that with an owned payment processor, the service provider can turn registered consumer reward accounts into credit or debit accounts in the way that the rewarded values can be used directly for future purchases via the owned payment processor. This also implies that issued reward cards can be used as credit or debit cards in retail transactions.

II. Consumer Referral: In an alternative embodiment, the service provider can add additional service features to the registered consumer referral service. For example, a shipping service can be implemented as one way to incentivize consumer referral. Instead of having to have a referred registered consumer go to a merchant affiliate to consummate the purchase transaction, once the registered consumer accepts an offer, the product or services can be shipped to the registered consumer directly. In another alternative embodiment, registered consumers who do not want to or do not have time to do product browsing in a brick-and-mortar store, the referral service can instruct the merchant affiliate to prepare the products for the registered consumer before he arrives at the store. The registered consumer can quickly pick up the products prior-selected through the referral service, pay, and go.

In yet another alternative embodiment, a reversed referral can be implemented. Rather than referring registered consumers to merchant affiliates, merchant affiliates can be referred to registered consumers as well. In a reversed referral scenario, the registered consumer can publish needs via the service provider (e.g., newspaper ads). Merchant affiliates then search for needs that they can fulfill, and deliver sales offers tailored to these needs identified by the registered consumer.

III. Merchant Offer Aggregation and Distribution to third Party Consumer Destinations: The system can also support scenarios where the service provider can collect offers from merchant affiliates and can deliver them to registered consumers via a plurality of online third party consumer destinations or third party content publishers, including but not limited to search engines (i.e., Google®, Yahoo®), content web sites, online directory sites, online community sites, and the like. In addition, the service provider can also deliver collected merchant affiliate offers to other third party consumer destinations through various delivery channels such as Short Message Service (SMS); delivering merchant affiliate offers for viewing by registered consumers on mobile devices, interactive cable TV, HD radio, and the like. The exemplary third party consumer destinations can use a plurality of different fee models for delivering merchant affiliate offers to registered consumers, including pay-per-click (PPC) and pay for listing fee models. In exemplary embodiments of the invention, the third party consumer destinations do not have a primary relationship, in contrast to the relationship that exists between the merchant affiliate and the service provider. Rather the third party consumer destination site can carry merchant affiliate ads originating from the ad publisher/service provider. These third party consumer destinations can provide exposure on their site and monetize their own revenue in various ways, for example, revenue can be generated indirectly; in return for additional search traffic generated by associating CPC and Banner and Display Ads. Alternatively revenue can be generated directly in situations where the third party consumer destination becomes associated with the primary publisher/service provider to share revenue when the ad acceptance occurs on their site. In the later case, the system provides the reporting and transactions capabilities to the third party consumer destination which also acts as the publisher/service provider; the system thereby provides the support to both parties for revenue sharing. The system may also provide necessary functionalities to support consumer registration and membership across these parties, as well as supporting universal and single sign-in membership across their web sites if parties agree.

In essence, the service provider can become a merchant affiliate offer aggregator and broker, delivering collected merchant affiliate offers to third party consumer destinations; and these third party consumer destinations can in turn deliver received merchant affiliate offers to individual consumers (who can be registered or non member participants). When merchant offers delivered via third party consumer destinations to registered consumers result in purchases at POS in stores, the service provider can agree to compensate the aggregator, broker, third party or other contributing consumer online or offline destination by crediting them with a portion of the received transaction fees. While the merchant affiliate offers are valid for anyone, the cash back capabilities can be available to registered consumers associated with the ad publisher/service provider. The system thus provides a method, (using a proceeds distribution module that is part of the transaction front end 152 in the exemplary embodiment), for distributing proceeds received from transaction fees from merchant affiliates to third party consumer destinations that contributed in driving consumers to the merchant affiliates stores to make purchases. The process can include a merchant affiliate offer collection process (described above), a merchant affiliate offer distribution process, an merchant affiliate offer delivery process, a purchase transaction process, a commission fee charge process, a delivery to purchase casual relationship determination process, and a proceeds distribution process. During offer collection process, the service provider collects offers from merchant affiliates. During the offer distribution process, the service provider delivers the collected offers to a plurality of third party consumer destinations. During the offer delivery process, at least one third party consumer destination presents a particular received offer to one or more consumers. In one embodiment, during the purchase transaction process (described above), registered consumer(s), who are influenced by the offer presented, go to the physical location (i.e. store) of the publishing merchant affiliate and make a purchase which can be captured on the service provider membership card.

During the commission charge process (described above), the service provider can charge the selling merchant affiliate a commission fee based on pre-determined rate, such as a percentage of the purchase price or as a fixed monetary value as described above. During the delivery to purchase casual relationship determination, the service provider and the third party consumer destination can determine the causal relationship from the consumer's actions on the third party consumer destination site (such as clicks on Search keyword ads or impressions on display ads) resulting in purchase transactions. Usage and transaction integration can be necessary in this step. During the proceeds distribution process, the service provider distributes a portion of the received proceeds from selling merchant affiliate to each of the third party consumer destinations for service during the merchant affiliate offer delivery process, based on the causal relationship determined from the delivery to purchase casual relationship calculation process. In the above method, the offer delivery process is another extension from the previously described offer delivery process since there can be a plurality of affiliated third party consumer destinations, in addition, for example, to the ad publisher/service provider's own consumer destination site.

In some embodiments of the delivery to purchase casual relationship determination and proceed distribution processes, the causal relationship from consumers' user actions on third party consumer destinations resulting in purchase can be determined statistically using data from both sides, the ad publisher/service provider and the third party consumer destination in aggregation. For example, a portion of the commission fee (called the disbursable portion of the fee) can be disbursed to contributing third party consumer destinations. The conversion denominator can be determined by the aggregated total number of registered consumer users' actions on published merchandising information across participating third party consumer destinations. The service provider can distribute a portion of the convertible fee to each participating third party consumer destinations, proportionally to the number of online registered consumer-users' actions occurring at individual third party destinations, relative to the total user actions aggregated across the all compared third party consumer destination. For instance, if there are 100 clicks that lead to one purchase from a merchant affiliate referred by a participating third party consumer destinations, then each click gets 1% (1 transaction divided by 100 clicks) of the disbursable portion of the transaction fee. Assuming one consumer destination A contributed 60 clicks and another destination B contributed 40 clicks, destination A and destination B each, respectively, get 60% and 40% of the disbursable proceeds from the service provider. Obviously, other and possibly more complex statistical algorithms and modeling can be used to determine the proceeds disbursement distribution of the transaction fee across affiliated consumer destinations.

In other embodiments of the delivery to purchase casual relationship determination and proceed distribution processes, online registered consumer users who performed online actions leading to resulting in-store purchases with merchant affiliates can be identified and linked to physical registered consumers who bought the product or service in the resulted transactions. In other words, the causal relationship can be determined at an individual consumer level. Such online user to offline buyer identification and linkage can be done explicitly, by identifying registered consumer users in a common identification system that applies to both online actions and in-store purchases, or create a linkage between an offline consumer identification system and one or more online user identification system(s).

One explicit identification option is that a consumer destination site can require users to log in using the service provider's consumer membership. The online user/in-store buyer linkage can also be created implicitly and/or algorithmically for anonymous online users. One can look at other parameters (other than, and/or in addition to user identification) of online user actions and in-store purchases to link a destination user to in-store purchases. Useable parameters can include time and location relationship between online consumer destination actions and in-store purchases. Another explicit identification option is that a third party consumer destination can install a specialized "click-recording" software detection and conversion product, either as an extension to their currently used method of consumer tracking, or as a new service that can either be provided by the service provider or developed by the consumer destination provider (subject to the design requirements of the service provider). This extension software will produce a unique identifier code for each click action by a registered consumer on the offer displayed by the consumer destination. This extension code (which can maintain anonymity of the registered consumer), is then transferred back to the service provider's database, where it is reconciled with a subsequent sale transaction by the specific registered consumer whose online "click" action generated the extension code. In this scenario, the online third party consumer destination can then be apportioned a percentage of the commission fee collected by the service provider. Therefore, in third party consumer affiliate network, as described above the ad "publisher" can have any combination of the following roles, for example a merchant acquirer (MA), a consumer acquirer (CA) and/or offer distributor (OD). These roles are summarized below in TABLE 1:

TABLE 1

| Affiliate Role | Role Description | Revenue Share of Commission Fee |
| --- | --- | --- |
| Merchant Acquirer (MA) | Sign up merchants | Paid with a portion ($MA) of received commission, when a resulting sale is made |
| Consumer Acquirer (CA) | Enable consumer registration | Paid with a portion ($CA) of received commission, when a resulting sale is made |
| Offer Distributor (OD) | Show offers to consumers | Paid with a portion ($OD) of received commission, when a resulting sale is made |

In an exemplary scenario the variable $C represents a pay per transaction (PPT) commission fee paid, the variable $R represents a consumer cash back reward, and a variable $F represents the service provider fee for each resulting sale tracked by the service provider. The shared revenue based on the total commission fee paid could be represented by Equation (1):

$$\$C = \$R + \$MA + \$CA + \$OD + \$F \qquad (1)$$

It is to be appreciated from the above scenario that if the ad publisher is both the merchant acquirer (MA), the consumer acquirer CA, as well as the offer distributer (OD), naturally that one entity is entitled to the sum of $MA+$CA+$OD part of its share in the commission fee paid. This is the financial incentive for each ad publisher to join a network and resume and/or assume as many roles as possible. Each variable in the above formula can be as small as zero. For example, the service provider need not pay out any $OD on OD sites where, for example, merchant offers can be published as organic content, i.e. free of charge. In a first exemplary embodiment, consumer accounts can be acquired as part of a Global Consumer Account System (GCAS) wherein the service provider "owns" consumer accounts and registration process, thereby facilitating a single-account per member system across all consumer acquiring (CA) affiliates. In other words, a consumer can register on CA site 1 but can also log on with the same account credential on CA site 2. The single Global Consumer Account System means a registered consumer can accumulate rewards anywhere he transacts business, as long as the third party consumer destination site, and/or merchant affiliate he patronizes is a CA site in the service provider network. In second exemplary embodiment, consumer accounts can be acquired as part of a Fragmented Consumer Account System (FCAS). In this scenario, individual CA publishers locally sign up consumers and these accounts do not cross. Various scenarios exemplify how the system would work in operation. In a first scenario merchant (M) becomes affiliated with ad publisher (P1) that posts the merchant affiliate offer (O). Consumer (C) sees offer O on a third party destination site (publisher P2) that publishes merchant offer (O). If Consumer (C) is a non-registered consumer who responds to the merchant affiliate offer published on a third party destination by making a purchase, the non-registered consumer can preferably register for an account with the service provider to qualify for consumer rewards. The consumer can become a registered user, for example, by associating his payment cards in his account. Additionally, the consumer can register with different parties depending on the revenue sharing scheme, as shown in TABLE 2:

TABLE 2

| FOR A NON-REGISTERED CONSUMER | | third Party Consumer Destination (P2) | |
|---|---|---|---|
| | | OD and CA | OD Only, Not CA |
| Publisher P1 | MA and CA | Consumer register on site P2 | Direct consumer to Site P1 for registration |
| | MA Only, Not CA | Consumer register on site P2 | Direct consumer to a default Service Provider site for registration |

In the event that the consumer is not registered and does not become associated, it is generally the merchant's responsibility to honor the advertised items (the "face value", excluding the cash back amount) to consumers, without a need for consumers to "accept" the offer. In fact, what consumer accepts is that "cash back." If a registered consumer responds to a merchant affiliate offer published on a third party destination by making a purchase, in an exemplary embodiment the registered consumer can elect to auto login across a plurality of affiliated network (CA) sites, so than when online shopping for example, and landing on another CA site, the registered consumer is already logged in.

TABLE 3

| FOR A REGISTERED CONSUMER | | third Party Consumer Destination P2 | |
|---|---|---|---|
| | | OD and CA | OD Only, Not CA |
| Publisher P1 | MA and CA | Login on site P2 and accept offer O | Redirected to P1, log in, and accept the offer O |
| | MA Only, Not CA | Login on site P2 and accept offer O | Redirected to a default Service Provider site, log in and accept the offer O |

The system described above and shown in FIGS. 1-8 can be used for newspaper advertising and provides cross-channel syndication and a method for converting online advertisements into offline (newspaper advertisements) in order to allow off-line ad publishers such as newspapers to leverage the online advertisement space to generate revenue. The newspaper embodiment of the system described above has the same advantages as those described above. In the system and method as described, the newspaper ad publisher acts in essence as a host to the service provider, thus the service provider becomes somewhat synonymous with the functions of the service provider as described above, as will become more apparent in the description below. FIG. 9 illustrates components of the newspaper advertising platform based on the system for a consumer referral and reward system shown in FIG. 1 wherein the newspaper advertising platform shares common components with the consumer referral and reward system shown in FIG. 1 and those components have similar names. As shown in FIG. 9, the system has components provided by the owner and/or host of the system (service provider) shown in FIG. 1 as well as components from a partner (shown as partner components in boxes with dashed lines) such as a off-line newspaper and ad publisher.

FIG. 10 illustrates a method 200 for newspaper advertising platform based on the system for a consumer referral and reward system as described above the system connects online advertising directly with an offline transaction at the point of sale. Thus, rather than charging for a click, an email "lead" or even a call, the model captures a commission fee when a real registered consumer is delivered to a merchant affiliate. As discussed the system thus eliminates risk associated with conventional online and offline advertising today-actual consumer acquisition is the "billable event." The system tracks offline credit and cash transactions through a "cash-back" consumer rewards card 202 at the register or point of sale. Unlike coupons, however, the consumer rewards card can be re-used indefinitely at participating businesses throughout the local market, promoting repeat visits and consumer loyalty. Local businesses have parallel incentives to distribute the consumer rewards cards to consumers, helping to build the network in a "viral" way.

The method 200 provides a viral member growth strategy. For example, in order to accelerate registered consumer and merchant affiliate acquisition, the method provides incentives in return for referrals into its network as shown in FIG. 10. In addition, merchant affiliates are not charged commissions on sales to already registered consumers they refer to the service provider. Furthermore, for registered consumer to new consumer referrals, a reward is issued to the registered consumer referrer in the form of member points for each sale generated by the new consumer referee. For merchant affiliates to consumer referrals, for each increment of in-store referred consumers, their commission payments can be reduced accordingly.

Figure 11:
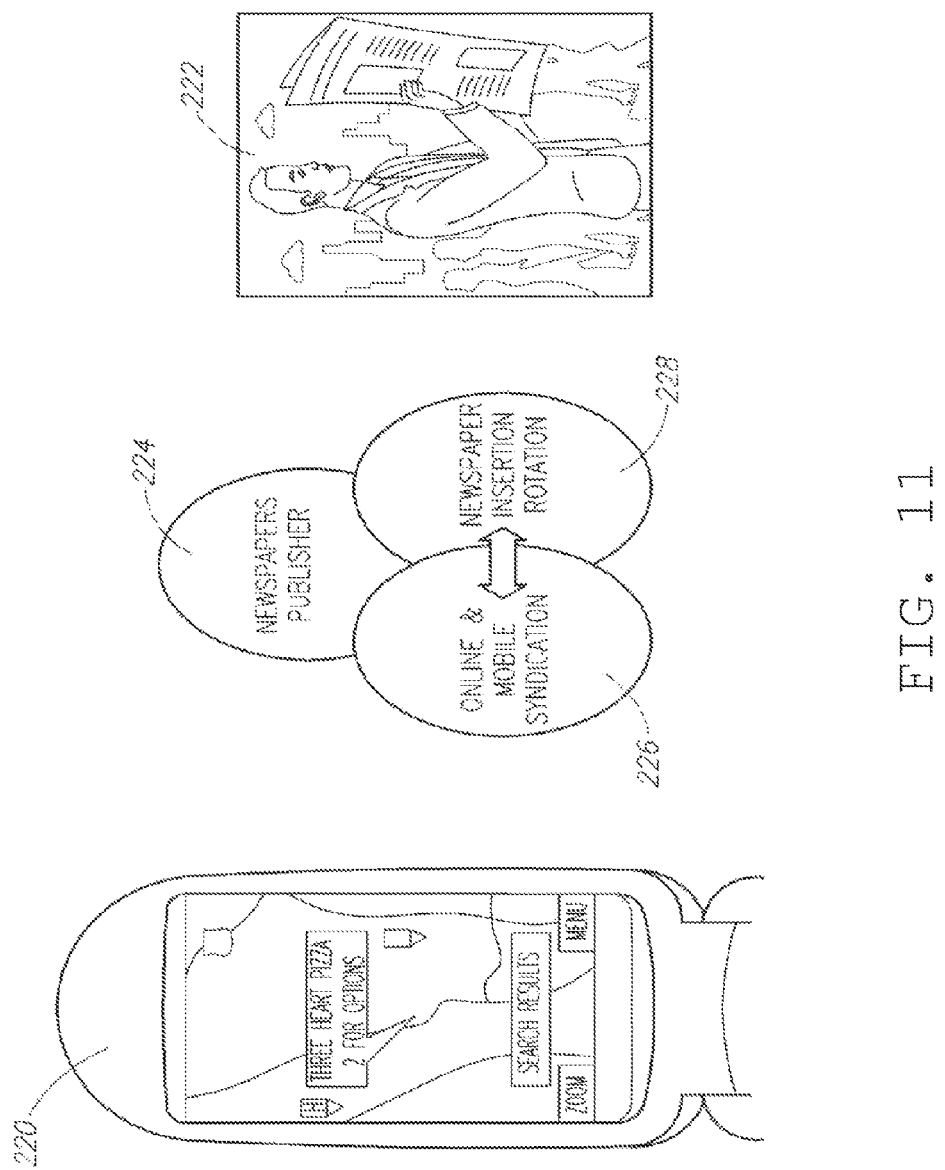
FIG. 11 illustrates the cross-channel syndication provided by the newspaper advertising platform.
Figure 12:
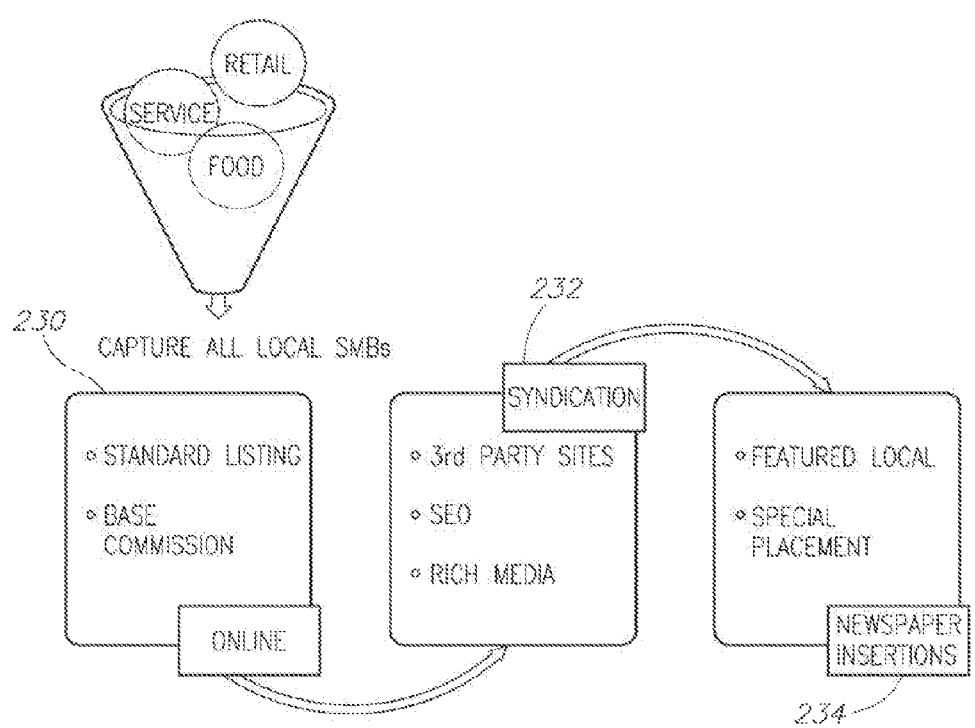
FIG. 12 illustrates a method for conversion from online advertising to offline newspaper using the newspaper advertising platform.
Figure 13:
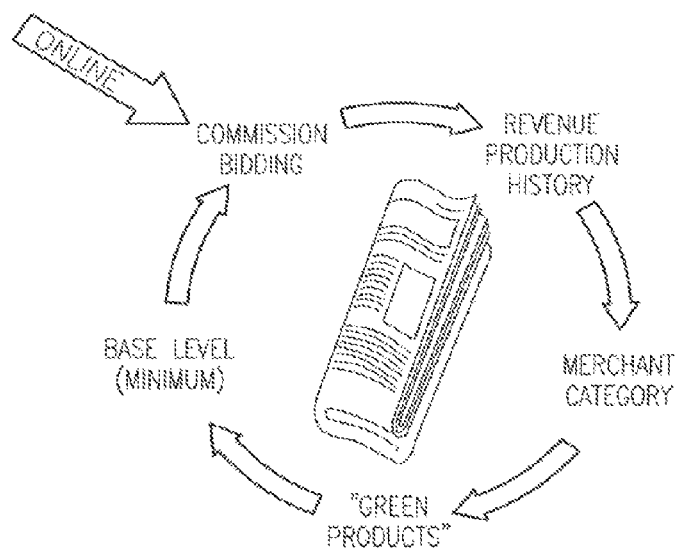
FIG. 13 illustrates a method for online to offline conversion using the newspaper advertising platform.
Figure 16:
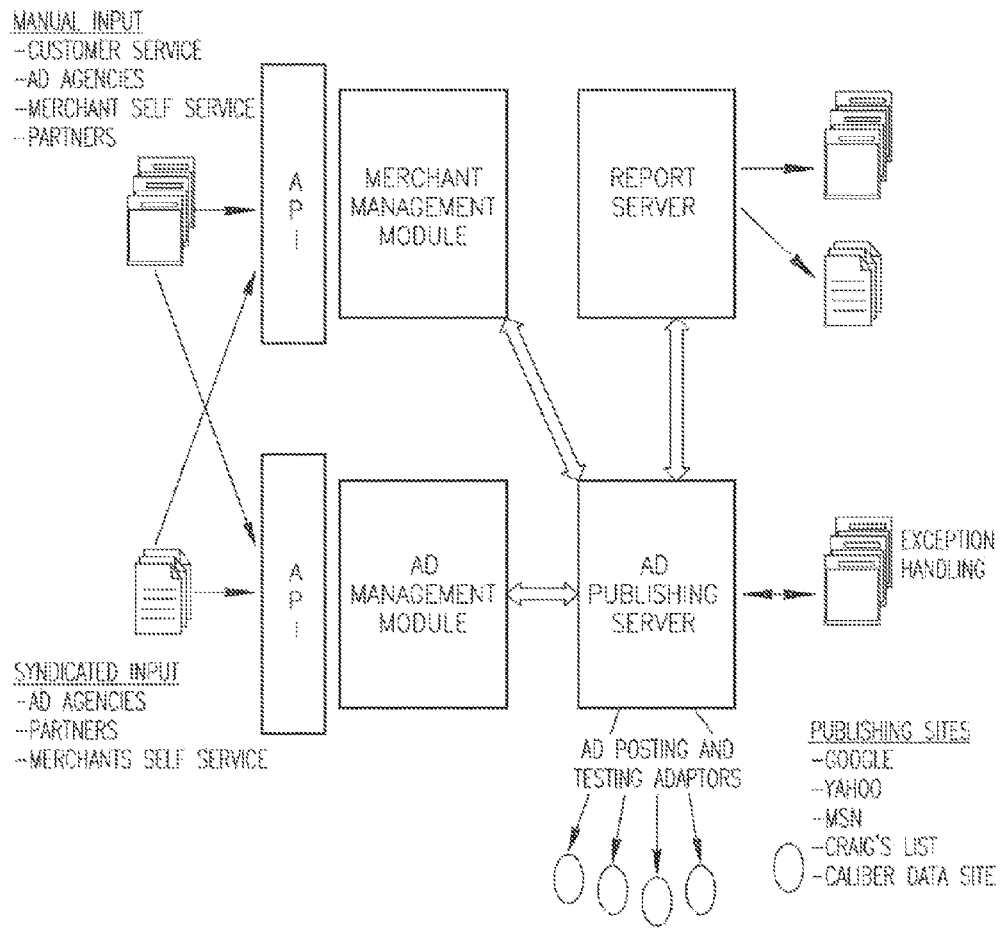
FIG. 16 illustrates more details of the ad syndication subsystem.
Figure 17:
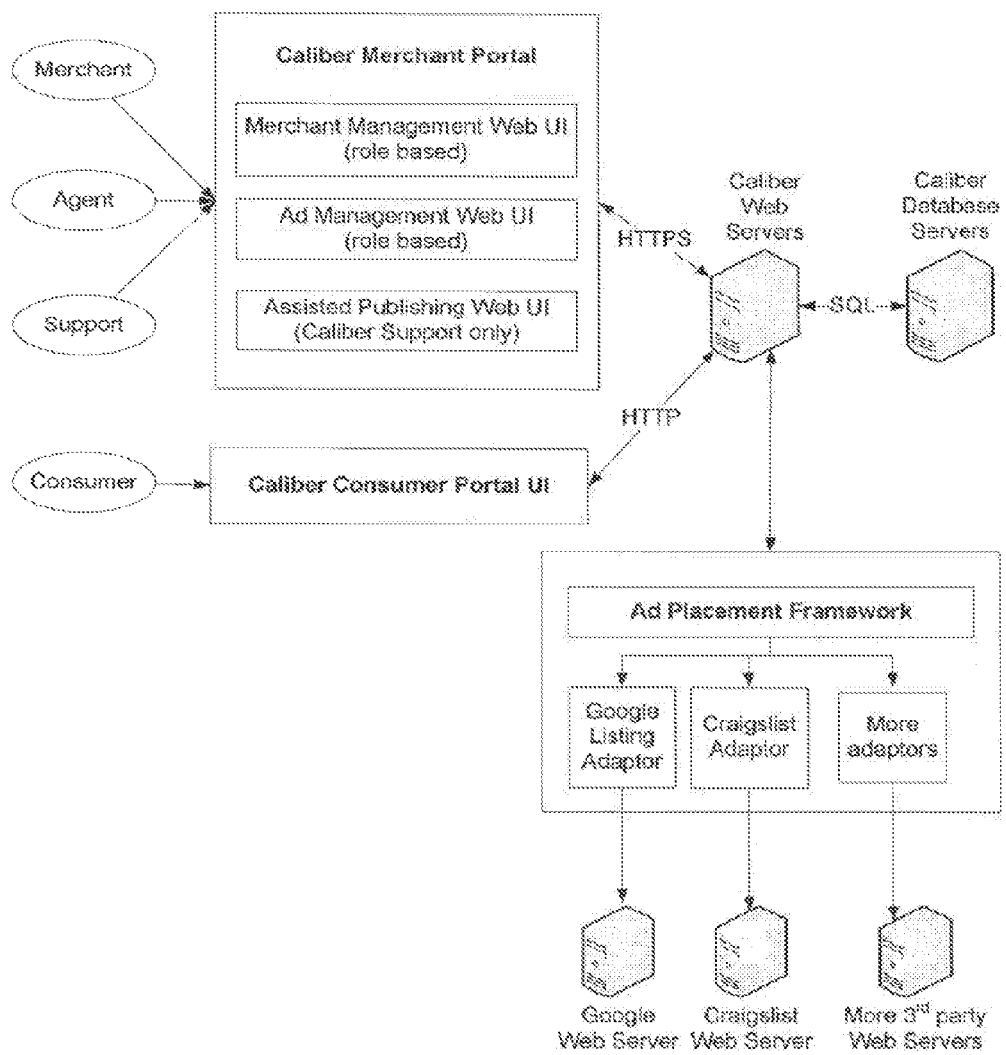
FIG. 17 illustrates the ad syndication user roles and workflow.

In the method as shown in FIG. 10, instant offer publishing (204) occurs. In an exemplary embodiment of instant offer publishing, merchant affiliates can upload "Standard Offers" that can contain: persistent business information, brands, location, etc. Merchant affiliates can also upload "Special Offers" that can be, for example, time constrained promotions—for example a restaurant featuring a guest musician on a certain night, a one day clearance sale, weekly happy hour, etc. During the instant offer publishing, the system can also provide near real-time placement of Special Offers via telephone (automated voice response) as described in more detail below with reference to FIG. 14. The method can also provide offer delivery and advertisement syndication (206). In the offer delivery and advertisement syndication, optimum ad placement is made by the system for its newspaper partner on its online consumer site in return for revenue share. The ad offer placements also use the system's syndication technology to deliver newspaper branded ads on leading online third party shopping destinations. The system can also use mobile messaging and other media delivery services such as SMS, in-car navigation, interactive cable TV, HD radio, and the like. The online ads of the system produce a unique identification (ID) code when hovered over or clicked. For the Newspaper ad insertions that result from a rotation formula (described in more detail below with reference to FIG. 12), the ID code can be printed (and can also be bar coded) in each ad. The registered consumer sees the Standard ads and "Special Offers" on products and services offered by merchant affiliates in their proximity either their viewing location in Google® Map or MS Virtual Earth as well as featured in newspaper placement. The ad syndication is also shown in more detail in FIGS. 16 and 17. The method can also provide in-store distribution and activation. In particular, the newspaper partner can distribute reward cards 202 to its subscriber base and via orders placed through its online consumer destination. The merchant affiliates can also distribute cards from countertop display and the registered consumer can activate the card 202 at merchant affiliate establishment. The merchant affiliates can also use their existing POS terminal to associate a registered consumer's existing credit and/or debit card with the system, eliminating the need to issue a new card or number. In an alternative embodiment, the method can be accomplished without a physical card is not, instead using another unique consumer identifier, such as a phone number or other unique code. The method can also provide purchase transaction, commission fee assessment, and tracking (208). As an example, a registered consumer buys a product or service from a merchant affiliate and swipes the reward card 202 which uploads transaction information to the service provider. Then, the merchant affiliate is charged a commission fee (requiring proof code) and the consumer reward (210) is that portion of each purchase commission credited to the registered consumer account (or optionally to charity of choice). FIG. 11 illustrates the cross-channel syndication provided by the newspaper advertising platform wherein one or more computing devices 220, such as a smartphone, PDA, cellular phone, etc. (online and mobile synchronization 226) are coupled to offline media 222, such as a newspaper (using a newspaper insertion rotation 228) from a newspaper publisher 224. The cross-channel syndication allows the newspaper industry to leverage online advertising to sell offline (print based) advertising. The cross-channel syndication can provide online branded syndication and a special local section in a newspaper. In the online branded syndication, local merchant affiliates get online placements (lowest commission fee); registered consumers get searchable real-time offers and the online branded syndication supports mobile (SMS and 411 query). In an exemplary embodiment, a special local section in the newspaper can provide rotating placement of top producers with merchant affiliates getting rotations and tie-ins to special merchant affiliate feature articles. FIGS. 12 and 13 illustrate a method for conversion from the online advertising space to offline newspaper space using the newspaper advertising platform. The system provides formula based scoring for ad rotation: online placement to newspaper insertion as is described below in more detail. An example of the inputs for the online to offline conversion/ad rotation is shown in FIG. 18.

The method shown in FIGS. 12 and 13 include the processes of: 1) generating a merchant affiliate offer; 2) standard and special placements and extension of online destination; 3) ad syndication and SE; 4) determination of online to offline rotation value; 5) offline newspaper insertion; and 6) newspaper ad coding. Each of these processes is now described in more detail. The generation of a merchant affiliate offer (230) as shown in FIG. 12 is a process in which an ad publisher, newspaper uses the system to offer a no up-front cost ad to local Small and Medium Businesses. In the standard and special placements and extension of online destination, the ad publisher newspaper can develops its online consumer destination to enable posting of Standard listings (static store information), as well as immediate (near real-time) placements from local merchant affiliates (a.k.a. "Special Ad Placements"). Special ad placements can be called in, for example by telephone or placed via internet UI, or via text or multimedia messaging from mobile phones. These exemplary ad placements insert a tracking code that can be printed in the paper and also synchronized with the online ad. For the offline, paper based ads, the consumer can call a phone number and input the code to register their acceptance ("proof"), or they can use the service provider or newspaper's online site to register acceptance of the ad. Online ad placements at the system or newspaper consumer site, and in syndicated placements on third party destinations, the merchant affiliate ads, when clicked on by consumers, register the proof code which is then sent to the system's tracking system, as a "proof" code. This enables online as well as offline newspaper ad views by the registered consumer to be tracked at the point of sale (POS). For example, in operation at the point of sale, the proof code together with the consummated purchase transaction can trigger transaction validation, upon the swipe of the registered consumer's reward card (or equivalent), and the commission fee can be charged to the merchant affiliate. Optimally, the newspaper ad publisher can support extended word search within the online ads to include expanded key words (i.e. specific product brands, services, items, models, colors, etc.). Newspaper ads can be queried by local registered consumers when they use location based searching for offline merchant affiliates that can fulfill their purchase requirements. During syndication and search engine optimization (SEO) (232), each newspaper can uses the system's "Ad Syndication" tool (and/or other third party online site insertion processes) to increase the value and reach of online ad placements beyond their own destination site. The ad syndication functionality is also used to drive the newspaper's own branding, further linking-back to its site as it places each ad onto relevant third party consumer destinations. These third party consumer destinations can, for example, offer free listings or can impose a fee that is tracked and then passed on to the merchant affiliate as a premium site insertion. The system's Ad Syndication tool can integrate Search Engine Optimization (proprietary and/or third party)—resulting in broader sets of key words and higher search results ranking, for example on third party consumer destinations online. The determination of online ad placement to offline ad placement rotation value (as shown in FIG. 13) can be based on an algorithm that factors in such parameters including, but not limited to, —Commission Rate Bid, Revenue Production History (accrued value), Merchant Category (i.e., "Food Industry, Personal Services," etc.), and can also include certain other factors such as whether a product or service qualifies as "Green" or is in some other way beneficial to the local community An example of the inputs to the online to offline rotation system is shown in FIG. 18.

An example of the newspaper insertion rotation process is as follows:

Step 1: Dimension Determination

Consider a plurality of scoring dimensions, such as D1: Commission Rate Bid; D2: Total Accrued Commissions Generated; D3: Total Time of Ad Placement; D4: Merchant Category (by revenue size, by industry or service sector); D5: Green Product" sold (approved environmentally friendly products); D6: Contributions by merchant affiliate to approved charities, etc.; The ad publisher/service provider, in the newspaper insertion rotation process can add any number of dimensions in this model.

Step 2: Dimension Bucketization: For each dimension, a determination can be made of one or more buckets (ranges), and can be used to score each merchant affiliate into the one or more buckets along this dimension. For example, a D1 dimension can have 3 categories: Low, Mid, High For yet another example: D2 can have 5 buckets: Low, Low-Mid, Mid, High-Mid, and High with whatever value ranges are desired For yet another example: D5 can have 2 buckets: Yes (selling "green products"), No (no "green products"). Please note bucketization normally is tied to business policies, as exemplified by the D1 example given.

Step 3: Dimension & Bucket Weight Determination: Dimension and bucket weight determination can be performed, for example, given a total weight sum being 1, by executing the following sub steps: Step 3.1.: Assign weight total for each dimension, making sure that sum of these totals equal to 1 (the grand total). Step 3.2. For each dimension, assign weight to each bucket, making sure that sum of weights assigned to buckets will be totaled at the value determined at Step 3.1 for this dimension.

Step 4: Scoring: Assume there are 2 dimensions D1, and D2, where D1 has 3 buckets and D2 has 2 buckets. From above steps, there is a weight distribution: W(D1, B1)=0.10, W(D1,B2)=0.15, W(D1,B3)=0.25 W(D2: B1)=0.20, W(D2, B2)=0.30, where W is the weight value for dimension Dx and bucket By. In this example: (1) D1 and D2 are equally important in our ad publisher ranking (UR) (each has a total weight of 0.5). (2) The ad publisher wants the rank to be higher for merchant affiliates that happen to be in higher numbers buckets.

A ranking formula can be used to rank the ads of merchant affiliates for rotation. In the method, any ranking formula can be used. For example, a simple formula can be:

$$UR = [W(D1,B1)*M(D1,B1)] + [W(D1,B2)*M(D1,B2)] + [W(D1,B3)*M(D1,B3)] + [W(D2,B1)*M(D2,B1)] + [W(D2,B2)*M(D2,B2)]$$

"Merchant position" M refers to where the merchant affiliate is at along each dimension. In one embodiment of the business application, each merchant affiliate occupies one discrete position along each dimension so the position value is one for one of the buckets but zeros for the rest, for any given dimension. For example,

TABLE 4

| Merchant | D1 (Commission) | D2 (Green) | UR |
|---|---|---|---|
| 1 | B1 = 1, B2 = 0, B3 = 0 (low commission) | B1 = 1, B2 = 0 (selling green) | UR = 0.10 × 1 + 0.15 × 0 + 0.25 × 0 + 0.20 × 1 + 0.30 × 0 = 0.3 |
| 2 | B2 = 0, B2 = 0, B3 = 1 (high commission) | B1 = 0, B2 = 1 (not selling green) | UR = 0.10 × 0 + 0.15 × 0 + 0.25 × 1 + 0.20 × 0 + 0.30 × 1 = 0.55 |

In this example, and as a result of the Dimension & Bucket Weight Determination, merchant affiliate 2 has a higher placement ranking score for both online and offline than that of merchant affiliate 1. The multi-dimensional bucket analysis allows any number of relevant inputs to be used and the unit for each input is irrelevant to scoring. In practice, the VR formula optimally can be field tested with weights and sometimes buckets adjusted to reach optimization in achieve desired business goals.

Returning to FIG. 12, during the newspaper ad insertion (234), based on the rotation value and subject to a minimum print insertion guarantee provided by the newspaper, each merchant affiliate receives a schedule with calculated frequency, placement position and possible Premium position in the newspaper hard copy. This "Rotation" is designed to serve as a major inducement for each merchant affiliate advertiser to rotate from the online destination (low resistance/cost) to the hard copy newspaper (potentially greater exposure and value). Note that this turns around the current trend of online search engine leaders (i.e., Google®) who have, to date succeeded in pushing down ad revenues to online and offline newspapers.

Once the rotation ranking is determined, the newspaper ad (Insertion) Coding or "Proofing" occurs. During the coding, newspaper ads (rotation/insertions) are encoded with "proofing" codes similar (and in synchronization with) online ads. The proofing codes are used by registered consumers to register their acceptance of the ad by either a) dialing a special phone number and then keying in the ad code, or b) using an online VI to get more information and to issue "acceptance" (proof).

Now that the ads are placed both online and offline, the rest of the purchase transaction as described above occurs. In particular, the registered consumer can visit the merchant affiliates physical location after indicating ad acceptance, make a purchase transaction, and consummate the transaction by, for example, swiping the membership reward card (or equivalent such as entering unique phone or id. number or using cell phone interface). The commission fee can be charged to the merchant affiliate and payments are apportioned and either credited immediately or downstream to ad publisher (newspaper/service provider) and other members of the "value chain" such as SMS and message delivery or credit/POS terminal provider). A consumer reward payment is credited to the registered consumer at the time of sale.

Figure 14:
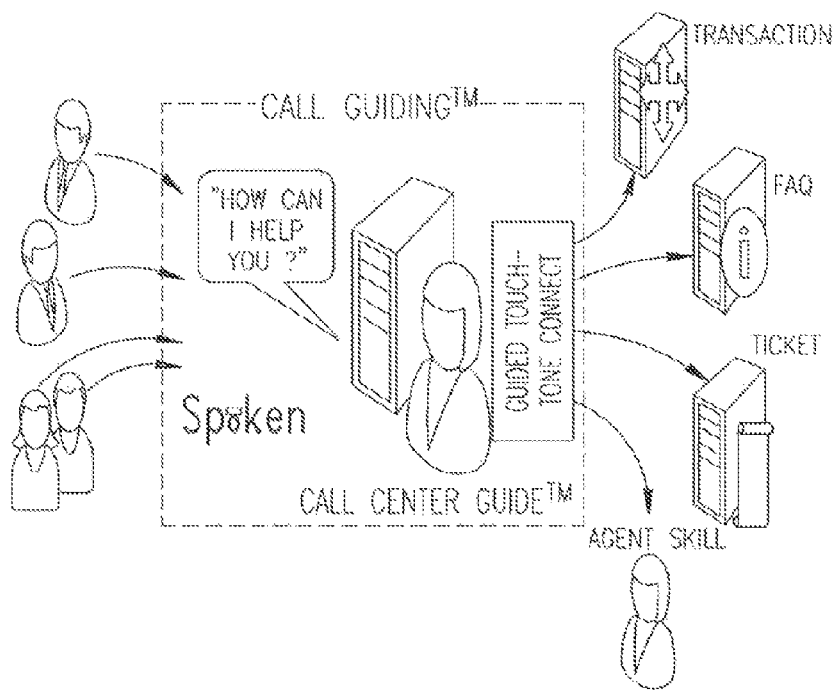
FIG. 14 illustrates a method for merchant sign up using the newspaper advertising platform.

FIG. 14 illustrates a method for merchants to register to use the newspaper advertising platform and thus be a merchant affiliate. The merchant is able to sign up via a web user interface, via facsimile or via telephone with optional operator assisted integrated voice response (IVR). When a new merchant calls-in to sign up, the system can for example, detect the merchant via caller ID (where applicable), validate the merchant (lookup directory listing, address), have merchant call back for verification before final ad placement, and direct the merchant to access FAQ and/or Terms and Conditions recording. If an existing merchant affiliate calls-in, the system can assume call in to edit or add a new "Special Offer"; change commission bid; change billing address; query account status; request refresh of consumer cards & literature; or speak with an account representative (access FAQ).

An example of an operator assisted Intelligent Voice Recognition (IVR) Script for a merchant placing "Special Offer" can occur as follows:

IV. Advertisement Placement:
Caller: Calls I-800-Caliber
IVR System: "Thanks for calling Caliber. In order to ensure quality service this call can be monitored and or recorded. How can we help with your Ad Placement today?"
Caller: "I'm calling to place an Ad to promote our half price wine bottle night."

IVR System: "Sure, I can help you with that. First we'll need to gather some information. May I have your member affiliate account Number?"

Caller: "123456"

IVR System: "And you are representing Salute Restaurant on Main Street in Bellevue?"

Caller: "Yes."

IVR System: "Thank you for the information."

IVR System: "I'd like to gather the information required for your advertisement "When would like the Ad to begin and end"

Caller: "I just want it to run for the Wednesday and Thursday night."

IVR System: "What is the specific offer"

Caller: "Every bottle of wine with dinner will be sold at half price"

IVR System: What days would you like the offer Ad to run?"

Caller: "Monday through Thursday of this week."

IVR System: "Thank you/or calling your ad publisher/service provider. Your Ad will be published Monday by 3:00 PM."

In more detail, when the merchant affiliate signs-in to the system, the merchant affiliate can also indicate acceptance of baseline (1.5%) commission fee in return for listing and current newspaper insertion rotation policy; provide "Standard" listing information (business profile) and basic product/service offering description (key words); enter "Special Offers"—time constrained promotions that will appear on local search map for local registered consumers whose search interest profile matches; receive online ad syndication on major third party consumer destinations as well as basic Search Engine Optimization (SEO); receive placement of online ad on hosted Google® map to attract local registered consumers; and/or participate in commission Bidding in which the merchant affiliate can bid up commission rate for "Special Offers" creating higher revenues for the ad publisher and reward for registered consumers.

Figure 15:
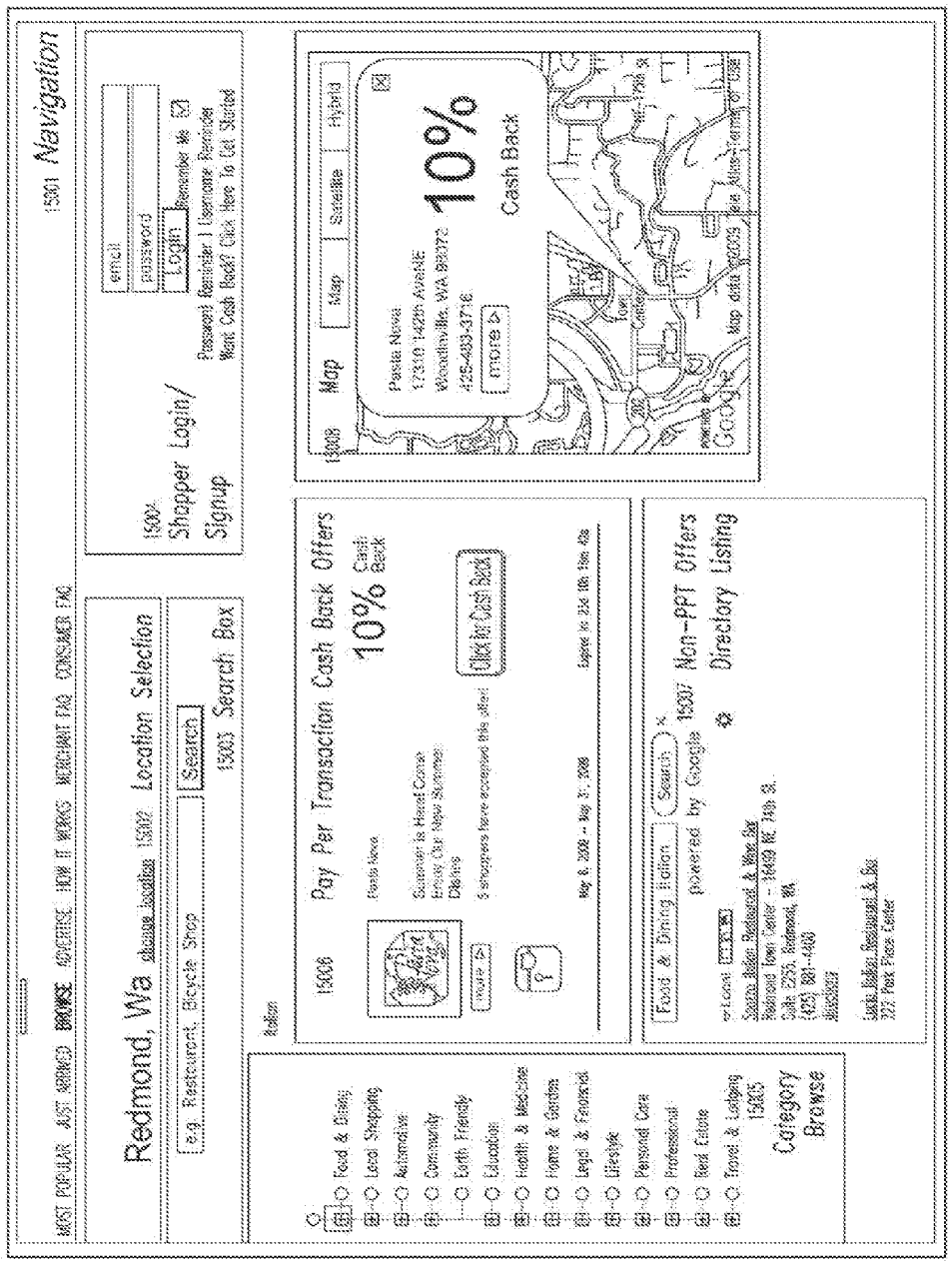
FIG. 15 illustrates a method for consumer sign using the newspaper advertising platform.

FIG. 15 illustrates a method for registered consumers to use the newspaper advertising platform. The registered consumer can conduct an online search of the newspaper online site interactively, and/or he can elect to store his search request and/or preferences along with notification preferences (i.e. immediate or scheduled alert notification and mobile device type/id). The interactive and stored search requests can correspond to a full data set and expanded Search Engine Optimization (SEO generated) data established for each merchant affiliate. In the event that an alert is issued to the registered consumer over mobile (or other device), indicating that a local merchant affiliate match has been found in response to the query, a simple, one-click feature allows the offer to be "accepted" or "proofed," similar to the online proofing process when consulting the newspaper online destination. In an exemplary embodiment, the user interface for search can include display of ad on an online digital map (i.e., Google® Map, or Virtual Earth)—which can include special graphic advertisement overlays indicating "Special Offers." In addition, links to third party consumer destinations such as YouTube can also be designated by the merchant affiliate at time of ad submission or at time of an "Update," making it possible for video and/or other forms of rich media to be associated with each ad.

Figure 19:
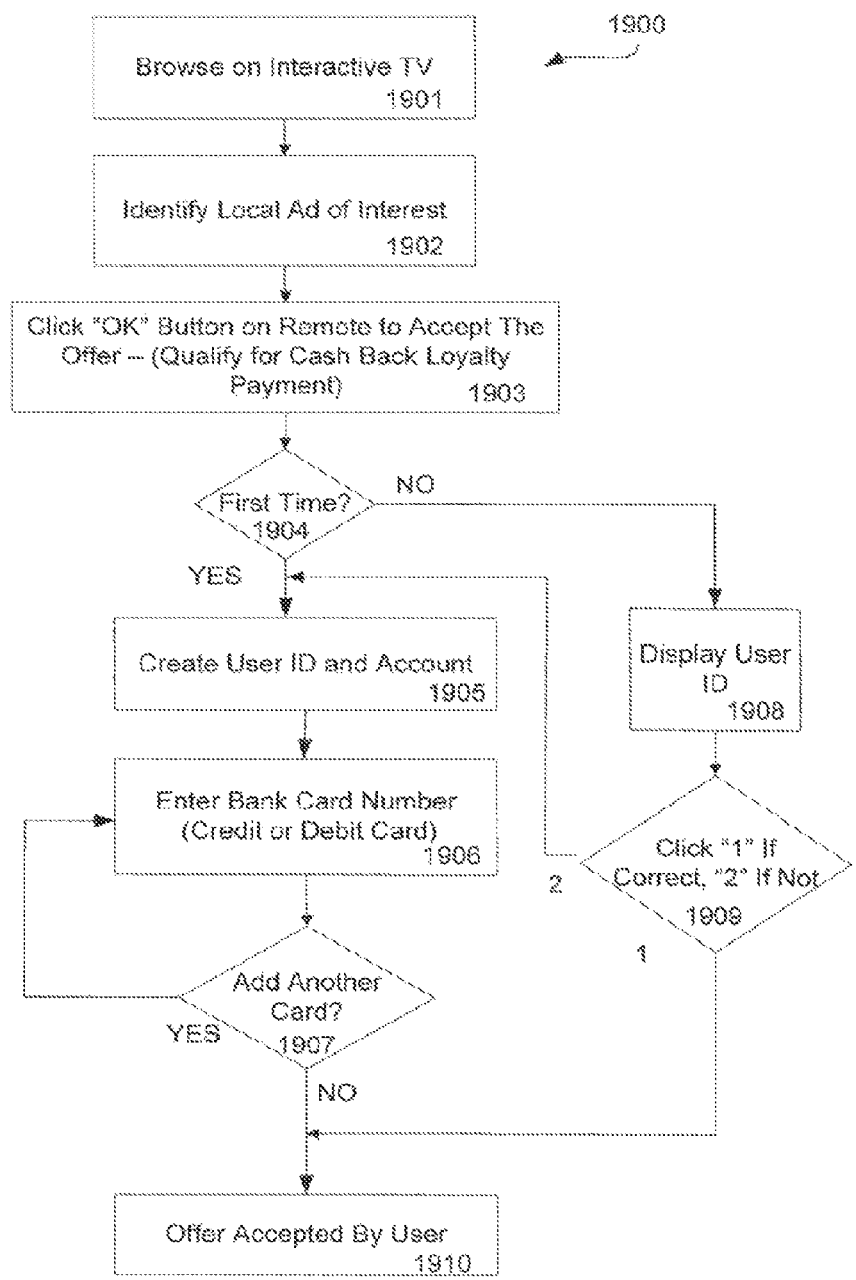
FIG. 19 illustrates one embodiment of the Ad (offer and reward) acceptance flow on a typical interactive TV.
Figure 20:
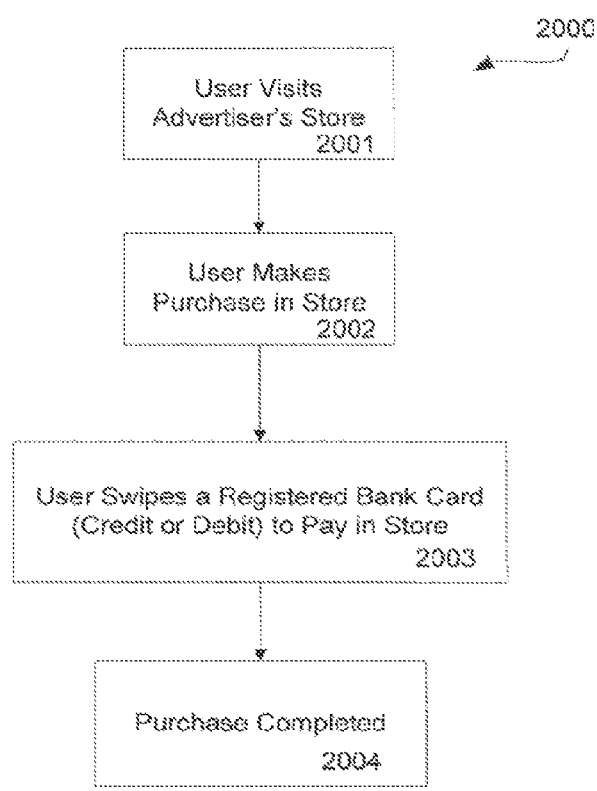
FIG. 20 illustrates an embodiment of offline purchase, resulted from the accepted advertisement on Interactive TV.
Figure 21:
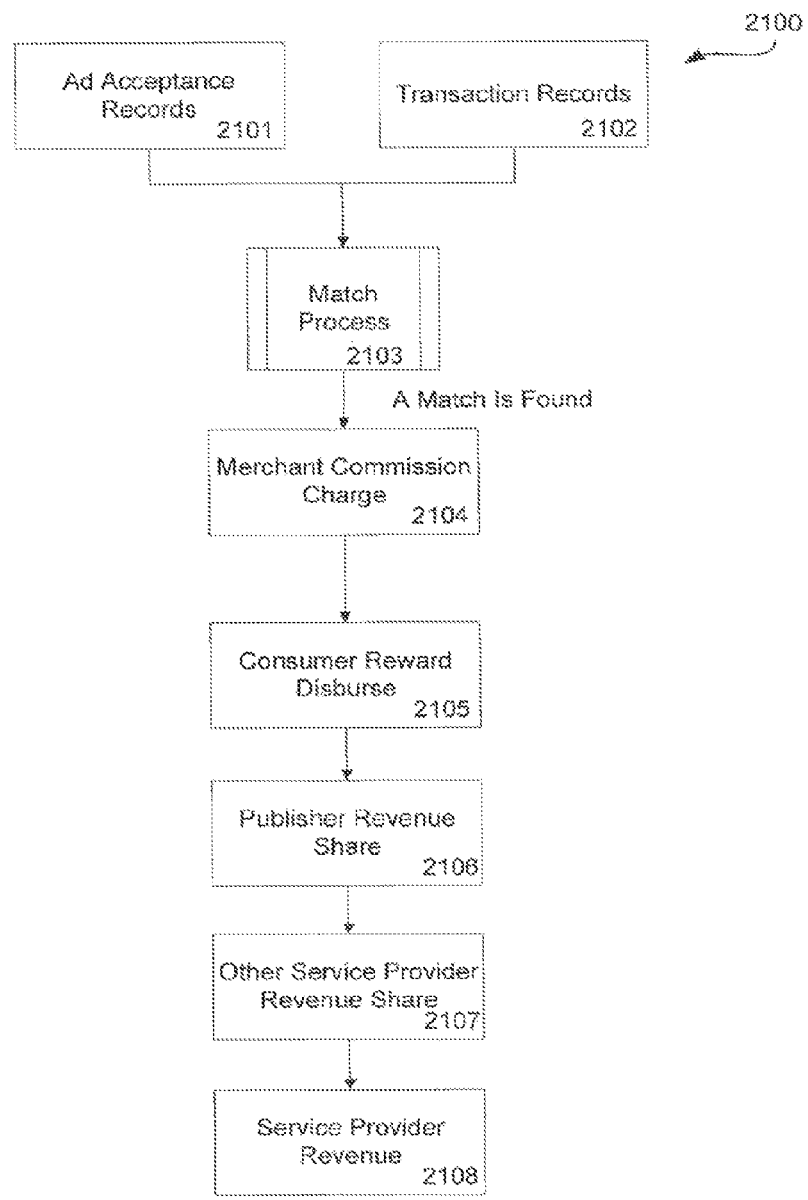
FIG. 21 illustrates an aggregator collects transaction records from advertising merchants, and provides a feed to the Pay-Per-Transaction Service Provider of those that are paid by credit cards registered by consumers who have accounts in the program embodiment.

FIG. 19-21 illustrate an embodiment of the Ad (offer and reward) acceptance flow on a typical interactive TV. In these exemplary embodiment of the invention, consumers find immediate local deals when they drill down on interactive ads and then respond to a prompt to register their preferred credit card to find local advertised deals on the product and/or service. This consumer may also register the preferred credit card registration prior to responding the ad. Joining a consumer/user program enables consumers to participate in cash back incentives each time they click on an online or interactive TV ad, allowing them to purchase the item locally and in an offline space. A percentage of the commission fee can be channeled back to the ad publisher and/or the ad sponsor, freeing the ad publisher from the burden of collections.

FIG. 19 shows one embodiment of a method 1900 implementing the Ad (offer and reward) acceptance on a typical interactive TV. Similar to the method illustrate in FIG. 10 the method 1900 for interactive TV advertising platform based on the system for a consumer referral and reward system as described above, connects broadcast advertising directly with an offline transaction at the point of sale (POS). Thus, rather than charging for a click, an email "lead" or even a call, the model captures a commission fee when a registered consumer is delivered to a merchant affiliate. As discussed the system thus eliminates risk associated with conventional online and offline advertising today-actual consumer acquisition is the "billable event." The system can track offline credit and cash transactions through a "cash-back" consumer rewards card (See FIG. 20, 2002) at the register and/or point of sale (POS). Unlike coupons, however, the consumer rewards card can be re-used indefinitely at participating businesses throughout the local market, thereby promoting repeat visits and consumer loyalty. Local businesses have parallel incentives to distribute the consumer rewards cards to consumers, helping to build the network in a "viral" way.

Like the method described in FIG. 10, the method for interactive broadcast/media 1900 provides a viral member growth strategy. For example, in order to accelerate registered consumer and merchant affiliate acquisition, the method provides incentives in return for referrals into its network. In addition, merchant affiliates are not charged commissions on sales to already registered consumers they refer to the service provider. Furthermore, for registered consumer to new consumer referrals, a reward is issued to the registered consumer referrer in the form of member points for each sale generated by the new consumer referee. For merchant affiliates to consumer referrals, for each increment of in-store referred consumers, their commission payments can be reduced accordingly.

Also similar to the method illustrated for newspaper publishing, in the method 1900 shown in FIG. 19, instant offer publishing is supported. For example, merchant affiliates can upload "Standard Offers" that can contain: persistent business information, brands, location, etc. Merchant affiliates can also upload "Special Offers" that can be, for example, time constrained promotions—for example a restaurant featuring a guest musician on a certain night, a one day clearance sale, weekly happy hour, etc. The method can also provide offer delivery and advertisement syndication. In the offer delivery and advertisement syndication, optimum ad placement is made by the system for its interactive TV affiliate and/on its online consumer site in return for revenue share. The ad offer placements also use the system's syndication technology to deliver advertisement on the interactive TV affiliate destinations. The system can also use mobile messaging and other media delivery services such as SMS, in-car navigation, HD radio, and the like, in combination.

Turning again to the method 1900, an embodiment of the workflow of Ad (offer and reward) acceptance typical interactive TV is illustrated. First, a user/consumer browses local ads on this TV 1901. The user/consumer can identify a local ad of interest 1902. The Ad, presented on the TV, prompts him to accept the offer and an associated reward if he buys from the advertising merchant, by an acceptance event, for example, clicking "OK" button on his TV remote 1903. The Ad system can search its database to see if the interactive device (for example, by TV serial number or by TV subscriber ID) and the viewer is an existing consumer/user with an account 1904; displaying the user ID to the consumer/user 1908 for verification at a DESCISION BOX 1909. If the system does not find a consumer record for this interactive TV viewer consumer/user and/or the consumer/user indicates "NO" at 1909, the viewer, consumer/user is directed to create a consumer/user account 1905. The account creation process can in one embodiment take place via a TV remote control. For example, the consumer account can simply be the viewer's subscriber account if he pays for the TV program. After the viewer creates the account and/or the system links the viewer to the subscriber account, the viewer can enter credit cards number to his account 1906. It is foreseen that any number of additional credit cards can be associated with the viewer, consumer/user by answering "Yes" to a question 1907. In one embodiment, after the viewer, consumer/user has completed credit card registration, an "Ad Acceptance" event has been completed on the interactive TV 1910.

Referring again to step 1904, if the system locates a consumer/user record for the viewer, consumer/user, it can display the user account information on the screen and/or some other user interface 1908, asking the viewer, for example, to confirm that is associated with this account. In this embodiment, the viewer, consumer/user is asked to click "1" on his remote to confirm. When the consumer/user account is confirmed, the offer acceptance process is completed 1910. Alternatively, if the viewer is not associated with the account information in display the viewer can clicks on "2" on his remote to decline. In this case, the viewer can be directed to the consumer/user account creation steps to create his own account, starting from step 1905.

FIG. 20 describes an embodiment of consummating an offline purchase 2000 linked and initiated by method 1900 illustrated in FIG. 19, i.e. resulting from the accepted advertisement on Interactive TV. After the viewer, consumer/user accepts an offer from his interactive TV, the consumer/user can consummate the purchase by, in one example, going to the store where the accepted ad originated 2001. The consumer/user can makes a qualified purchase 2002. In one example, to qualify a purchase for the reward the consumer/user "accepted" on the interactive TV of this example, the consumer/user completes the purchase within a valid range conditions of the accepted advertisement. For example, the consumer/user qualified purchase may have to meet conditions, such as, minimum purchase amount, time limitations, quantity limitations and the like that can be listed on the advertisement. At the point-of-sale (POS), the consumer/user can finalize the purchase by payment by using a registered credit card 2003. At this point, the consumer/user's offline purchase process is completed 2004.

The method 2100 of FIG. 21 describes how an aggregator can collect transaction records 2102 from advertising merchant affiliates, and can provide a feed to the Pay-Per-Transaction Service Provider of those that are paid by credit cards registered by consumers who have accounts in the program 2001. In Step 2102, the Service Provider matches the transaction data 2101 against Ad Acceptance records 2102 by, for example, consumer ID and by time. If a match is found after the Match Process 2103, the advertiser can be charged with a pre-agreed commission amount 2104, which can, for example, be a percentage of the sales ticket value or a fixed monetary amount (a hypothetical revenue distribution from a merchant commission charge is shown in the pie chart). The system provider can reward a portion of the received commission to the buying consumer 2105 (e.g., Consumer=33%). The publisher of the ad, in this case the Interactive TV, can also get its pre-agreed revenue share 2106 (e.g, Publisher=33%). In is contemplated that other service providers, such but not limited to, the previously mentioned Aggregator can share revenues with the system provider (e.g, Other Provider=17%) once a qualified match between Ad-Acceptance and purchase transaction 2107 occurs. In one example, remaining proceeds of the commission charges can go to the system provider 2108.

In another Integrated Service Model of the invention, the system can be integrated as a component of an ad monetization program (e.g., augmenting or replacing the established charge-per-click model). In addition to promising merchants guaranteed value for ad dollars spent (commission paid when sale results), merchants can receive a range of benefits including fast ad insertions, ad-specific performance reports that detail ROI from "Special Offer" placement, and rich business intelligence for use in behavioral targeting. This is designed to extend a powerful set of capabilities for delivering hyper-targeted ads to the growing number of interactive TV, online and/or mobile devices supporting Location Based Service (LBS).

In an alternative embodiment of the invention, targeted merchant affiliates can be Small and Medium Businesses (SMBs). By eliminating up-front cost, uncertain ROI and complexity of traditional advertising for SMBs, one embodiment of the invention can drive broad participation in cooperatively-funded ad programs by manufacturers and/or ad sponsors. In another embodiment partnerships with big box and chain stores as merchant affiliates through partnership with financial institutions, and/or by promoting integration of the system platform with existing customer loyalty programs. In yet another embodiment of the invention, the "Pay-Per-Transaction" ad model is a method for clearing remnant ad inventory and/or for disseminating broadcast advertising into the online world where it can generate incremental PPT revenue. In one embodiment of the invention, established "critical masses" of merchants and online shoppers are targeted through a variety of acquiring and issuing banks.

While the foregoing has been with reference to a particular embodiment of the invention, it will be appreciated by those skilled in the art that changes in this embodiment may be made without departing from the principles and spirit of the invention, the scope of which is defined by the appended claims.

The embodiments of the invention in which an exclusive property or privilege is claimed are defined as follows:
1. A computer implemented system for tracking sales transactions, the system comprising:
   a computing device that implements a service provider component, wherein the service provider component further comprises:
   a merchant unit;
   a transaction unit; and
   a consumer unit,
     wherein the merchant, transaction and consumer units further comprise a plurality of lines of computer code executed by a processing unit of the computing device that execute the merchant, transaction and consumer units,
   wherein the merchant unit, the transaction unit and the consumer unit are configured to cooperatively act to:

provide, based on registration with the service provider component, an online advertisement space and an offline advertisement space for a plurality of merchant affiliates;

rank the merchant affiliates to determine portions of referrals from the merchant affiliates to consumers, the referral portions being based at least in part on commission rates for receiving commissions from the merchant affiliates so that a higher commission rate corresponds to a higher referral portion, the ranking of the merchant affiliates including determining rotation rank values for rotating ads for the merchant affiliates from the online advertisement space to the offline advertisement space;

rotate ads for the merchant affiliates from the online advertisement space to the offline advertisement space in response to the determined rotation rank values;

provide to a consumer, via an interactive broadcast media advertising system associated with the online advertisement space of the service provider component, at least one discrete sales offer from a merchant affiliate, the merchant affiliate being selected from the plurality of merchant affiliates based on the referral portion corresponding to the merchant affiliate;

track the at least one discrete sales offer made by the merchant affiliate to the consumer resulting in a discrete ad acceptance event by the consumer;

track the discrete ad acceptance event of the consumer resulting in a discrete sales transaction made by the consumer;

provide to the consumer a message configured to incentivize the consumer to consummate the discrete ad acceptance event and discrete sales transaction; and charge the merchant affiliate a commission fee for the discrete sales transaction, the commission fee being based on the commission rate corresponding to the merchant affiliate.

2. The system of claim 1, wherein the merchant unit, the transaction unit and the consumer unit are configured to cooperatively act to track sales transactions and validate the discrete sales transaction between the merchant affiliate and the referred consumer before charging the merchant affiliate the commission fee for the discrete sales transaction.

3. The system of claim 1, wherein the merchant unit, the transaction unit and the consumer unit are configured to cooperatively act to credit the consumer a reward for the discrete sales transaction.

4. The system of claim 1, wherein the merchant unit, the transaction unit and the consumer unit are configured to cooperatively act to credit a service provider a service payment for the discrete sales transaction.

5. The system of claim 1, wherein the merchant unit, the transaction unit and the consumer unit are configured to cooperatively act to provide to the merchant affiliate, based on registration with the service provider, an online advertising publishing system associated with a service provider component and an online advertising space on a third party consumer destination.

6. The system of claim 5, wherein the merchant unit, the transaction unit and the consumer unit are configured to cooperatively act to:

provide to the consumer, by the interactive broadcast media advertising system associated with the service provider component and the third party consumer destination, discrete sales offers from the merchant affiliate; and credit the service provider a service payment for the discrete sales transaction resulting from an ad acceptance event at the third party consumer destination.

7. The system of claim 6, wherein the merchant unit, the transaction unit and the consumer unit are configured to cooperatively act to credit the third party consumer destination a service payment for the discrete sales transaction resulting from the ad acceptance event at the third party consumer destination.

8. The system of claim 5, wherein the merchant unit, the transaction unit and the consumer unit are configured to cooperatively act to credit the consumer a reward for the discrete sales transaction resulting from the ad acceptance event at the third party consumer destination.

9. The system of claim 1, wherein the merchant unit, the transaction unit and the consumer unit are configured to cooperatively act to use at least one of a card and a membership proof associated with a point of sale to validate a sales transaction between the merchant affiliate and the consumer, wherein the card further comprises at least one of a magnetic strip card and a credit card.

10. The system of claim 1, wherein the merchant unit further comprises a commission bidding unit that enables a merchant affiliate to bid up a cash incentive to the consumer while accessing values for cash incentives from other merchant affiliates, and wherein the bid-up cash incentive to the consumer is reflected in enhanced ad placement and display for the merchant affiliate based on the cash incentives.

11. A computer implemented system for merchant advertising, comprising:

a computing device that implements a service provider component, wherein the service provider component further comprises a merchant unit, a transaction unit and a consumer unit, wherein the merchant unit, the transaction unit and the consumer unit comprise a plurality of lines of computer code executed by a processing unit of the computing device that executes the merchant unit, the transaction unit and the consumer unit, wherein the merchant unit, the transaction unit and the consumer unit are configured to cooperatively act to:

provide, based on registration with the service provider component, an online advertisement space and an offline advertisement space for a plurality of merchant affiliates;

rank the merchant affiliates to determine portions of referrals from the merchant affiliates to consumers, the referral portions being based at least in part on commission rates for receiving commissions from the merchant affiliates so that a higher commission rate corresponds to a higher referral portion, the ranking of the merchant affiliates including determining rotation rank values for rotating ads for the merchant affiliates from the online advertisement space to the offline advertisement space;

rotate ads for the merchant affiliates from the online advertisement space to the offline advertisement space in response to the determined rotation rank values;

provide a merchant interface associated with the online advertising space to a plurality of merchant affiliates, wherein the merchant interface provides real-time control of the publication, update and modification of interactive, broadcast media advertisements for an individual merchant affiliate, wherein the interactive, broadcast media advertisements each have a geographic area associated with the interactive, broadcast media advertisement, and wherein a commission to be paid a service provider is determinable upon resulted sales from the interactive, broadcast media advertisement;

electronically display a map, wherein the map indicates a geographic location of a merchant affiliate and the interactive, broadcast media advertisement for a product or service offered by the indicated merchant affiliate; and bid by the merchant affiliate, using a commission bidding system, for the commission rate that determines the commission associated with the interactive, broadcast media advertisement, wherein the commission payment paid to the service provider and a reward to the consumer for a particular online advertisement is based on a current status of bids by merchant affiliates being accessible to the merchant affiliates through the commission bidding system.

12. The system of claim 1, wherein the message is provided to the consumer subsequent to the resulting discrete ad acceptance event.

13. The system of claim 1, wherein the merchant unit is further configured to operate to communicate to a first merchant affiliate a current status of the commission rates with an option to bid up a first commission rate corresponding to the first merchant affiliate.

14. The system of claim 1, wherein the merchant unit is further configured to operate to communicate to a first merchant affiliate a current status of cash-back offers from the merchant affiliates to the consumers with an option to bid up a first cash-back offer corresponding to the first merchant affiliate, the referral portions being based at least in part on the cash-back offers so that a higher cash-back offer corresponds to a higher referral portion.

15. The system of claim 1, wherein the referral portions characterize frequencies at which corresponding merchant affiliates are selected from the plurality of merchant affiliates.

16. The system of claim 1, wherein the merchant unit, the transaction unit and the consumer unit are configured to cooperatively act to:
track a location of the consumer,
and select a merchant affiliate based on a proximity condition between a location of the merchant affiliate and the tracked location of the consumer.

17. The system of claim 16, wherein the location of the consumer is tracked by capturing a device location of a mobile device corresponding to the consumer.

18. The system of claim 1, wherein the ranking of the merchant affiliates to determine the referral rates includes:
determining rank values for the merchant affiliates; and
using the rank values to calculate frequencies that correspond to the referral portions, the frequencies being used for displaying ads of the merchant affiliates in a display or for ordering the ads of the merchant affiliates in the display.

19. A computer implemented method for tracking sales transactions, the method comprising:
providing an online advertisement space and an offline advertisement space for a plurality of merchant affiliates;
ranking, with at least one computer, the merchant affiliates to determine portions of referrals from the merchant affiliates to consumers, the referral portions being based at least in part on commission rates for receiving commissions from the merchant affiliates so that a higher commission rate corresponds to a higher referral portion, the ranking of the merchant affiliates including determining rotation rank values for rotating ads for the merchant affiliates from the online advertisement space to the offline advertisement space;
rotating ads for the merchant affiliates from the online advertisement space to the offline advertisement space in response to the determined rotation rank values;
providing to a consumer, via an interactive broadcast media advertising system associated with the online advertisement space, at least one discrete sales offer from a merchant affiliate, the merchant affiliate being selected from the plurality of merchant affiliates based on the referral portion corresponding to the merchant affiliate;
tracking the at least one discrete sales offer made by the merchant affiliate to the consumer resulting in a discrete ad acceptance event by the consumer;
tracking the discrete ad acceptance event of the consumer resulting in a discrete sales transaction made by the consumer;
providing to the consumer a message configured to incentivize the consumer to consummate the discrete ad acceptance event and discrete sales transaction; and
charging the merchant affiliate a commission fee for the discrete sales transaction, the commission fee being based on the commission rate corresponding to the merchant affiliate.

* * * * *